US012810150B2

(12) United States Patent
Zwolak et al.

(10) Patent No.: US 12,810,150 B2
(45) Date of Patent: Nov. 24, 2026

(54) RAY-BASED CLASSIFIER APPARATUS AND TUNING A DEVICE USING MACHINE LEARNING WITH A RAY-BASED CLASSIFICATION FRAMEWORK

(71) Applicant: Government of the United States of America, as represented by the Secretary of Commerce, Gaithersburg, MD (US)

(72) Inventors: Justyna Pytel Zwolak, Point of Rocks, MD (US); Sandesh Sachin Kalantre, College Park, MD (US); Jacob Mason Taylor, Cambridge, MA (US); Thomas Walter McJunkin, Madison, WI (US); Joshua Ziegler, Beaverton, OR (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 790 days.

(21) Appl. No.: 18/028,154

(22) PCT Filed: Sep. 27, 2021

(86) PCT No.: PCT/US2021/052248

§ 371 (c)(1),
(2) Date: Mar. 23, 2023

(87) PCT Pub. No.: WO2022/067209

PCT Pub. Date: Mar. 31, 2022

(65) Prior Publication Data

US 2023/0274136 A1 Aug. 31, 2023

Related U.S. Application Data

(60) Provisional application No. 63/083,368, filed on Sep. 25, 2020.

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS 7,180,087 B1 * 2/2007 Loss ...................... H01F 1/408 257/E27.005
2008/0142787 A1 * 6/2008 Loss ...................... B82Y 10/00 257/E29.071

(Continued)

FOREIGN PATENT DOCUMENTS

WO 2022067209 A1 3/2022

OTHER PUBLICATIONS

Automated tuning of double quantum dots into specific charge states using neural networks Durer et. al. (Year: 2019).*

(Continued)

*Primary Examiner* — Mandrita Brahmachari
(74) *Attorney, Agent, or Firm* — Office of Chief Counsel for National Institute of Standards and Technology

(57) ABSTRACT

A ray-based classifier apparatus tunes a device using machine learning and includes: a machine learning module including a training data generator module and produces a device state; and the autotuning module including: a recognition module and a measurement module and that produces recognition data based on the device state and ray-based data; a comparison module that produces comparison data; a prediction module that produces prediction data for the device; a gate voltage controller that produces controller data and device control data and controls the device with the device control data; and a measurement module that produces ray-based data, such that the recognition module performs recognition on the ray-based data using the device state.

19 Claims, 39 Drawing Sheets

(56) References Cited

U.S. PATENT DOCUMENTS

| | | | | |
|---|---|---|---|---|
| 2018/0175241 | A1* | 6/2018 | Jain | H10D 62/814 |
| 2020/0342345 | A1* | 10/2020 | Farhi | G06N 3/063 |
| 2020/0365689 | A1* | 11/2020 | Wang | H10H 20/826 |
| 2021/0049482 | A1* | 2/2021 | Mezzacapo | G06N 5/04 |

OTHER PUBLICATIONS

Ray-based classification framework for high-dimensional data Justyna et. al. (Year: 2020).*

Auto-tuning of double dot devices in situ with machine learning Zwolak et. al. (Year: 2020).*

Machine learning techniques for state recognition and auto-tuning in quantum dots Kalantre et. al. (Year: 2018).*

Zwolak, J.P., et al., "QFlow lite dataset: A machine-learning approach to the charge states in quantum dot experiments", PLOS One, 2018, Accessed: Mar. 14, 2023, DOI: https://doi.org/10.1371/journal.pone.0205844.

Kalantre, S.S., et al., "Machine learning techniques for state recognition and auto-tuning in quantum dots", Quantum Information, 2019, Accessed: Mar. 14, 2023, DOI:https://doi.org/10.1038/s41534-018-0118-7.

Zwolak, J.P., et al., "Autotuning of Double-Dot Devices In Situ with Machine Learning", Physical Review Applied, 2020, p. 034075, vol. 13.

International Search Report from PCT/US2021/052248 file date Sep. 27, 2021.

* cited by examiner (a)
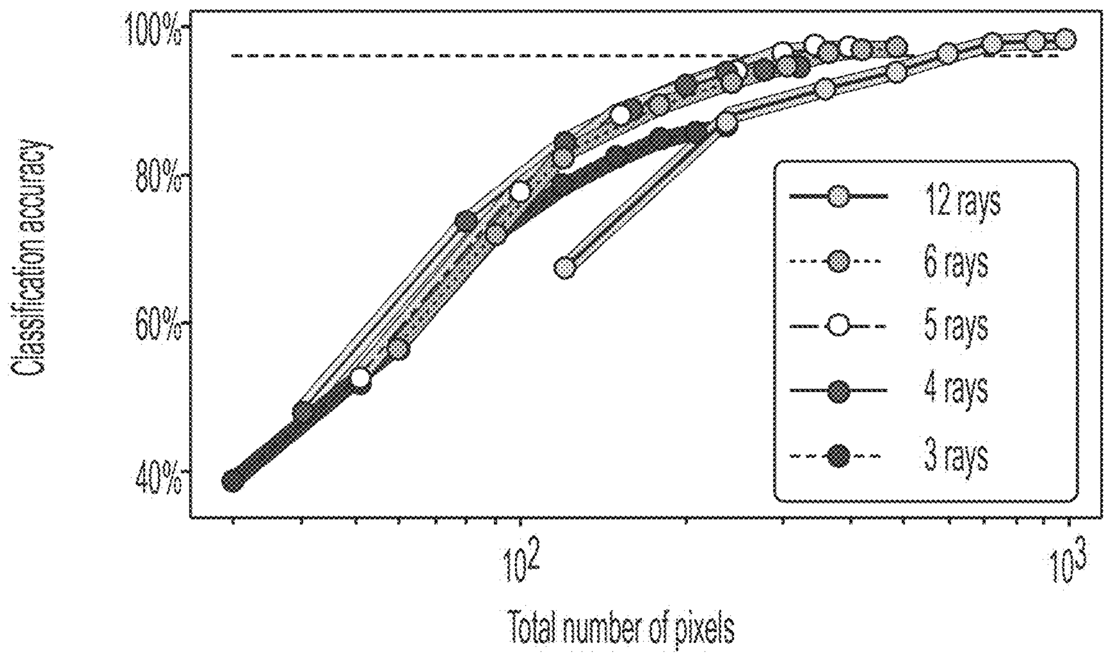
(b)
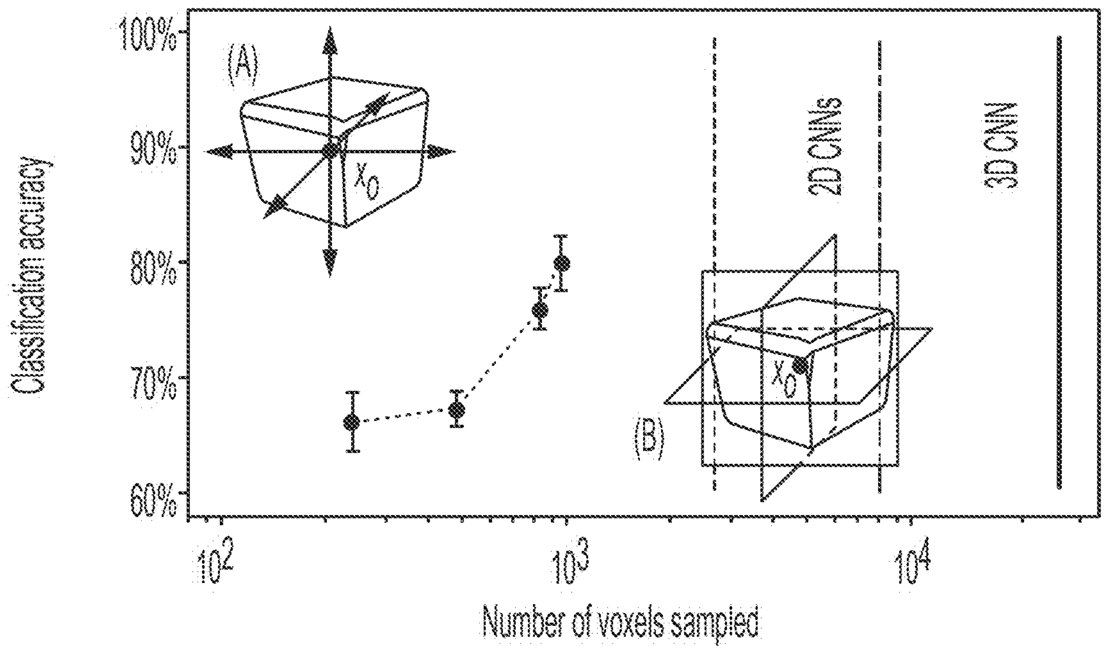
FIG. 13

Algorithm 1 Ray-based fingerprinting algorithm

Step 1. *Find M -projection centered at $x_0$ given r.*

Input: $x_0$ , $r$, a set $P$ of $M$ points on the $(N - 1)$-sphere
$m \leftarrow 1$; $R_M \leftarrow$ empty list
for $m = 1$ to $M$ do
    Find $m$-th ray $R_{x_0, x_f^m}$ and append it to the list $R_M$.
end for
Return: List of $M$ rays $R_M$.

Step 2. *Fingerprint $x_0 \in \mathbb{R}^N$ using rays in $R_M$ from Step 1.*

Input: $R_M$, $\gamma: \mathbb{R}^+ \rightarrow [0,1]$
$m \leftarrow 1$; $F_{x_0} \leftarrow$ empty list
for $m = 1$ to $M$ do
    Find the feature set $F_{x_0, x_f}$.
    if $F_{x_0, x_f^m} \neq \emptyset$ then
        Identify the critical feature $x_i^m$, find $W_{x_0, x_f^m}$ and append it to the list $F_{x_0}$.
    else
        Append 0 to the list $F_{x_0}$
    end if
end for
Return: The point fingerprint vector $F_{x_0}$.

FIG. 14

(a)
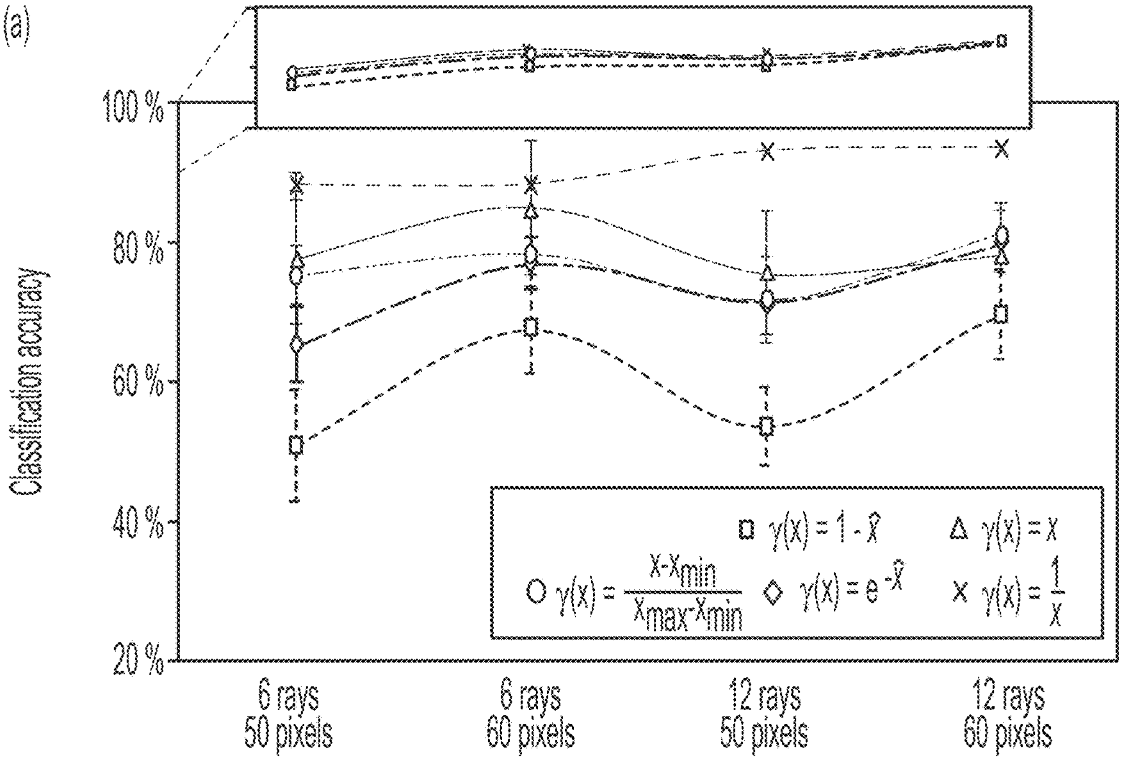
(b)
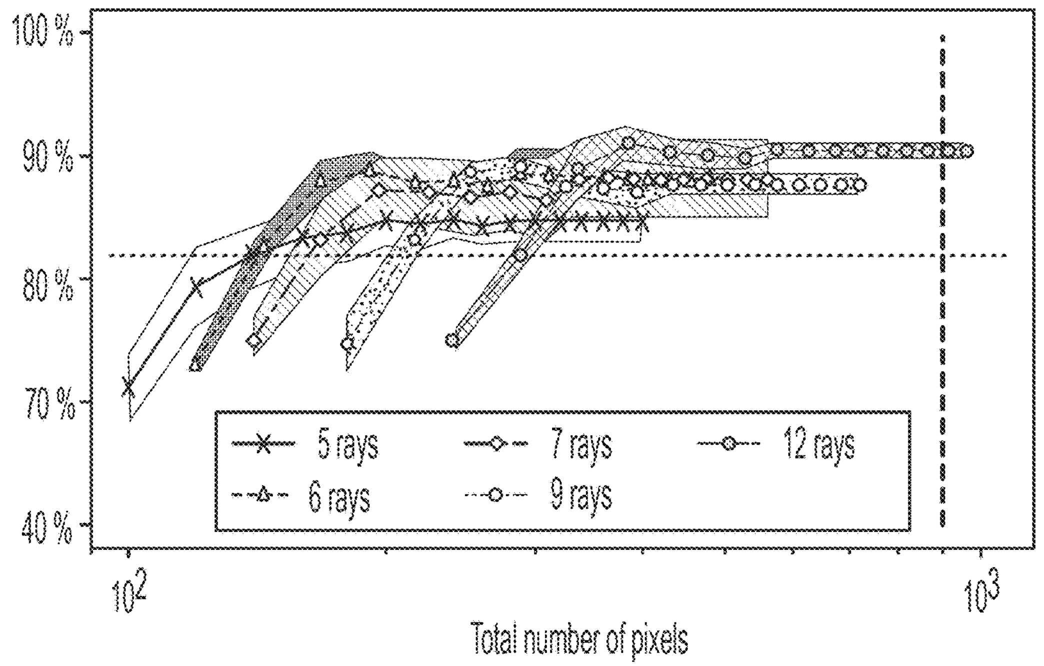
FIG. 16

(a)
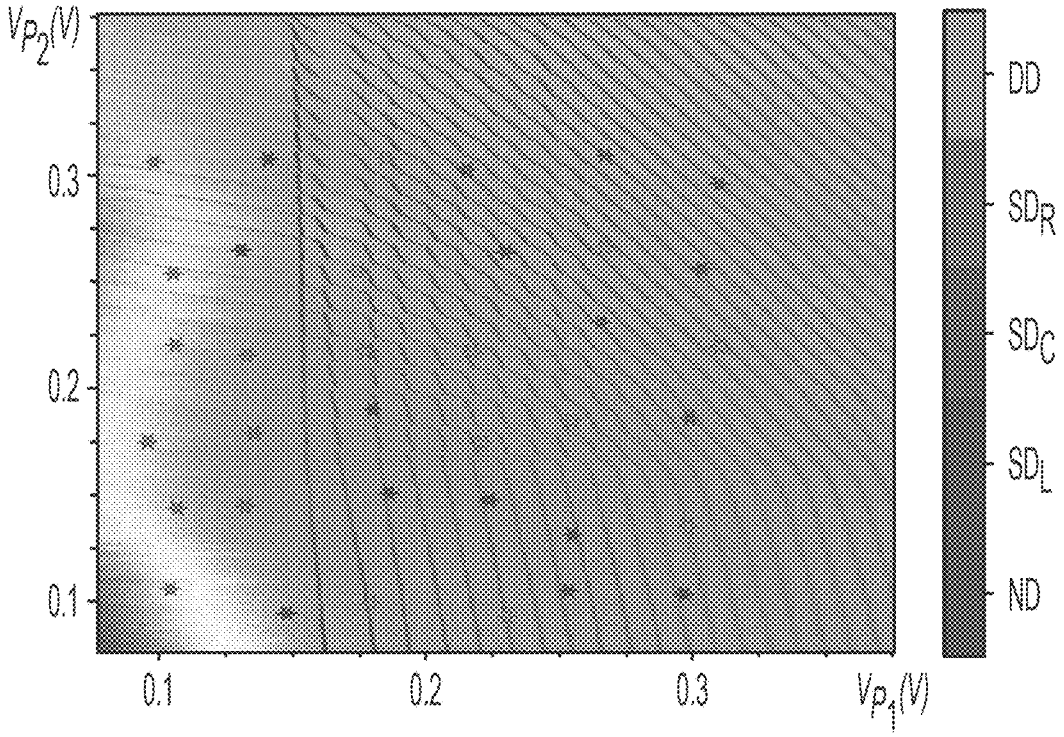
(b)
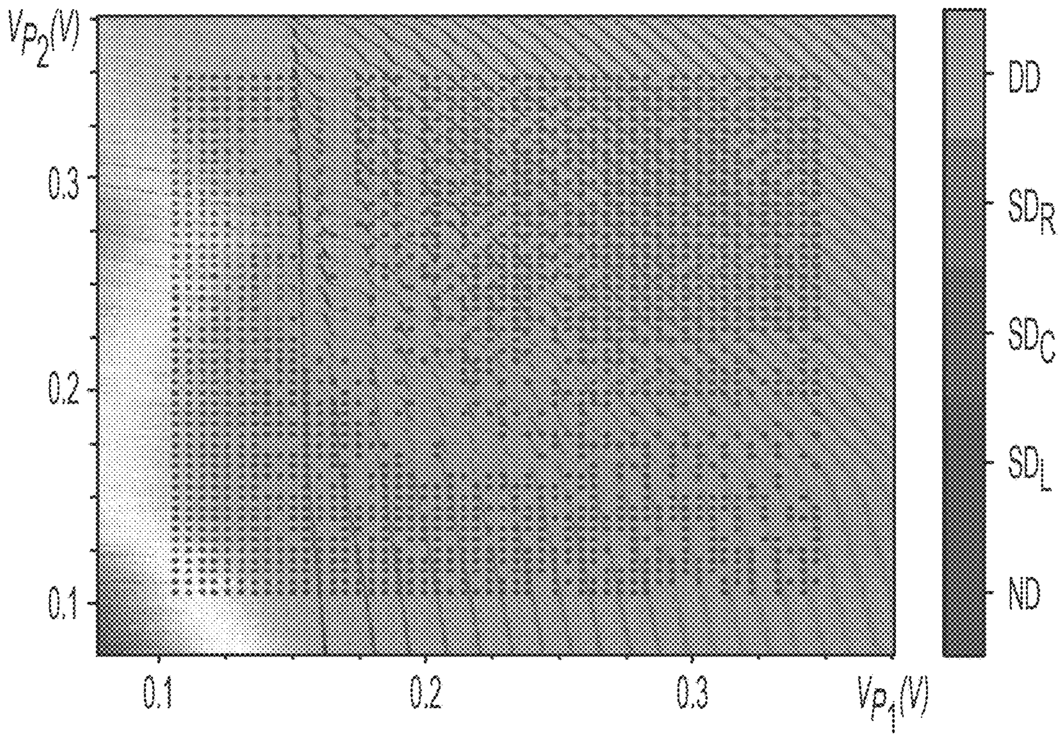
FIG. 17

| | 12 mV | | 22 mV | |
|---|---|---|---|---|
| *M* | Accuracy (%) | Δ(%) | Accuracy (%) | Δ(%) |
| 5 | 79.4(3.3) | 87 | 84.4(2.1) | 76 |
| 6 | 82.7(1.2) | 84 | 87.4(1.6) | 71 |
| 7 | 83.2(3.1) | 81 | 86.4(3.4) | 66 |
| 9 | 83.1(1.7) | 76 | 87.1(1.4) | 56 |
| 12 | 81.1(1.3) | 68 | 89.8(0.9) | 41 |

FIG. 19

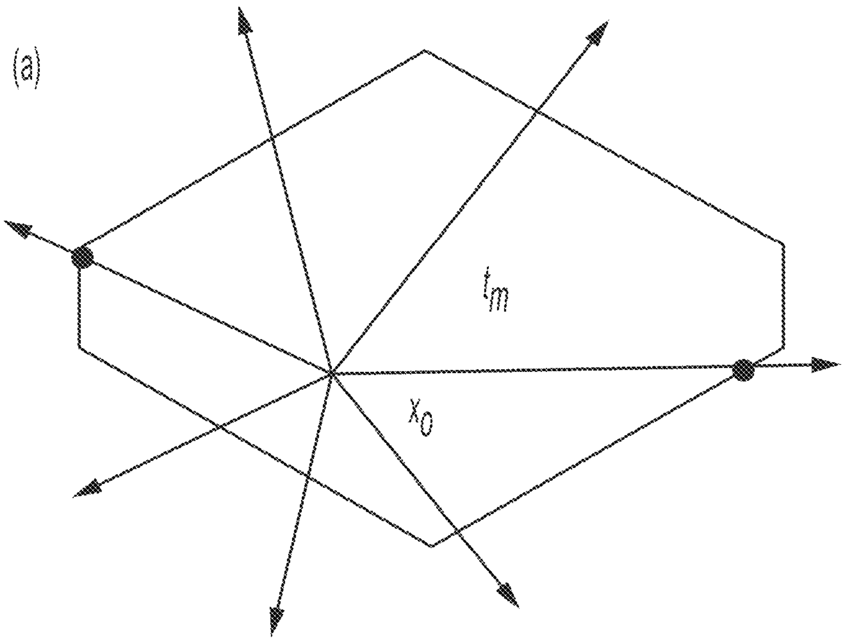
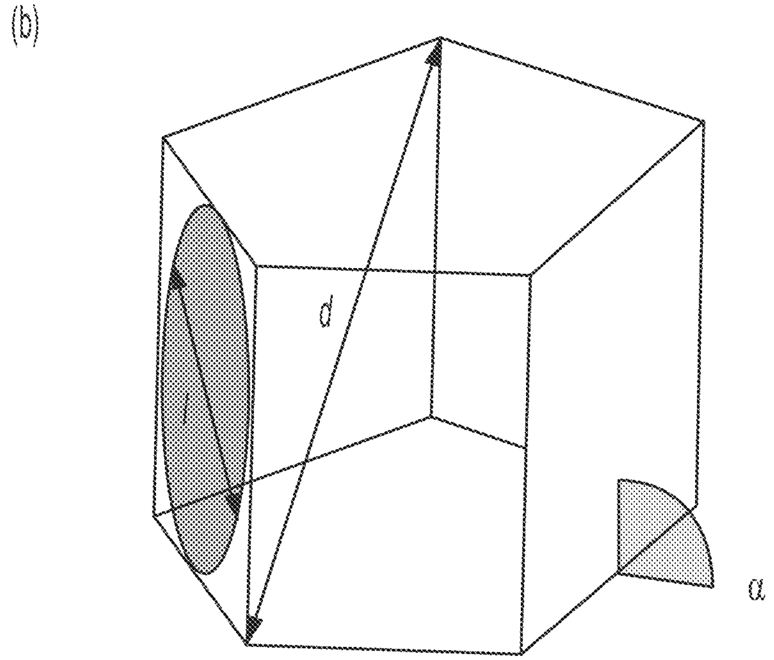
FIG. 20

(a)
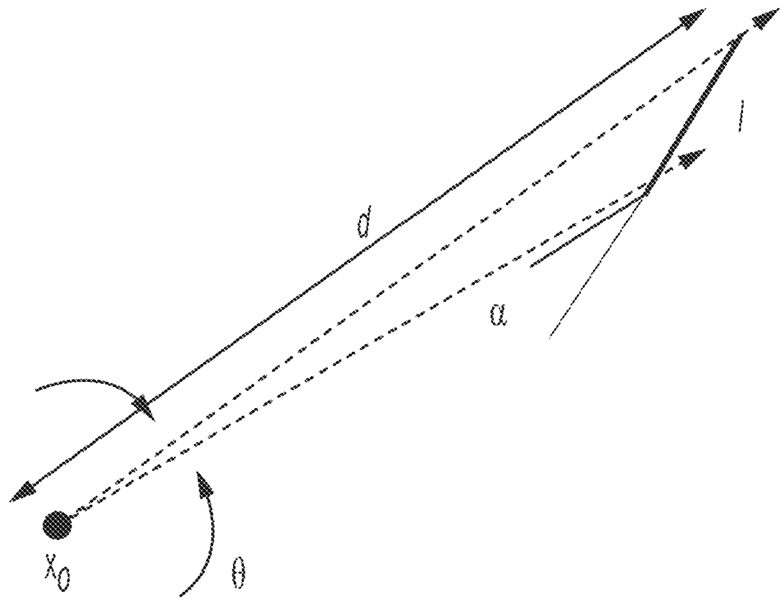
(b)
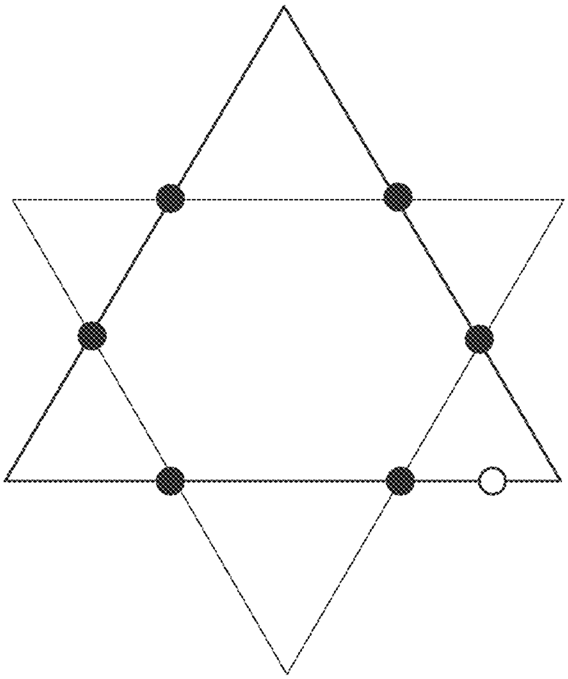
FIG. 21

| Parameter | Noiseless DSE | Noisy DSE | DQC |
|---|---|---|---|
| Conv. Layer 1 | (5 x 5) x 23, stride 2 | (7 x 7) x 22, stride 1 | (7 x 7) x 184, stride 1 |
| Dropout Layer 1 | 0.12 | 0.66 | 0.05 |
| Layer Norm. | yes | no | yes |
| Activation | ReLU | ReLU | Swish [44] |
| Conv. Layer 2 | (5 x 5) x 7, stride 2 | (7 x 7) x 22, stride 2 | (3 x 3) x 249, stride 1 |
| Dropout Layer 2 | 0.28 | 0.66 | - |
| Layer Norm. | yes | no | yes |
| Activation | ReLU | ReLU | Swish |
| Max Pool 1 | - | - | (2 x 2) x 1, stride 2 |
| Conv. Layer 3 | (5 x 5) x 18, stride 2 | (7 x 7) x 35, stride 1 | - |
| Dropout Layer 3 | 0.30 | 0.19 | - |
| Layer Norm. | yes | no | - |
| Activation | ReLU | ReLU | - |
| Conv. Layer 4 | - | (7 x 7) x 35, stride 2 | - |
| Dropout Layer 4 | - | 0.19 | - |
| Activation | - | ReLU | - |
| Ave. Pool | yes | yes | yes |
| Dense Layer 1 | - | - | 161 |
| Dropout Layer 5 | - | - | 0.6 |
| Outputs | 5 | 5 | 3 |
| Activation | softmax | softmax | softmax |
| Optimizier | Adam | Adam | Adam |
| Learning rate | $3.45 \times 10^{-3}$ | $1.21 \times 10^{-3}$ | $2.65 \times 10^{-4}$ |
| Loss | Cross-entropy | Cross-entropy | Cross-entropy |
| Trainable parameters | $7.99 \times 10^{3}$ | $1.23 \times 10^{5}$ | $4.63 \times 10^{5}$ |

FIG. 30

| $(V_{P_1}, V_{P_2})$ | $N_{exp}$ | $N_{suc}$ | $P_{\Delta=75}$ | $P_{\Delta=100}$ | $P_{\Delta=f(\delta 0)}$ |
|---|---|---|---|---|---|
| (250, 400) | 1 | 1 | 85.2 | 100.0 | 93.8 |
| (350, 400) | 6 | 6 | 74.1 | 95.1 | 95.1 |
| (350, 415) | 1 | 0 | 75.3 | 86.4 | 96.3 |
| (350, 425) | 1 | 1 | 55.6 | 86.4 | 85.2 |
| (350, 450) | 3 | 2 | 3.7 | 18.5 | 34.6 |
| (400, 350) | 1 | 1 | 4.9 | 69.1 | 93.8 |
| (450, 350) | 1 | 1 | 17.3 | 1.2 | 23.5 |

FIG. 34

| $(V_{P_1}, V_{P_2})$ | Δ=75 mV | Δ=100 mV | Δ=f(δ0) |
|---|---|---|---|
| (250, 400) | 12.7 (2.5) | 12.2 (2.0) | 12.6 (2.2) |
| (350, 400) | 14.0 (2.4) | 13.6 (2.2) | 13.5 (2.3) |
| (350, 415) | 13.2 (2.3) | 14.1 (2.1) | 13.4 (2.1) |
| (350, 425) | 12.9 (2.3) | 13.9 (2.1) | 13.6 (2.2) |
| (350, 450) | 11.6 (2.7) | 13.3 (2.4) | 13.9 (2.5) |
| (400, 350) | 13.9 (2.3) | 14.0 (2.2) | 13.3 (1.8) |
| (450, 350) | 14.5 (2.6) | 15.0 (2.6) | 15.0 (2.5) |

FIG. 39

RAY-BASED CLASSIFIER APPARATUS AND TUNING A DEVICE USING MACHINE LEARNING WITH A RAY-BASED CLASSIFICATION FRAMEWORK

CROSS REFERENCE TO RELATED APPLICATIONS

This application claims the benefit of U.S. Provisional Patent Application Ser. No. 63/083,368 (filed Sep. 25, 2020), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a ray-based classifier apparatus for tuning a device using machine learning with a ray-based classification framework, the ray-based classifier apparatus comprising: a machine learning module in communication with an autotuning module and that communicates a device state to the autotuning module, the machine learning module comprising: a training data generator module that produces fingerprint data; and a machine learning trainer module in communication with the training data generator module and that receives the fingerprint data from the training data generator module and produces the device state; and the autotuning module comprising: a recognition module in communication with the machine learning trainer module and a measurement module and that receives the device state from the machine learning trainer module, receives ray-based data from the measurement module, and produces recognition data based on the device state and the ray-based data; a comparison module in communication with the recognition module and that receives the recognition data from the recognition module and produces comparison data based on comparing the recognition data with a target state of the device; a prediction module in communication with the comparison module and that receives the comparison data from the comparison module and produces prediction data for the device based on the comparison data; a gate voltage controller in communication with the prediction module and the device and that receives the prediction data from the prediction module, produces controller data and device control data based on the prediction data, controls the device with the device control data, and communicates the controller data to a measurement module; and the measurement module in communication with the gate voltage controller, the device, and the recognition module and that receives the controller data from the gate voltage controller, receives device data from the device, produces ray-based data based on the controller data and the device data, and communicates the ray-based data to the recognition module, such that the recognition module performs recognition on the ray-based data using the device state, wherein the machine learning module and the autotuning module comprise one or more of logic hardware and a non-transitory computer readable medium storing computer executable code.

Disclosed is a process for tuning a device using machine learning with a ray-based classification framework and an autotuning module, the process comprising: generating, by a training data generator module using logic hardware, fingerprint data for the device; receiving, by a machine learning trainer module, the fingerprint data from the training data generator module; performing, by the machine learning trainer module using logic hardware, machine language training and producing a device state of the device from the fingerprint data; receiving, by a recognition module, the device state from the machine learning trainer module; recognizing, by the recognition module using logic hardware, the state of the device from the device state using a trained deep neural network and producing recognition data based on the device state; receiving, by a comparison module, the recognition data from the recognition module; comparing, by the comparison module using logic hardware, a target state of the device with the recognition data and producing comparison data as a result of the comparison; receiving, by a prediction module, the comparison data from the comparison module; producing, by the prediction module using logic hardware, prediction data based on the comparison data; receiving, by a gate voltage controller, the prediction data from the prediction module; producing, by the gate voltage controller using logic hardware, controller data and device control data based on the prediction data; receiving, by the device, the device control data from the gate voltage controller, controlling the device with the device control data to modify the state of the device, and producing device data in response to controlling the device with the device control data; receiving, by a measurement module, the controller data from the gate voltage controller and device data from the device; producing, by the measurement module using logic hardware, ray-based data based on the controller data and the device data; and receiving, by the recognition module, the ray-based data from the measurement module and performing recognition on the ray-based data using the device state from the machine learning trainer module.

Disclosed is a process for tuning a device using machine learning with a ray-based classification framework and action-based navigator module, the process comprising: generating, by a training data generator module using logic hardware, fingerprint data for the device; receiving, by a machine learning trainer module, the fingerprint data from the training data generator module; performing, by the machine learning trainer module using logic hardware, machine language training and producing a device state of the device from the fingerprint data; setting, by a charging module using logic hardware, the charging energy for each quantum well of the device and defining a state action for each of the quantum wells by sending charging data to the device using logic hardware; acquiring, by a data acquisition module using logic hardware, state data from the device for a selected state recognizer; receiving, by a data checker module in communication with the data acquisition module, the state data from the data acquisition module and checking quality of the state data; and receiving, by a state estimator module in communication with the data checker module and the machine learning trainer module, the state data from the data checker module and the device state from the machine learning trainer module; estimating, by the state estimator module using logic hardware, the state of the device, determining whether to tune the device based on the state data relative to an estimation for the state of the device, and producing charging data and tuning the device according to the charging data based on the number of quantum dots of the device.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

FIG. 13 shows classifier performance for varying numbers of rays as a function of the total number of (a) pixels measured and averaged over N=50 training runs for the double-dot system and (b) voxel number averaged over N=10 training runs for the triple-dot system. The black dashed line in (a) represents a benchmark. The black vertical lines in (b) represent the minimum data requirements for CNN classifier with 3 orthogonal 2D slices (as depicted in insert (B), dotted line), large 2D scan (dashed line), and a full 3D CNN (solid line). Insert (A) shows the M-projection with 6 rays. In both panels, the connecting lines are a guide to the eye only and the 3 confidence bands, according to Example 1.

FIG. 14 shows an exemplary algorithm for ray-based fingerprinting, according to Example 1.

FIG. 16 shows (a) classifier performance for various weight functions γ(x) and for different numbers of rays and ray lengths using off-line experimental data (averaged over N=20 models). The inset at the top shows the performance on simulated data. (b) Classifier performance for different numbers of rays as a function of the total number of pixels measured for off-line experimental data (averaged over N=20 models). The dotted black horizontal line represents a benchmark, while the dashed vertical line represents the minimum data requirement for a CNN classifier. In both panels, the connecting lines are a guide. The error bars (a) and bands (b) correspond to one standard deviation, according to Example 2.

FIG. 17 shows a scatter plot showing the performance of the ray-based classifier on live data (a) and off-line (b) using six rays of length 22 mV (44 pixels) overlaying a sample measured raw scan. Colors on both plots correspond to the state predicted by the RBC. The gray points indicate M-projections that are determined as poorly charge sensed and thus are inappropriate for classification, according to Example 2.

FIG. 19 shows lists performance for five M-projections for rays of length 12 and 22 mV. The accuracy is averaged over N=20 models and the data reduction Δ indicates the expected reduction in the number of measured points needed for classification compared with the CNN-based approach, according to Example 2.

FIG. 20 shows (a) a sample polygon with 7 evenly spaced rays based at xo, with tm denoting the distance from xo to the polygon edge ∂Q. (b) A depiction of a minimum interior diameter of a face l, the minimum exterior dihedral angle α, and the maximum possible polytope diameter d for a sample polytope in $R^3$, according to Example 3.

FIG. 21 shows (a) angular span, θ (marked with curved arrows). (b) Ambiguity be-tween a polygon Q (solid black) and its dual Q* (dashed gray), resolved with a single additional intersection point marked in red, according to Example 3.

FIG. 30 shows machine learning model architectures for the noiseless DSE, noisy DSE, and DQC module, according to Example 4.

FIG. 34 shows a summary of the performance for the experimental test runs (Ntot=14). Nexp denotes the number of experimental runs initiated at position (VP1, VP2) (mV), Nsuc indicates the number of successful experimental runs, and PD=75(%), PD=100(%), and PD=f (δ0) (%) are the success rates for the 81 test runs with optimization parameters resembling the experimental configuration (fixed simplex size D=75 mV), with the initial simplex size increased to 100 mV, and with initial simplex size dynamically adjusted based on the fitness value of the first scan, respectively. All test runs are performed using the new neural network, according to Example 5.

FIG. 39 shows an average (standard deviation in parentheses) number of iterations when tuning off-line for varying configurations of the initial simplex D. In all cases, the average is taken over N=81 test runs for points sampled within 10 mV around each experimentally tested point given by (VP1, VP2), according to Example 5.

DETAILED DESCRIPTION

Figure 1:
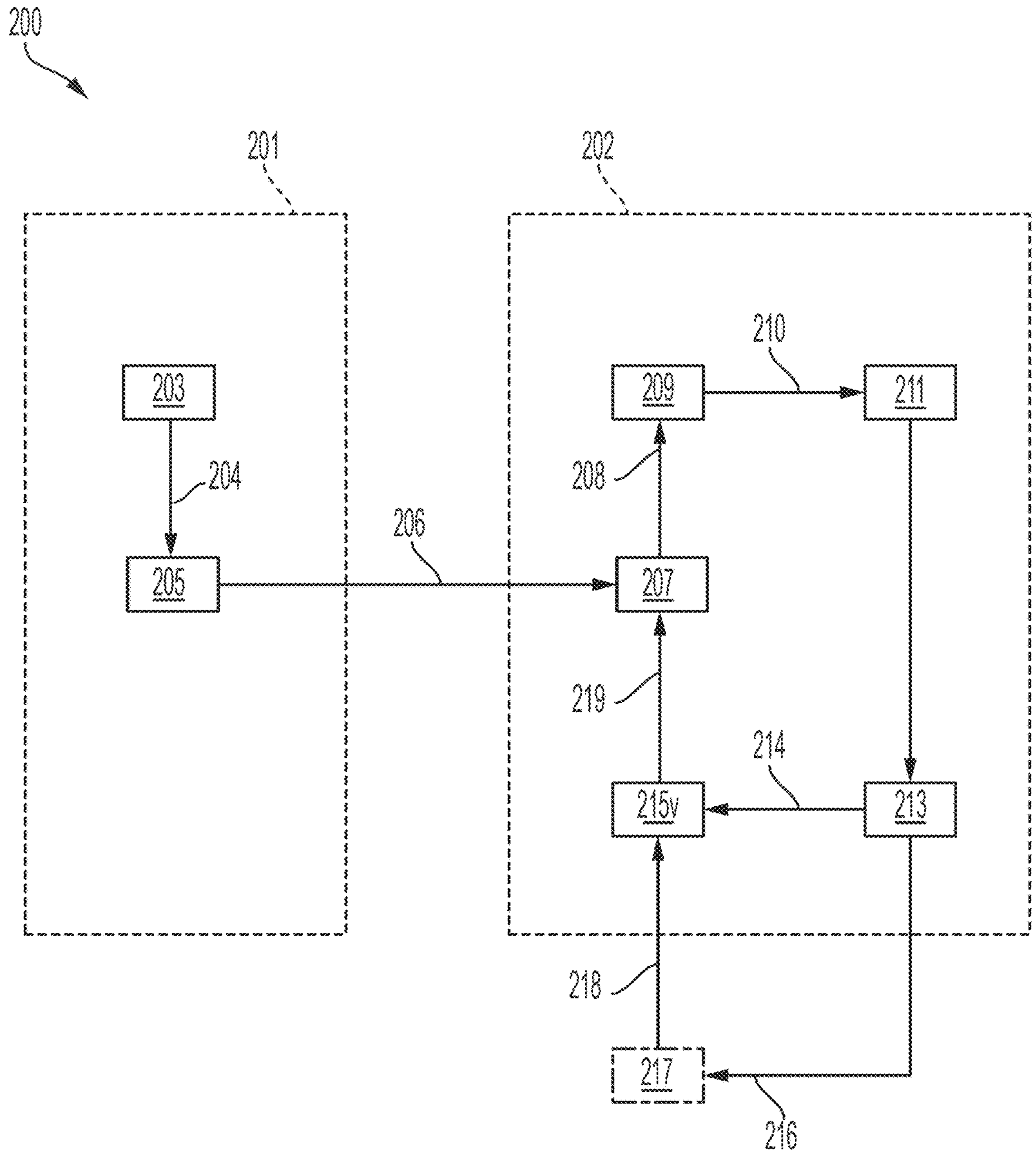
FIG. 1 shows a ray-based classifier apparatus, according to some embodiments.

A detailed description of one or more embodiments is presented herein by way of exemplification and not limitation.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, and the like), or an embodiment combining software and hardware aspects that may generally be referred to herein as a "circuit." "module," or "system." Furthermore, aspects of the present disclosure may take the form of a computer program product embodied in one or more computer readable storage media having computer readable program code embodied thereon.

Many of the functional units described in this specification have been labeled as modules, to more particularly emphasize their implementation independence. For example, a module may be implemented as a hardware circuit including custom VLSI circuits or gate arrays, off-the-shelf semiconductors such as logic chips, transistors, or other discrete components. A module can be implemented in programmable hardware devices such as field programmable gate arrays, programmable array logic, programmable logic devices, or the like.

Modules also can be implemented in software for execution by various types of processors. An identified module of executable code may, e.g., include one or more physical or logical blocks of computer instructions that can, e.g., be organized as an object, procedure, or function. Nevertheless, the executables of an identified module need not be physically located together but can include disparate instructions stored in different locations that, when joined logically together, include the module and achieve the stated purpose for the module.

Indeed, a module of executable code can be a single instruction, or many instructions, and can be distributed over several different code segments, among different programs, or across several memory devices. Similarly, operational data can be identified and illustrated herein within modules, and can be embodied in any suitable form and organized within any suitable type of data structure. The operational data can be collected as a single data set or can be distributed over different locations including over different storage devices and can exist, at least partially, as electronic signals on a system or network. Where a module or portions of a module are implemented in software, the software portions are stored on one or more computer readable storage media. It should be appreciated that a executable code can be implemented in logical hardware that includes applicable circuit elements and communication media.

Any combination of one or more computer readable storage media can be used. A computer readable storage medium can be, e.g., but not limited to, an electronic, magnetic, optical, electromagnetic, infrared, or semiconductor system, apparatus, or device, or any suitable combination of the foregoing or elements known in the art.

Exemplary computer readable storage medium can include the following, a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium can be any tangible medium that can contain or store a program for use by or in connection with an instruction execution system, apparatus, or device.

Computer program code for carrying out operations for aspects of the present disclosure can be written in any combination of one or more programming languages, including an object oriented programming language such as Java, Python. C++, or the like and conventional procedural programming languages, such as the “C” programming language or similar programming languages. The program code can execute entirely on the users computer, partly on the user’s computer, as a stand-alone software package, partly on the users computer and partly on a remote computer or entirely on the remote computer or server. In the latter scenario, the remote computer may be connected to the user’s computer through any type of network, including a local area network (LAN) or a wide area network (WAN), or the connection can be made to an external computer, e g, through the Internet using an Internet Service Provider.

Furthermore, the described features, structures, or characteristics of the disclosure can be combined in any suitable manner in one or more embodiments. In the following description, numerous specific details are provided, such as examples of programming, software modules, user selections, network transactions, database queries, database structures, hardware modules, hardware circuits, hardware chips, and the like, to provide a thorough understanding of embodiments of the disclosure. However, the disclosure can be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams or schematic block diagrams of methods, apparatuses, systems, and computer program products according to embodiments of the disclosure. It will be understood that each block of the schematic flowchart diagrams or schematic block diagrams and combinations of blocks in the schematic flowchart diagrams or schematic block diagrams can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, implement the functions or acts specified in the schematic flowchart diagrams or schematic block diagrams block or blocks.

These computer program instructions can be stored in a computer readable storage medium that can direct a computer, other programmable data processing apparatus, or other devices to function in a particular manner, such that the instructions stored in the computer readable storage medium produce an article of manufacture including instructions that implement the function or act specified in the schematic flowchart diagrams or schematic block diagrams block or blocks.

The computer program instructions can be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions or acts specified in the flowchart or block diagram block or blocks.

The schematic flowchart diagrams or schematic block diagrams in the Figures illustrate architecture, functionality, and operation of possible implementations of apparatuses, systems, methods, and computer program products according to various embodiments of the present disclosure. In this regard, each block in the schematic flowchart diagrams or schematic block diagrams can represent a module, segment, or portion of code, which includes one or more executable instructions for implementing the specified logical function(s).

It should also be noted that, in some alternative implementations, the functions noted in the block may occur out of the order noted in the Figures. For example, two blocks shown in succession can be executed substantially concurrently, or the blocks sometimes can be executed in the reverse order, depending upon the functionality involved. Other steps and methods can be conceived that are equivalent in function, logic, or effect to one or more blocks, or portions thereof, of the illustrated Figures.

Although various arrow types and line types may be employed in the flowchart or block diagrams, they are understood not to limit the scope of the corresponding embodiments. Indeed, some arrows or other connectors can be used to indicate the logical flow of the depicted embodiment. For instance, an arrow may indicate a waiting or monitoring period of unspecified duration between enumerated steps of the depicted embodiment. It will also be noted that each block of the block diagrams or flowchart diagrams, and combinations of blocks in the block diagrams or flowchart diagrams, can be implemented by special purpose hardware-based systems that perform the specified functions or acts or combinations of special purpose hardware and computer instructions.

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech or speech recognition.

An exemplary type of machine learning algorithm is a neural network. There are many types of neural networks: a simple type of neural network is a feedforward network. A feedforward network can be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., fed forward) to the nodes of the output layer via an activation function that calculates the states of the nodes of each successive layer in the network based on coefficients (weights) that are respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the correct labeled output for that instance, an error signal representing the difference between the output and the labeled output is calculated, and the weights associated with the connections are adjusted to minimize that error as the error signal is backward propagated through the layers of the network. The network is considered trained when the errors for each of the outputs generated from the instances of the training data set are minimized.

The accuracy of a machine learning algorithm can be affected significantly by the quality of the data set used to train the algorithm. The training process can be computationally intensive and can involve a significant amount of time on a conventional general-purpose processor Accordingly, parallel processing hardware is used to train many types of machine learning algorithms. This can be particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 7:
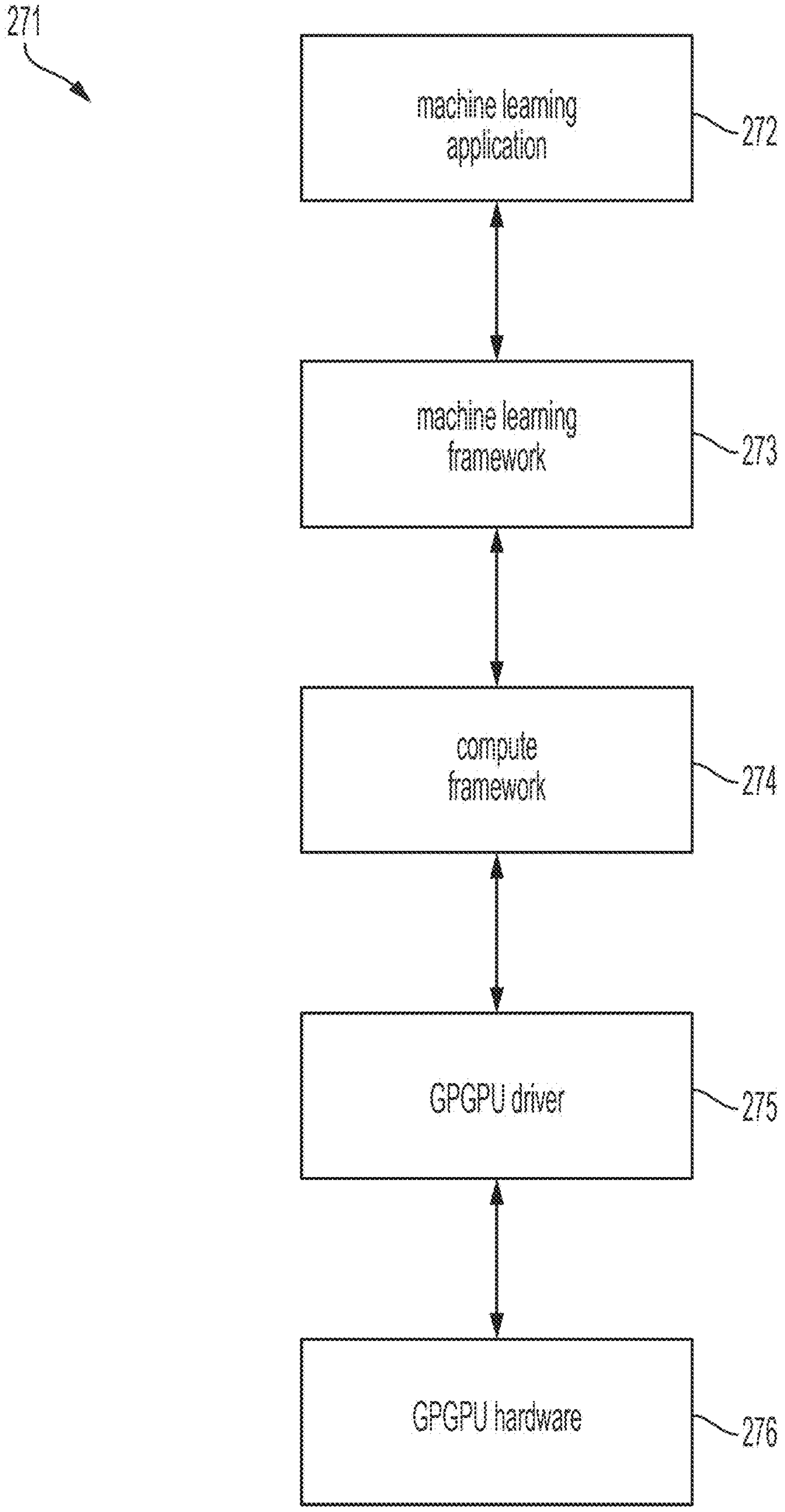
FIG. 7 shows a machine learning software stack, according to some embodiments.

FIG. 7 is a diagram of machine learning software stack 271. Machine learning application 272 can be configured to train a neural network using a training dataset or to use a trained deep neural network to implement machine intelligence. Machine learning application 272 can include training and inference functionality for a neural network or specialized software that can be used to train a neural network before deployment. Machine learning application 272 can implement any type of machine intelligence including but not limited to image recognition, mapping and localization, autonomous navigation, speech synthesis, medical imaging, or language translation.

Hardware acceleration for machine learning application 272 can be enabled via machine learning framework 273. Machine learning framework 273 can provide a library of machine learning primitives. Machine learning primitives are basic operations that are commonly performed by machine learning algorithms. Without machine learning framework 273, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by machine learning framework 273. Exemplary primitives include tensor convolutions, activation functions, and pooling, which are computational operations that are performed while training a convolutional neural network (CNN). Machine learning framework 273 can provide primitives to implement basic linear algebra subprograms performed by many machine-learning algorithms, such as matrix and vector operations.

Machine learning framework 273 can process input data received from machine learning application 272 and generate the appropriate input to compute framework 274. Compute framework 274 can abstract the underlying instructions provided to GPGPU driver 275 to enable machine learning framework 273 to take advantage of hardware acceleration via GPGPU hardware 276 without requiring machine learning framework 273 to have intimate knowledge of the architecture of GPGPU hardware 276. Additionally, compute framework 274 can enable hardware acceleration for machine learning framework 273 across a variety of types and generations of GPGPU hardware 276.

The computing architecture provided by embodiments described herein can be configured to perform the types of parallel processing that is particularly suited for training and deploying neural networks for machine learning. A neural network can be generalized as a network of functions having a graph relationship. A variety of types of neural network implementations are used in machine learning. An exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications. The nodes in the CNN input layer can be organized into a set of filters (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output can be referred to as the feature map. For example, the input to a convolution layer can be a multidimensional array of data that defines the various components, e.g., colors or contrasts, of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful in dynamical systems where the state of the system changes, such as for language processing due to the variable nature in which language data can be composed.

The figures described below include a general process for respectively training and deploying various types of networks. It will be understood that these descriptions are exemplary and non-limiting as to any specific embodiment described herein, and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, and the like) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

In some embodiments, a device is tuned to form quantum dots having a selected electron occupancy. Such a device with selectively tailorable arrangements of quantum dots that are addressed via gate electrodes under control of individual gate electrodes potentials can be used in quantum computing. In quantum computing, there is a need for means for controlling and coupling of single charges and spins, for which processes and articles described herein provide.

Figure 8:
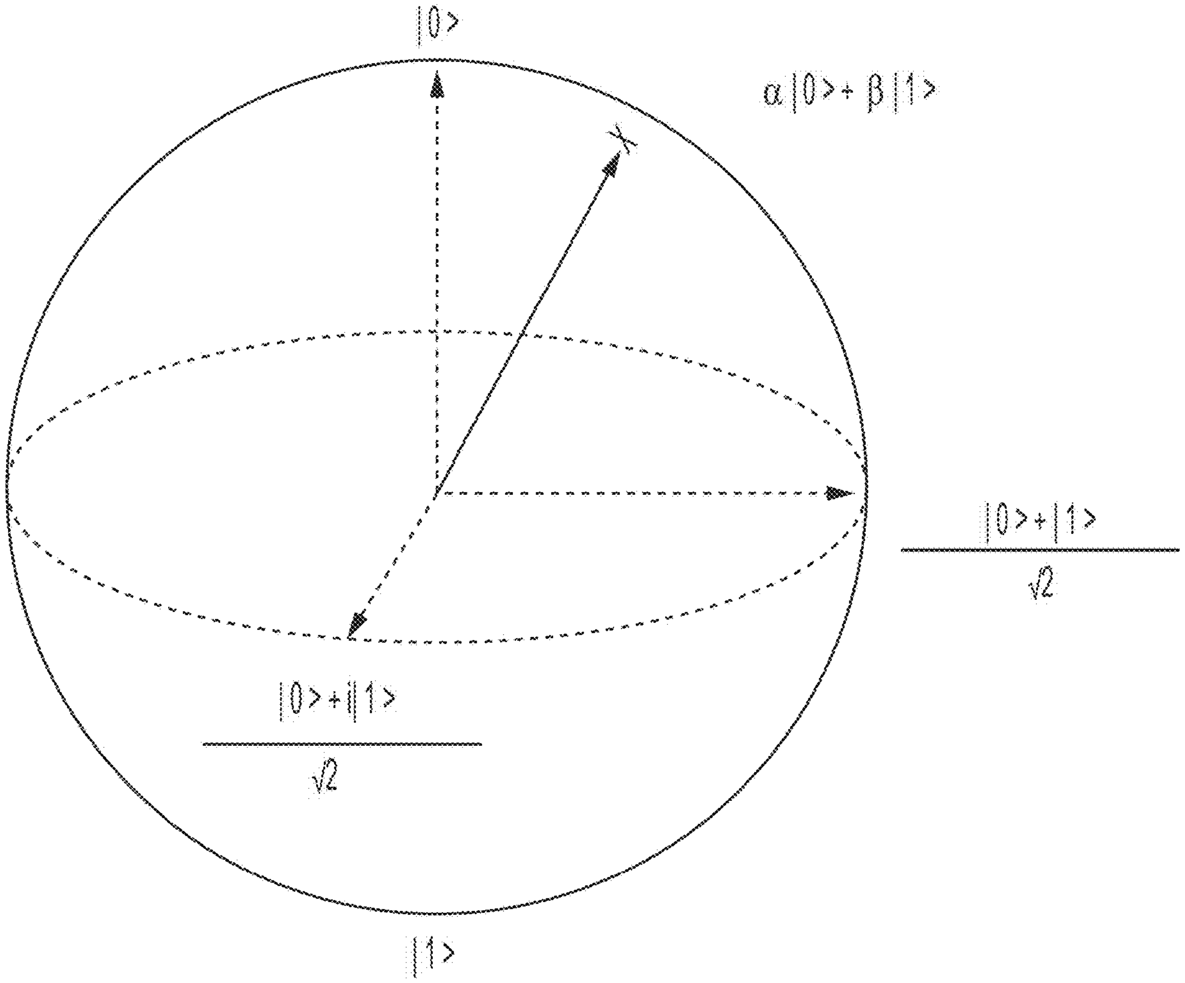
FIG. 8 shows a Bloch sphere indicating possible states of a qubit as points on its surface. The arrow pointing to a cross on the surface of the sphere represents an arbitrary superposition of the basis states 0 and 1, according to some embodiments.

For encoding and manipulation of quantum information, what is required is confinement of single electrons. The spin degree of freedom of the electron provides a natural two-level quantum system to encode the information in the form of a quantum bit (qubit), the fundamental unit of quantum information. In this case, the qubit includes a spin up state (state 0), a spin down state (state 1), and interim states that are a superposition of both the spin up and spin down states at the same time. The states of a qubit can be represented as points on the surface of a sphere (the Bloch sphere) as shown in FIG. 8.

Of the variety of approaches to confining electron spins, confinement of a single electron spin in solid-state is sought with the goal of integration with solid-state (micro-) electronics. A quantum dot (QD) provides such confinement by using, in some implementations, electric control gates on a semiconductor substrate. Frequently used substrates include silicon (Si), aluminum gallium arsenide heterostructures (AlGaAs/GaAs), silicon germanium heterostructures (Si/SiGe), and indium arsenide (InAs).

Figure 9:
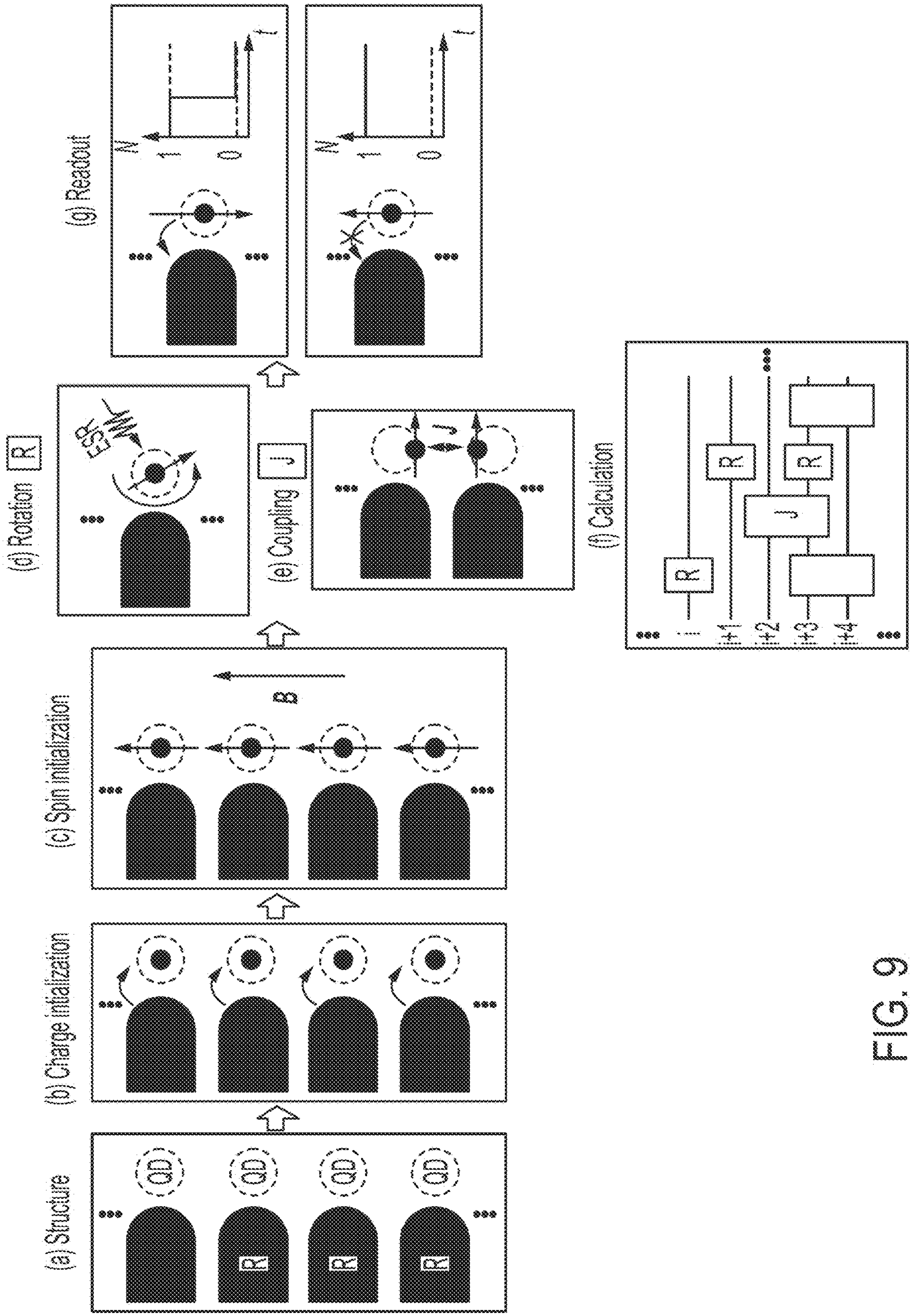
FIG. 9 shows: (A) a quantum dot array of a quantum processing unit before initialization in accordance with a standard sequence for quantum computation; (B) charge initialization of a quantum dot array of a quantum processing unit in accordance with a standard sequence for quantum computation; (C) spin initialization of a quantum dot array of a quantum processing unit in accordance with a standard sequence for quantum computation; (D) electron spin rotation R of an electron trapped in a quantum dot of a quantum processing unit with an ESR pulse, in accordance with a standard sequence for quantum computation; (E) exchange coupling J of two electron spins by exchange interaction in two adjacent quantum dots of a quantum processing unit in accordance with a standard sequence for quantum computation; (F) quantum computation decomposed into a specific sequence of electron spin rotations R and exchange coupling J acting on an array of qubits, represented as horizontal wires labeled i; and (G) electron spin readout using spin-dependent tunneling, according to some embodiments. Top of panel G corresponds to the case where the spin orientation of the electron does allow tunneling to the reservoir, and bottom of panel G corresponds to the case where the spin orientation of the electron does not allow tunneling to the reservoir.

Quantum computation can be performed with spin qubits from a plurality of quantum dots. Quantum computation is generally represented as a sequence of operations involving precise functionalities from a physical circuit. A sequence is represented in FIG. 9 for a circuit that includes single electron spin qubits with quantum dots.

An array of quantum dots (QDs) is used, and in some implementations their reservoir (R), like in FIG. 9*a*. Then, each quantum dot is initialized with one electron from its reservoir as in FIG. 9*b*. Detecting the charge occupation of the QD can be achieved by counting electrons with a proximal charge sensor, e.g., quantum point contacts, single electron transistors (SET), or capacitively coupled electrodes.

The next part is initializing qubits to a known state. It is performed in some implementations by applying an external magnetic field to polarize the spins, as in FIG. 9*c*. Once spins are initialized, an actual computation can begin. A computation can be executed by an adequate combination of single spin rotations (R) and exchange coupling between neighboring spins (J) (FIG. 9*f*). Arbitrary single spin rotations are generally realized with the application of electron spin resonance (ESR) pulses (FIG. 9*d*). Being a very short range interaction, the exchange coupling is turned on and off by modulating the tunnel barrier between adjacent quantum dots (FIG. 9*e*).

A readout of some or all of the qubits determines the result of a quantum calculation. In some implementations, this can be obtained by spin dependent tunneling to the reservoir, where the electron occupation in the dot remains one if the spin is up, and becomes zero if the spin is down. The change in occupation is detected by charge sensing (FIG. 9*g*).

Control of coherent electron spin states in quantum dots can be limited by short coherence times due to a short stability of the superposition state. In this sense, qubits are fragile entities. The challenge is to protect the state of a qubit from the surrounding environment long enough to achieve a sufficient number of logic operations on the quantum state for useful calculations. In order to achieve this feat, the surrounding environment is controlled. Isotopically enriched $^{28}$Si substrates can provide sufficiently long coherence times for robust quantum computing with spin qubits in quantum dots.

Figure 10:
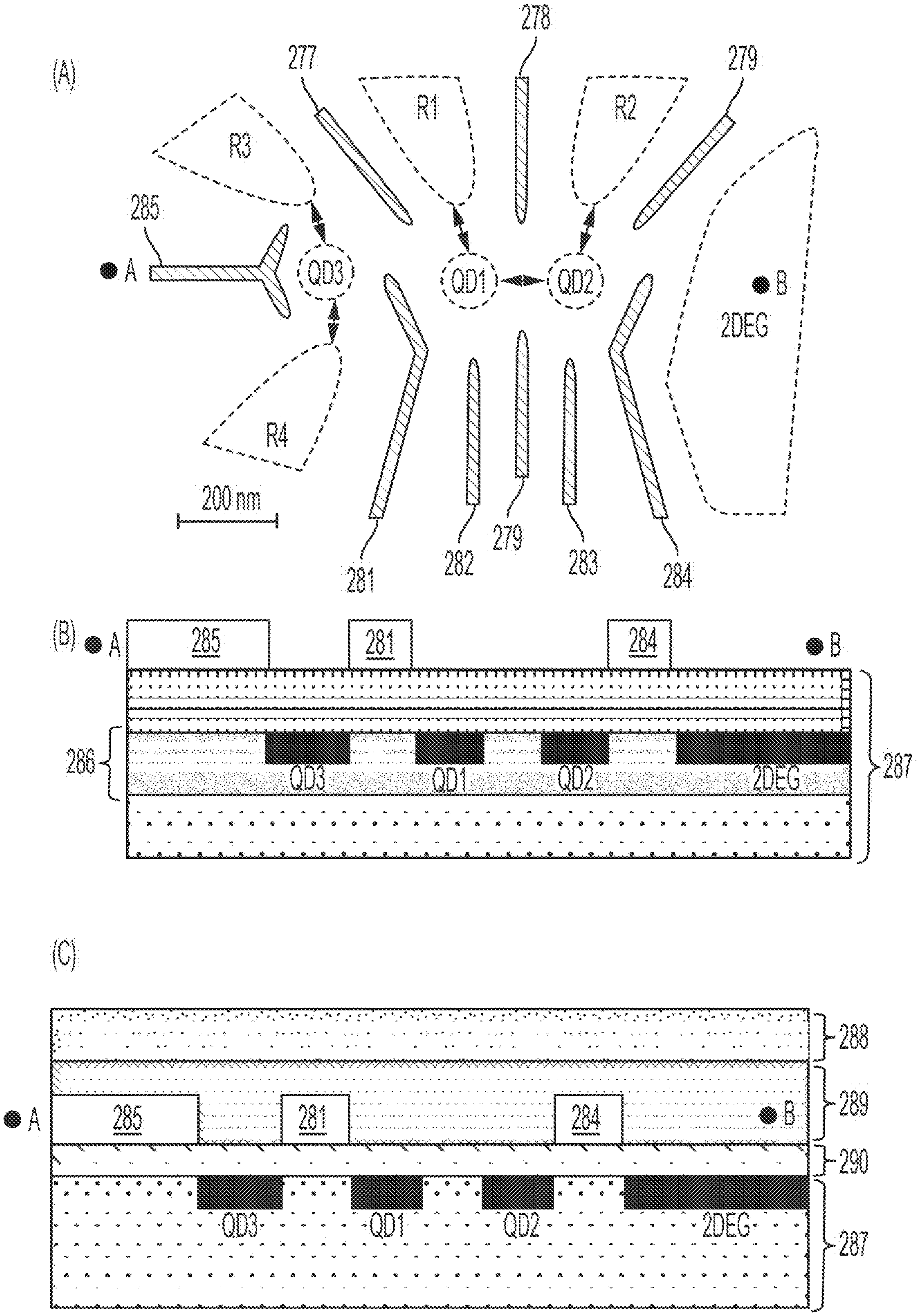
FIG. 10 shows: (A) a dual quantum dot; (B) a cross-sectional view through a layer structure of a dual quantum dot implementation shown in panel A; and (C) a cross-sectional view through a layer structure of another implementation of a quantum dot with a global accumulation gate, according to some embodiments.

Architectures for quantum dots include arena designs and local accumulation designs. Arena designs rely on electrostatic gates to deplete regions of a two-dimensional electron gas (2DEG), formed by an heterostructure or by a global accumulation gate. FIG. 10A is an exemplary configuration for electrostatic gates (dashed structures) that define two quantum dots, QD1 and QD2, that are tunnel coupled to each other and to reservoirs R1 and R2. A nearby single electron transistor (SET) formed by reservoir R3, QD3 and reservoir R4 is used as a charge sensor of the Double-Quantum-Dot (DQD). Barrier gates 277, 278, and 279 control the tunnel barriers between the reservoirs and the dots, represented by the double arrows. Barrier gates 278 and 280 control the tunnel barrier between the dots, also represented by arrows. Confinement gates 281 and 284 define the size of quantum dots. Plunger gates 282 and 283 set QD1 and QD2 charge states. Gate 285 sets the tunnel barriers and the charge state of the SET. The region labeled 2DEG represents electrons not confined by the gates. The scale bar indicates typical structure dimension in GaAs devices.

FIG. 10B shows a cross section of the arena device in FIG. 10A, following a section along the points A and B in FIG. 10A. The 2DEG is formed in the quantum well layer 286 of the heterostructure 287. The depletion gates, such as 285, 281, and 284, deplete regions of the 2DEG to form the quantum dots QD3, QD1 and QD2. FIG. 10C shows a cross section of a device employing a global top gate 288 to create the 2DEG. The depletion gate layout is similar to the one of the device in FIG. 10A. A dielectric layer 289 isolates the depletion gates such as 285, 281, and 284, from the global top gate. Layer 290 is the gate oxide that isolates the 2DEG from the gates.

In local accumulation designs, dots or reservoirs can be formed directly by local accumulation gates instead of a combination of a global accumulation gate and electrostatic gate areas. Additional gates increase the confinement of accumulated regions and control the tunnel barriers. Here, the quantum dot well can be provided using an accumulation gate, while the reservoir can be provided using a depletion mode tunnel barrier gate and confinement in the well is enhanced using various depletion mode gates.

It has been discovered that ray-based classifier apparatus and tuning a device using machine learning with a ray-based classification framework provide a machine learning algorithm trained on a dataset of simulated measurements of the device that includes a plurality of quantum dot can tune the device to operate for single- and few-electron configurations. In this respect, a deep neural network-based classification framework uses a minimal collection of one-dimensional measurements, referred to as rays, initiated at a given point to make a fingerprint of the device's state. The ray-based classifier apparatus and tuning the device substantially reduce the time and number of measurements to characterize the state's device when compared to conventional two-dimensional scans. In an aspect, the training dataset is generated using a selected physical model to create qualitative agreement. The physical model can be a Thomas-Fermi based electron density model. By varying the defining physical parameters in this model, a range of possible experimental configurations and realizations is sampled, making the classifier device agnostic. This trained system is then used to identify and tune real-world devices.

The ray-based classifier apparatus and tuning use a framework for assessing the state of multi-parameter devices that combine reduced measurements (i.e., ray-based measurements) with artificial intelligence (AI). The state recognition framework is based on a deep neural network trained on geometric information extracted from the ray-based measurements and simulations of the target physical system. This information, in combination with an optimization algorithm, allows us to tune the device state to specified, useful parameter regimes.

For quantum dot-based devices, measurements of QD states can be represented visually as various shapes in the N-dimensional space, where the response variable peaks at the boundaries of the shapes (corresponding to changes in the occupation of the QDs). Here, N is the number of electrostatic gates that define the QDs. The specific geometry of these shapes corresponds to the number of populated QDs, which is valuable information in the process of tuning a QD system. For the simple case of double QD devices, the states are characterized by a series of parallel lines of certain angularity (when only a single dot is formed), honeycomb-like shapes (when two coupled dots are formed), or a lack of regular curvatures (when no dot is formed). For devices with more dots, the states are characterized by different bounded and unbounded polytopes in the N-dimensional space. As used herein, "dot" refers to a quantum dot, and an isolated island of electron density is provided by each quantum dot.

A conventional calibration process for QD devices involves a series of measurements that involve sweeping one or more voltages on electrostatic gates that control various device parameters, including the number and occupation of QDs, while monitoring a single response variable. For physical construction of systems with N>>3 electrostatic gates used to create a large number of dots necessary for quantum computing, it is imperative to have a reliable automated method to find a stable, desirable electron configuration in an array of quantum dots.

As the number of gates increases, heuristic classification and tuning of the system becomes increasingly difficult, as does the time it takes to fully explore the voltage space of all relevant gates. Rather than using dense, multi-dimensional data, the ray-based classifier apparatus and tuning process described herein includes a DNN classification framework that uses a minimal collection of rays as one-dimensional representations to construct the fingerprint of the structure. The ray-based classifier apparatus and tuning process sample a small set of one-dimensional lines to determine volumetric information about the high dimensional space.

Ray-based classifier apparatus 200 tunes device 217 using machine learning with a ray-based classification framework. In an embodiment, with reference to FIG. 1, ray-based classifier apparatus 200 includes: machine learning module 201 in communication with autotuning module 202 that communicates device state 206 to autotuning module 202, machine learning module 201 including: training data generator module 203 that produces fingerprint data 204; and machine learning trainer module 205 in communication with training data generator module 203 and that receives fingerprint data 204 from training data generator module 203 and produces device state 206; and autotuning module 202 including: recognition module 207 in communication with machine learning trainer module 205 and measurement module 215 and that receives device state 206 from machine learning trainer module 205, receives ray-based data 219 from measurement module 215, and produces recognition data 208 based on device state 206 and ray-based data 219; comparison module 209 in communication with recognition module 207 and that receives recognition data 208 from recognition module 207 and produces comparison data 210 based on comparing recognition data 208 with a target state of device 217; prediction module 211 in communication with comparison module 209 and that receives comparison data 210 from comparison module 209 and produces prediction data 212 for device 217 based on comparison data 210; gate voltage controller 213 in communication with prediction module 211 and device 217 and that receives prediction data 212 from prediction module 211, produces controller data 214 and device control data 216 based on prediction data 212, controls device 217 with the device control data 216, and communicates controller data 214 to measurement module 215; and measurement module 215 in communication with gate voltage controller 213, device 217, and recognition module 207 and that receives controller data 214 from gate voltage controller 213, receives device data 218 from the device 217, produces ray-based data 219 based on controller data 214 and device data 218, and communicates ray-based data 219 to recognition module 207, such that recognition module 207 performs recognition on ray-based data 219 using device state 206, wherein machine learning module 201 and autotuning module 202 include one or more of logic hardware and a non-transitory computer readable medium storing computer executable code. In an embodiment, ray-based classifier apparatus 200 includes device 217. In an embodiment, device 217 includes a plurality of gate electrodes that control formation of quantum dots 229 in device 217, such that when quantum dot 229 is formed, quantum dot 229 is in electrical communication with one of the gate electrodes that controls the electrical properties of quantum dot 229, and each quantum dot 229 provides quantum well 230 with an electron occupation determined by a gate electrode potential that is controlled by device control data 216. In an embodiment, fingerprint data 204 include fingerprint vectors that includes distances between a selected point 233 in state space 220 of device 217 and the two nearest transition lines 231 that bound shape 232 that encloses the selected point 233 in state space 220. In an embodiment, device state 206 includes information as to a number of quantum dots 229 of device 217.

Figure 2:
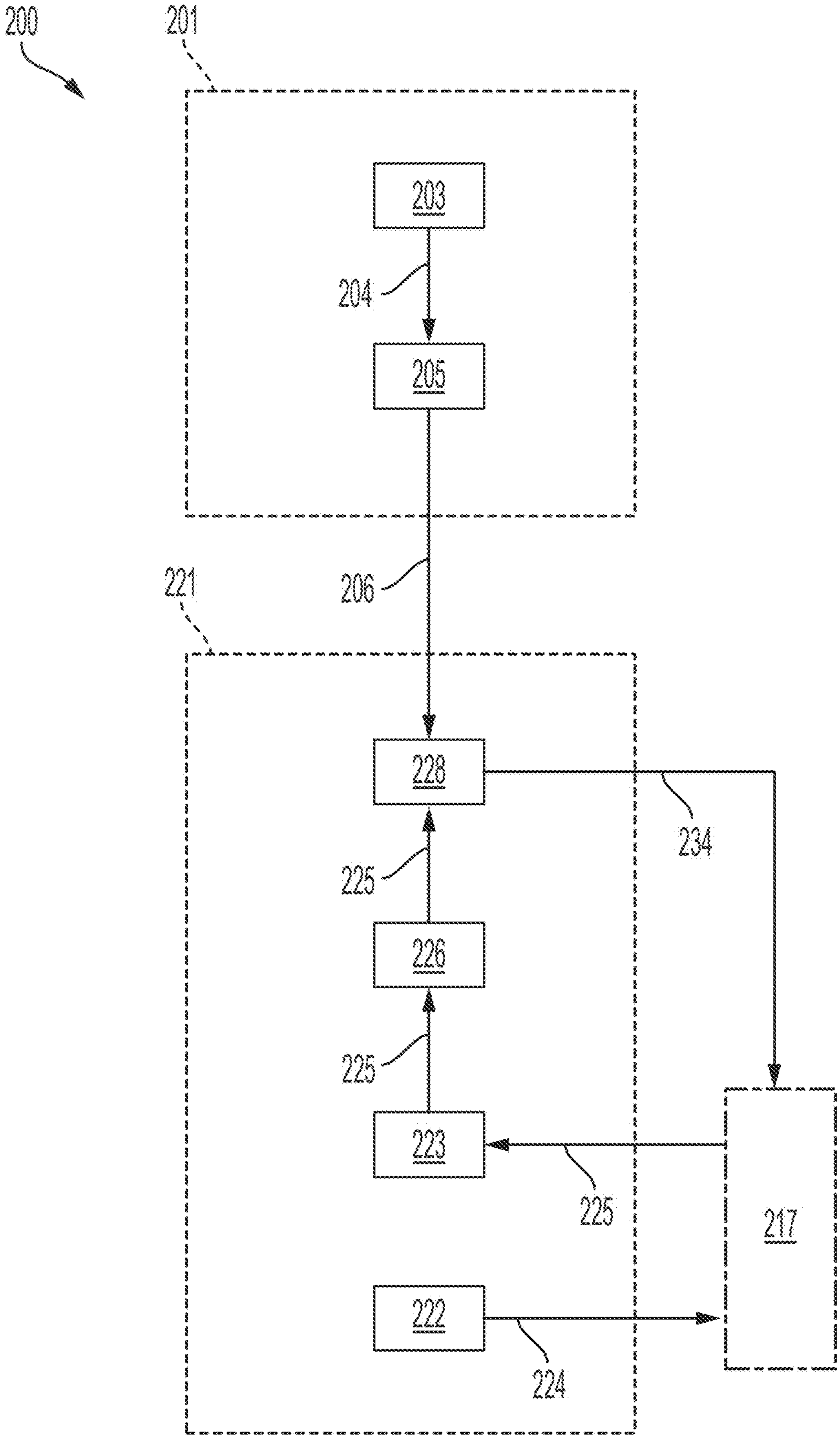
FIG. 2 shows a ray-based classifier apparatus, according to some embodiments.
Figure 3:
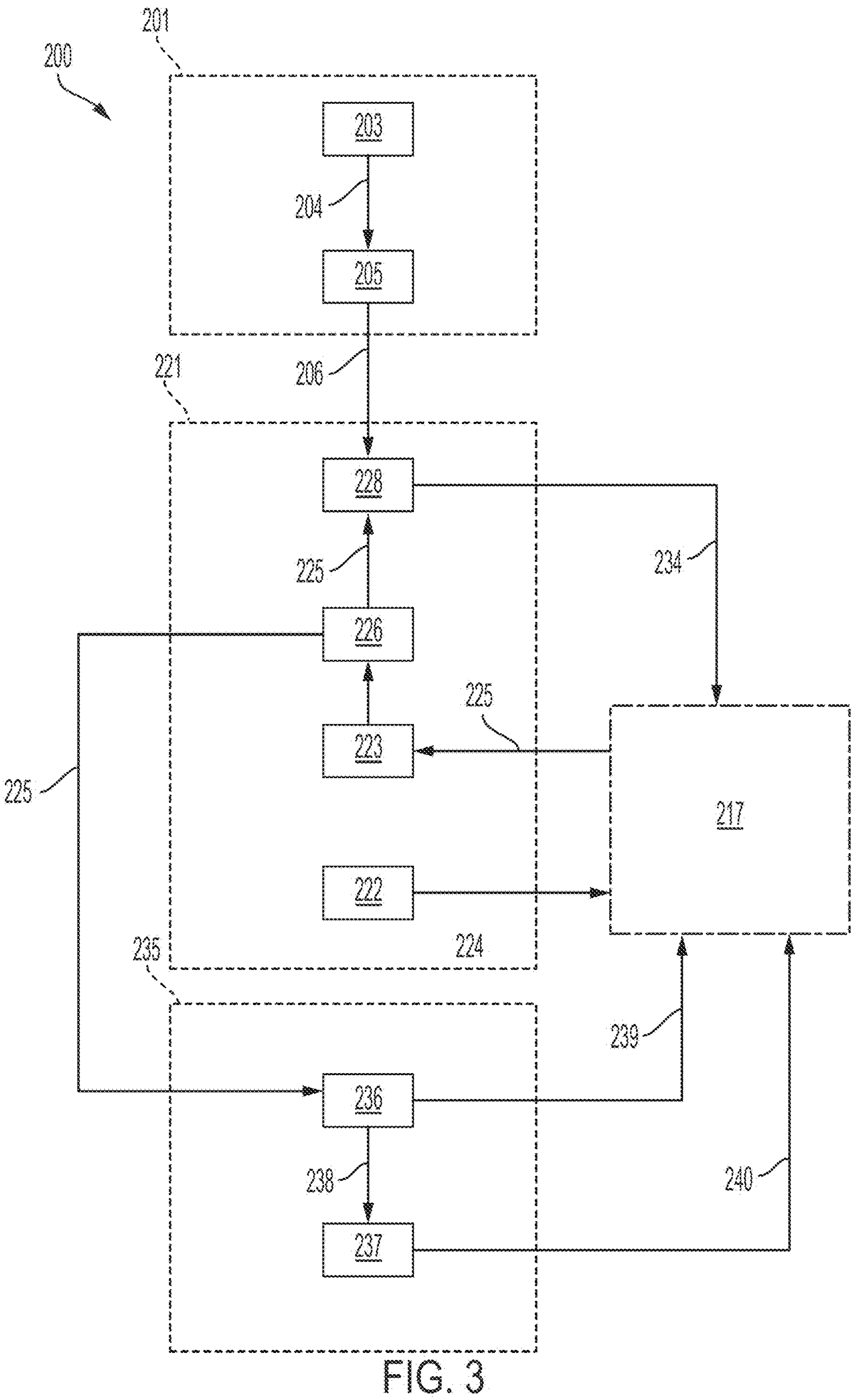
FIG. 3 shows a ray-based classifier apparatus, according to some embodiments.

In an embodiment for action-based automated double dot navigation, with reference to FIG. 2 and FIG. 3, ray-based classifier apparatus 200 tunes device 217 using machine learning with a ray-based classification framework and includes: machine learning module 201 in communication with action-based navigator module 221 and communicates device state 206 to action-based navigator module 221, machine learning module 201 including: training data generator module 203 that produces fingerprint data 204; and machine learning trainer module 205 in communication with training data generator module 203 and that receives fingerprint data 204 from training data generator module 203 and produces device state 206; and action-based navigator module 221 in communication with device 217 and that includes: charging module 222 in communication with device 217 and that sets the charging energy for each quantum well of device 217 and defines a state action for each of the quantum wells by sending charging data 224 to device 217; data acquisition module 223 in communication with device 217 and that acquires state data 225 from device 217 for a selected state recognizer; data checker module 226 in communication with data acquisition module 223 and that receives state data 225 from data acquisition module 223 and checks quality of state data 225; and state estimator module 228 in communication with data checker module 226 and that receives state data 225 from data checker module 226, estimates the state of device 217, determines whether to tune device 217 based on state data 225 relative to an estimation for the state of device 217, and produces charging data 224 and tunes device 217 according to charging data 224 based on the number of quantum dots of device 217, wherein machine learning module 201 and action-based navigator module 221 include one or more of logic hardware and a non-transitory computer readable medium storing computer executable code. In an embodiment, ray-based classifier apparatus 200 includes device 217. In an embodiment, device 217 includes a plurality of gate electrodes that control formation of quantum dots 229 in device 217, such that when quantum dot 229 is formed, quantum dot 229 is in electrical communication with one of the gate electrodes that controls the electrical properties of quantum dot 229, and each quantum dot 229 provides quantum well 230 with an electron occupation determined by a gate electrode potential that is controlled by action-based navigator module 221. In an embodiment, fingerprint data 204 can include fingerprint vectors that include distances between a selected point 233 in state space 220 of device 217 and the two nearest transition lines 231 that bound shape 232 that encloses the selected point 233 in state space 220. In an embodiment, device state 206 includes information as to a number of quantum dots 229 of device 217. It is contemplated that the foregoing can be used for ray-based single electron navigation. Here, in an embodiment, ray-based classifier apparatus 200 further includes single-electron navigation module 235 in communication with action-based navigator module 221 and device 217, single-electron navigation module 235 including: transition line emptier module 236 in communication with data checker module 226 of action-based navigator module 221 and that receives state data 225 from data checker module 226, and navigates along rays emanating from a selected point in state space 220 to decrease electron occupancy in quantum dots 229 of device 217; and transition line loader module 237 in communication with transition line emptier module 236 and device 217 and that identifies rays in state space 220, determines whether any transition lines are present along rays emanating from the selected point in state space 220, and ensures single electron occupancy in quantum dots 229 of device 217, wherein single-electron navigation module 235 includes one or more of logic hardware and a non-transitory computer readable medium storing computer executable code.

Figure 4:
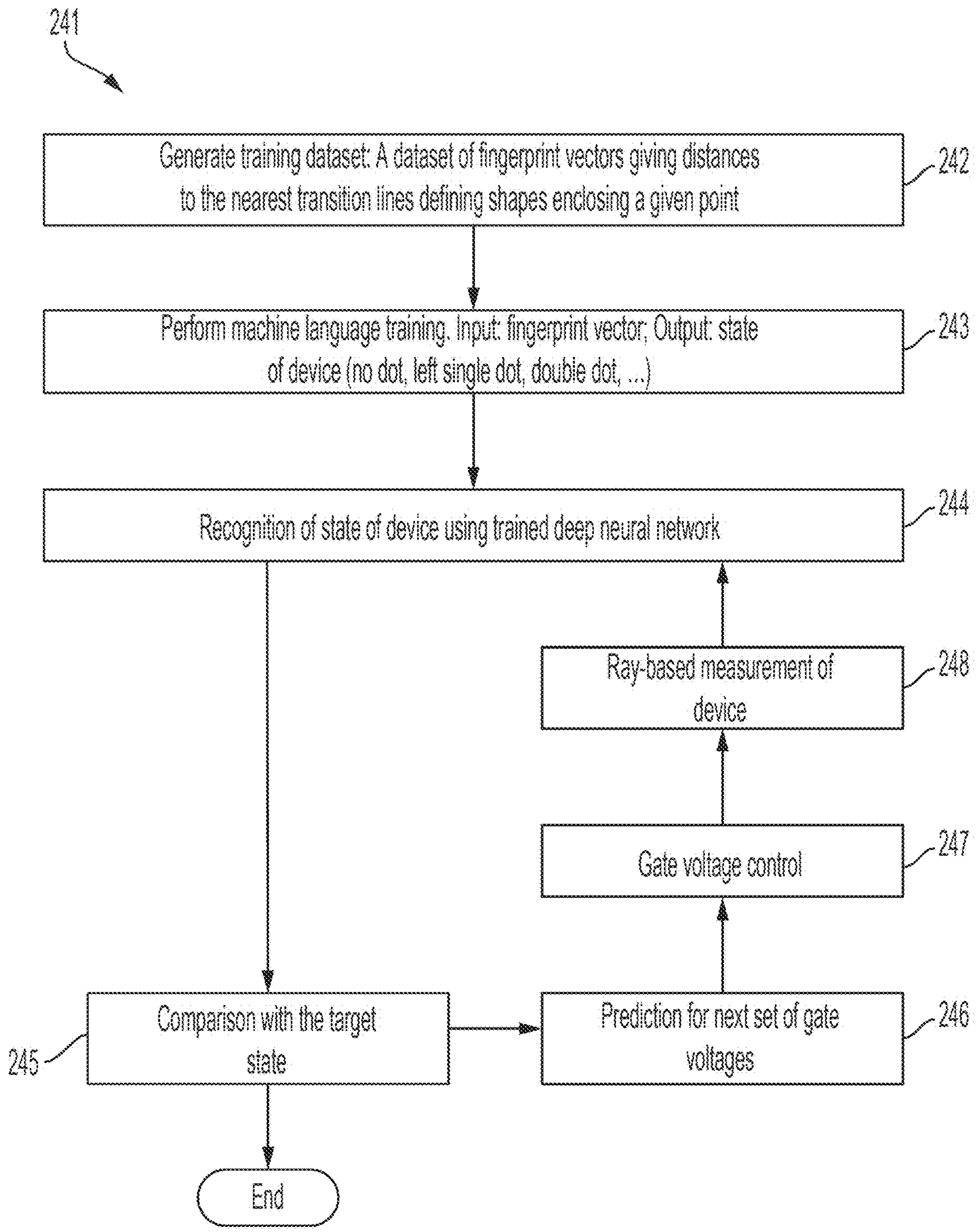
FIG. 4 shows steps involved in tuning a device using machine learning with a ray-based classification framework, according to some embodiments.

In an embodiment, with reference to FIG. 4 in accordance with steps 242, 243, 244, 245, 246, 247, and 248, process 241 for tuning device 217 using machine learning with a ray-based classification framework and an autotuning module 202 includes: generating, by training data generator module 203 using logic hardware, fingerprint data 204 for device 217; receiving, by machine learning trainer module 205, fingerprint data 204 from training data generator module 203; performing, by machine learning trainer module 205 using logic hardware, machine language training and producing device state 206 of device 217 from fingerprint data 204; receiving, by recognition module 207, device state 206 from machine learning trainer module 205; recognizing, by recognition module 207 using logic hardware, the state of device 217 from device state 206 using a trained deep neural network and producing recognition data 208 based on device state 206; receiving, by comparison module 209, recognition data 208 from recognition module 207; comparing, by comparison module 209 using logic hardware, a target state of device 217 with recognition data 208 and producing comparison data 210 as a result of the comparison; receiving, by prediction module 211, comparison data 210 from comparison module 209; producing, by prediction module 211 using logic hardware, prediction data 212 based on comparison data 210; receiving, by gate voltage controller 213, prediction data 212 from prediction module 211; producing, by gate voltage controller 213 using logic hardware, controller data 214 and device control data 216 based on prediction data 212; receiving, by device 217, device control data 216 from gate voltage controller 213, controlling device 217 with device control data 216 to modify the state of device 217, and producing device data 218 in response to controlling device 217 with device control data 216; receiving, by measurement module 215, controller data 214 from gate voltage controller 213 and device data 218 from device 217; producing, by measurement module 215 using logic hardware, ray-based data 219 based on controller data 214 and device data 218; and receiving, by recognition module 207, ray-based data 219 from measurement module 215 and performing recognition on ray-based data 219 using device state 206 from machine learning trainer module 205. In an embodiment, fingerprint data 204 includes fingerprint vectors including distances between a selected point 233 in state space 220 of device 217 and the two nearest transition lines 231 that bound shape 232 that encloses the selected point 233 in state space 220. In an embodiment, device state 206 includes information as to a number of quantum dots 229 of device 217.

Figure 5:
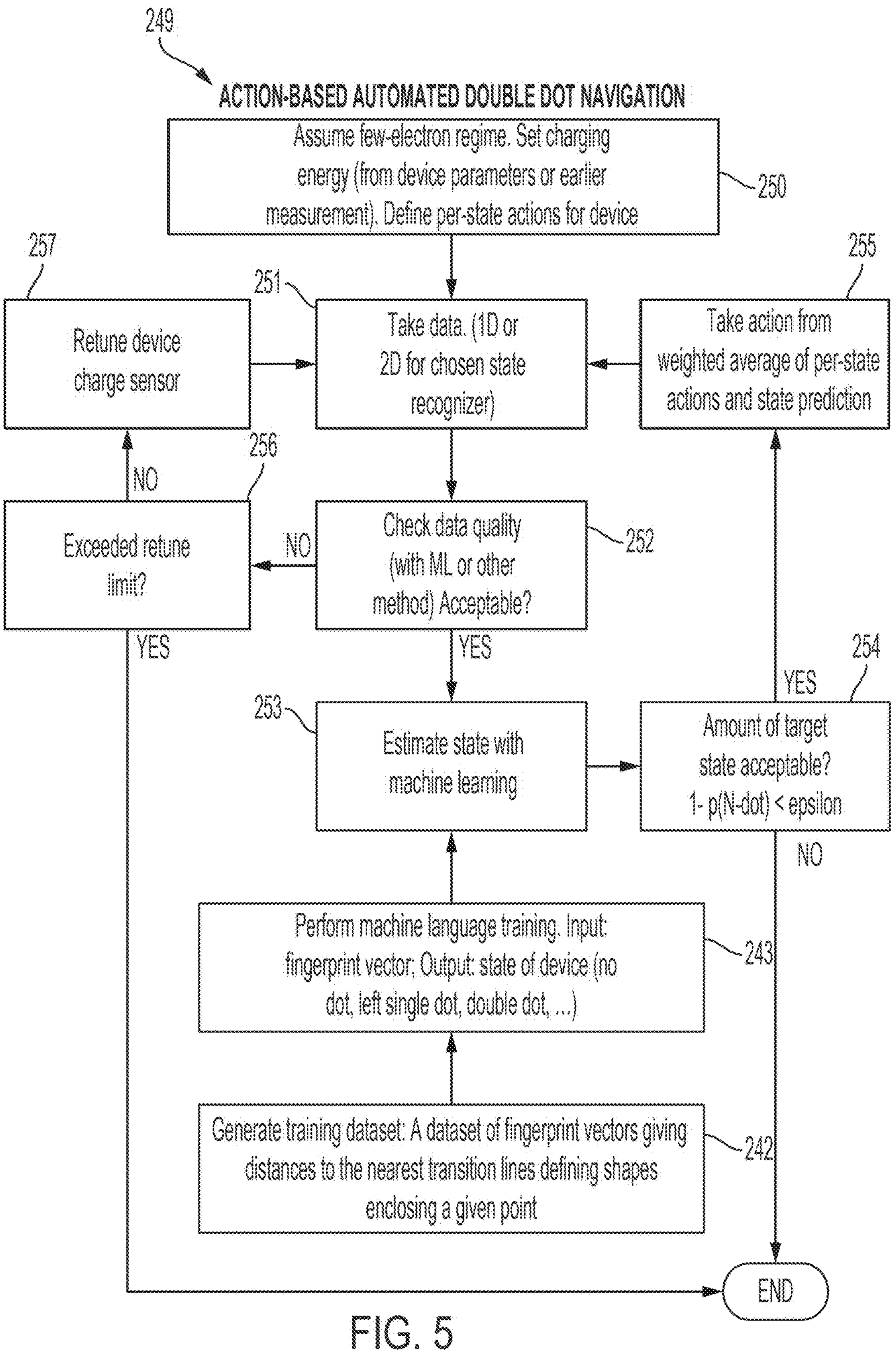
FIG. 5 shows steps involved in tuning a device using machine learning with a ray-based classification framework that includes action-based double dot navigation, according to some embodiments.
Figure 6:
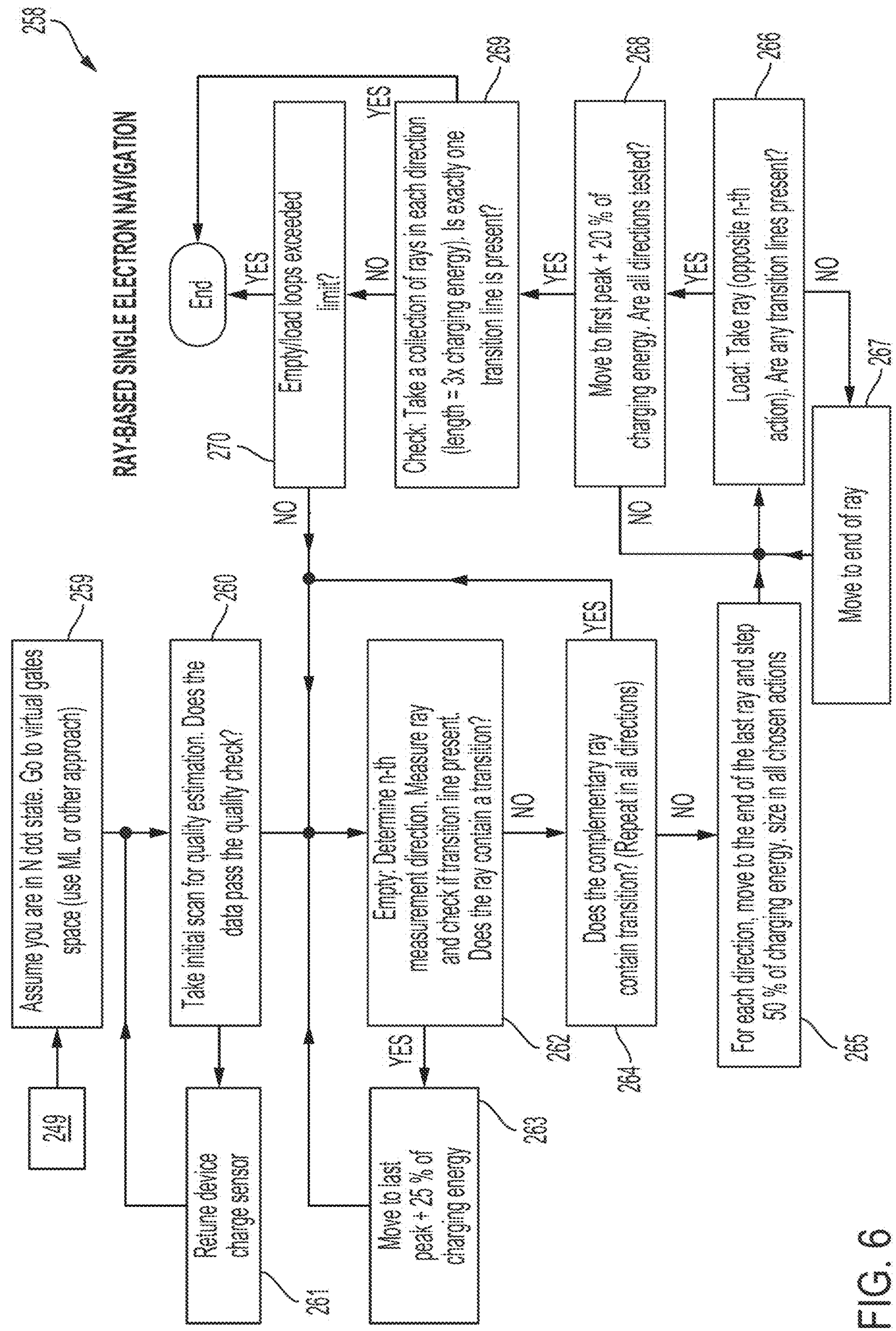
FIG. 6 shows tuning a device using machine learning with a ray-based classification framework that includes ray-based single electron navigation, according to some embodiments.

In an embodiment, with reference to FIG. 5 according to steps 242, 243, 250, 251, 252, 253, 254, 255, 256, and 257, process 249 for tuning device 217 using machine learning with a ray-based classification framework and action-based navigator module 221 includes: generating, by training data generator module 203 using logic hardware, fingerprint data 204 for device 217; receiving, by machine learning trainer module 205, fingerprint data 204 from training data generator module 203; performing, by machine learning trainer module 205 using logic hardware, machine language training and producing device state 206 of device 217 from fingerprint data 204; setting, by charging module 222 using logic hardware, the charging energy for each quantum well of device 217 and defining a state action for each of the quantum wells by sending charging data 224 to device 217 using logic hardware; acquiring, by data acquisition module 223 using logic hardware, state data 225 from device 217 for a selected state recognizer, receiving, by data checker module 226 in communication with data acquisition module 223, state data 225 from data acquisition module 223 and checking quality of state data 225; and receiving, by state estimator module 228 in communication with data checker module 226 and machine learning trainer module 205, state data 225 from data checker module 226 and device state 206 from machine learning trainer module 205; estimating, by state estimator module 228 using logic hardware, the state of device 217, determining whether to tune device 217 based on state data 225 relative to an estimation for the state of device 217, and producing charging data 224 and tuning device 217 according to charging data 224 based on the number of quantum dots of device 217. In an embodiment, the process further includes retuning device 217 if data checker module 226 determines that the quality of state data 225 is not acceptable. In an embodiment, process 249 further includes changing the state of device 217 from a weighted average of per-state actions and a state prediction in response to state estimator module 228 determining that the amount of target state is acceptable. In an embodiment for process 258 of ray-based single electron navigation, with reference to FIG. 6 according to steps 259, 260, 261, 262, 263, 264, 265, 266, 267, 268, 269, and 270, process 249 further includes: receiving, by transition line emptier module 236 of single-electron navigation module 235, state data 225 from data checker module 226; navigating, by transition line emptier module 236 using logic hardware, along rays emanating from a selected point in state space 220 to decrease electron occupancy in quantum dots 229 of device 217; identifying, by transition line loader module 237 using logic hardware, rays in state space 220, determining whether any transition lines are present along rays emanating from the selected point in state space 220, and ensuring single electron occupancy in the quantum dots 229 of device 217. In an embodiment, process 258 further includes performing an initial scan of state space 220 for quality estimation of state data 225 before decreasing the electron occupancy in quantum dots 229 of device 217; and retuning device 217 if state data 225 from the initial scan fails the quality estimation.

FIG. 11*a* shows a ray from point $x_o$ to $x_f$ when N=3. Different colors of polytopes represent different classes. In FIG. 11*b*, a side-view of the polytopes with two crossing of the shape boundaries marked along the ray is shown. The X-mark denotes a feature defining boundary for the volume enclosing point $x_o$ to be classified. Visualization of the rays-based measurement for two sample polytopes is shown in FIG. 11*c*.

In an embodiment, device 217 can include double quantum dots. Here, double QD devices were analyzed using a physics-based simulator developed to mimic the behavior of actual experimental systems. A dataset of over 27 k fingerprints were generated over 20 different simulated devices. Specifically, devices were defined with five electrostatic gates (two plunger gates designed for QD formation, separated by three barrier gates controlling the movement of electrons, which can operate in one of five possible configurations: no dot (i.e., no island of electron density), a single dot primarily coupled to either the right or the left plunger gate or a single central dot (single island of electron density formed over the right or left plunger or centrally, respectively), and double dot (two islands of electron density).

A fully connected DNN can identify the state of the device. This trained network can be used to make predictions on data the DNN never encountered before. The ray-based classifier decreases computational cost and the amount of data needed as compared with conventional technology. The trained network can be combined with numerical optimization routines to identify and tune a series of devices into a pre-desired regime of operation.

Tuning device 217 using machine learning with the ray-based classification framework can include generating a simulated dataset of experimental results, training a neural network to learn certain characteristics from this dataset and then using the trained neural network to tune an physical device into proper regimes of operation. Tuning device 217 relies on existence of a good-quality dataset or simulation that can qualitatively mimic the device under operation. Training of the machine learning algorithm and its performance on real device data is dependent on whether the physical model that has gone into simulating the dataset has the right assumptions connecting it with real operation of device 217. Moreover, with an increasing number of quantum dots, simulation of the dataset can become prohibitively expensive, and there is a need to develop different approaches for dataset generation that ray-based classifier apparatus 200 and tuning described here provides. Advantageously, tuning a device using machine learning with a ray-based classification framework reduces the experimental and simulation time and data cost. Finally, tuning a device using machine learning with a ray-based classification framework provides a closed-loop system without intervention of a human-experimenter for tuning QDs.

Conventional adjustment of experimental devices often rely on heuristics developed by researchers. Tuning a device using machine learning with a ray-based classification framework eliminates such a dependence and instead substitutes it with a fully automatized routine with the heuristics gained from a dataset. Moreover, conventional tuning techniques rely on measuring 2D scans that does not scale with the increasing number of QDs. Tuning a device using machine learning with a ray-based classification framework provides an AI algorithm that is trained on data generated for a range of the defining physical parameters in the model, the classifier becomes device agnostic. As such, the trained system can be used to identify and tune various types and architectures of experimental devices, e.g., gate-defined QDs or dopants in semiconductors. The only thing that changes between the different devices is which gates need to be controlled by the tuner. Moreover, tuning a device using machine learning with a ray-based classification framework can be applied in efficient estimation of the states of solid-state and atomic experimental systems, as well as control problems in a variety of quantum computing architectures.

Ray-based classifier apparatus 200 and tuning a device using machine learning with a ray-based classification framework auto-tune quantum dot devices to a specific electron state that can be used to form quantum-dot-based qubits. This framework combines a data quality control module, machine-learning based state assessment with data collected either in a traditional 2D format or using the ray-based approach described above as well as an action-based approach to device calibration that combines small-scale ray-based measurements with physics knowledge about the device characteristics to bring the device to the desired electronic state. Ray-based classifier apparatus 200 and tuning a device using machine learning with a ray-based classification framework provides reliable automation of the calibration process while significantly reducing the time and number of measurements necessary for characterization compared to conventional approaches.

Ray-based classifier apparatus 200 and tuning a device using machine learning with a ray-based classification framework provides autonomous navigation of the voltage space of QD devices that exploits the features characteristic of the measurement space. QD qubit systems can include multiple electrostatic gates to isolate, control, and sense each qubit. Depending on the type of QD devices, specific gates can be designed to accumulate electrons into QDs (plungers) and gates to control the tunneling between QDs (barriers). There can be at least three metallic gates that are voltage-adjustable to isolate each dot to the single electron regime and to realize qubit performance.

Ray-based classifier apparatus 200 and tuning a device using machine learning with a ray-based classification framework can include modules for fine-tuning electrostatic gates to reach the device operating point. One module uses machine learning (ML) to identify the device state and the known effects of the gates on QD states to navigate to the N-QD region, where N is the number of charge islands possible in a QD device. Successful termination of this module can directly progress to a next module. The next module leverages calibrated physics-based actions and peak finding on sample-efficient 1-dimensional data (rays) to navigate to the area of the previous region where each charge island has a single charge.

The first module takes advantage of the designed effect of a device's gates to navigate voltage space. In contrast, conventional approaches for this level of tuning do not use the geometry of the manifolds defining QD states. For a QD device, the operating region includes a distinct island of electrons at the location of each plunger gate, separated by the electrostatic potential of the barrier gate. To reach this region, each plunger gate needs to be set to a high enough voltage to induce an electron island, but not too high relative to the barrier potential that the islands merge. Likewise, the barrier voltages need to be high enough to separate charge islands but not so high that no islands can form or that the interdot coupling is not possible. To determine which gates need to be changed and in what capacity, ray-based classifier apparatus 200 and tuning a device using machine learning with a ray-based classification framework combine physical knowledge about the gates with information about the state of the device through ML recognition of 2D data, of 1D data, or other methods such as pattern matching.

For a double QD device that includes two quantum dots, a no dot state indicates that no electrons are in the device so both plunger gate voltages must be increased. A left or right dot state indicates only one side of the dot is occupied so the voltage of the opposite plunger gate must be increased. A central dot indicates too many electrons are in the device so both plunger gate voltages must be decreased. A double dot state is the target, so no change is needed in this case. To address tuning in transitional regions where multiple states are present, the action taken is the average actions of the states weighted by the state percentage. For example, 50% single dot (decrease both plungers) and 50% left dot (increase right plunger) yield a decrease of the left plunger voltage.

The second module uses data-efficient 1-dimensional scans to unload each charge island to single electron occupation. This is a departure from conventional approaches that relied on 2D scans and ML. Changes in electron occupation are indicated by sharp changes in charge, which can be autonomously detected using peak detection algorithms. However, in the presence of noise, this peak detection can be unreliable. Moreover, each plunger gate has unintended effects on nearby quantum dots so the direction of 1D scans must be carefully chosen to ensure the desired outcome. Ray-based classifier apparatus 200 and tuning a device using machine learning with a ray-based classification framework uses automated quality assessment and redundancy to avoid failure due to unreliable peak detection. Ray-based classifier apparatus 200 and tuning a device using machine learning with a ray-based classification framework ensures that 1D scans affect the QD only as intended by measuring the effect of each gate on each dot before initiating the unloading process. This module greatly reduces the data needed to tune to the single occupation state while remaining effective as compared with conventional technology.

The articles and processes herein are illustrated further by the following Examples, which are non-limiting.

EXAMPLES

Example 1. Ray-Based Classification Framework for High-Dimensional Data

While classification of arbitrary structures in high dimensions may require complete quantitative information, for simple geometrical structures, low-dimensional quali-tative information about the boundaries defining the structures can suffice. Rather than using dense, multi-dimensional data, we propose a deep neural network (DNN) classification framework that utilizes a minimal collection of one-dimensional representations, called rays, to construct the "fingerprint" of the structure(s) based on substantially reduced information. We empirically study this framework using a synthetic dataset of double and triple quantum dot devices and apply it to the classification problem of identifying the device state. We show that the performance of the ray-based classifier is already on par with traditional 2D images for low dimensional systems, while significantly cutting down the data acquisition cost.

Deep learning is applicable to physical problems in the classification of arbitrary convex geometrical shapes embedded in an N-dimensional space. Having a mathematical frame-work to understand this class of problems and a solution that scales efficiently with the dimension N is essential. With increasing effective dimensionality of the system, including parameters and data, determining the geometry with measurements across the full parameter space may become prohibitively expensive. However, as we show, qualitative information about the boundaries defining the structures of interest may suffice for classification.

Anew framework for classifying simple high-dimensional geometrical structures herein is referred to as ray-based classification. Rather than working with the full N-dimensional data tensor, we train a fully connected DNN using one-dimensional representations in $R^N$, called "rays", to recognize the relative position of features defining a given structure. We position the boundaries of this structure relative to a point of interest, effectively "fingerprinting" its neighborhood in the RN space. The ray-based classifier is motivated primarily by experiments, particularly those in which sparse data collection is impractical. Our approach not only reduces the amount of data that needs to be collected, but also can be implemented in situ and in an online learning setting, where data is acquired sequentially.

We test the proposed framework using a modified version of the "Quantum dot data for machine learning" dataset developed to study the application of convolutional neural networks (CNNs) to enhance calibration of semiconductor quantum dot devices for use as qubits. Tuning these devices requires a series of measurements of a single response variable as a function of voltages on electrostatic gates. As the number of gates increases, heuristic classification and tuning becomes increasingly difficult, as does the time it takes to fully explore the voltage space of all relevant gates. The specific geometry of the response in gate-voltage space corresponds to the number and position of populated quantum dots, which is valuable information in the process of tuning of these systems.

An image-based CNN classifier for 2D volumes, i.e., solid images, combined with conventional optimization routines, can assist experimental efforts in tuning quantum dot devices between zero-, single- and double-dot states. Here, we consider a double- and triple-dot system. We show that using ray-based classification, the quantity of data required (and thus the time required) for identifying the state of the quantum dot system can be drastically reduced compared to an imaged-based classifier.

Consider Euclidean space $R^N$ with its conventional 2-norm distance function d, and a polytope function p: $R^N \rightarrow \{0, 1\}$. The set of points where p(x)=1 constitutes the boundary of a collection of polytopes. For example, a polytope function producing a square in $R^2$ centered at the origin is p(x1, x2)={1 if |x1|+|x2|=1; 0 elsewhere}, where (x1, x2)∈$R^2$. In our quantum dot applications a value of p=1 indicates the location where an electron is transferred in or out of a dot.

Definition 1 (Rays). Given xo, xf∈RN, the ray Rxo,xf emanating from xo and terminating at xf is the set {x|x=(1−t)xo+txf, t∈[0, 1]} (see FIG. 11(*a*) for a depiction of a ray in $R^3$).

In practical applications, rays have a natural granularity that depends on the system as well as the data collection density. For quantum dots, the device parameters define an intrinsic separation between critical features that gives the scale of the problem. We refer to granularity of rays in terms of pixels.

To assess the geometry of a polytope enclosing any given point xo, we consider a collection of rays of a fixed length r centered at xo. The rays are uniquely determined by a set of M points on the sphere SN−1 of radius r centered at xo, P:={xm∈SxNo−1(r)|1≤m≤M}. We call a set of M rays, $R^M$:={Rxo,xm|xm∈P}, an M-projection (see FIG. 11(*c*) for visualization in R3).

Definition 2 (Feature). Given a ray Rxo,xf and a polytope function p, a point x∈Rxo,xf is a feature if p(x)=1.

Figure 11:
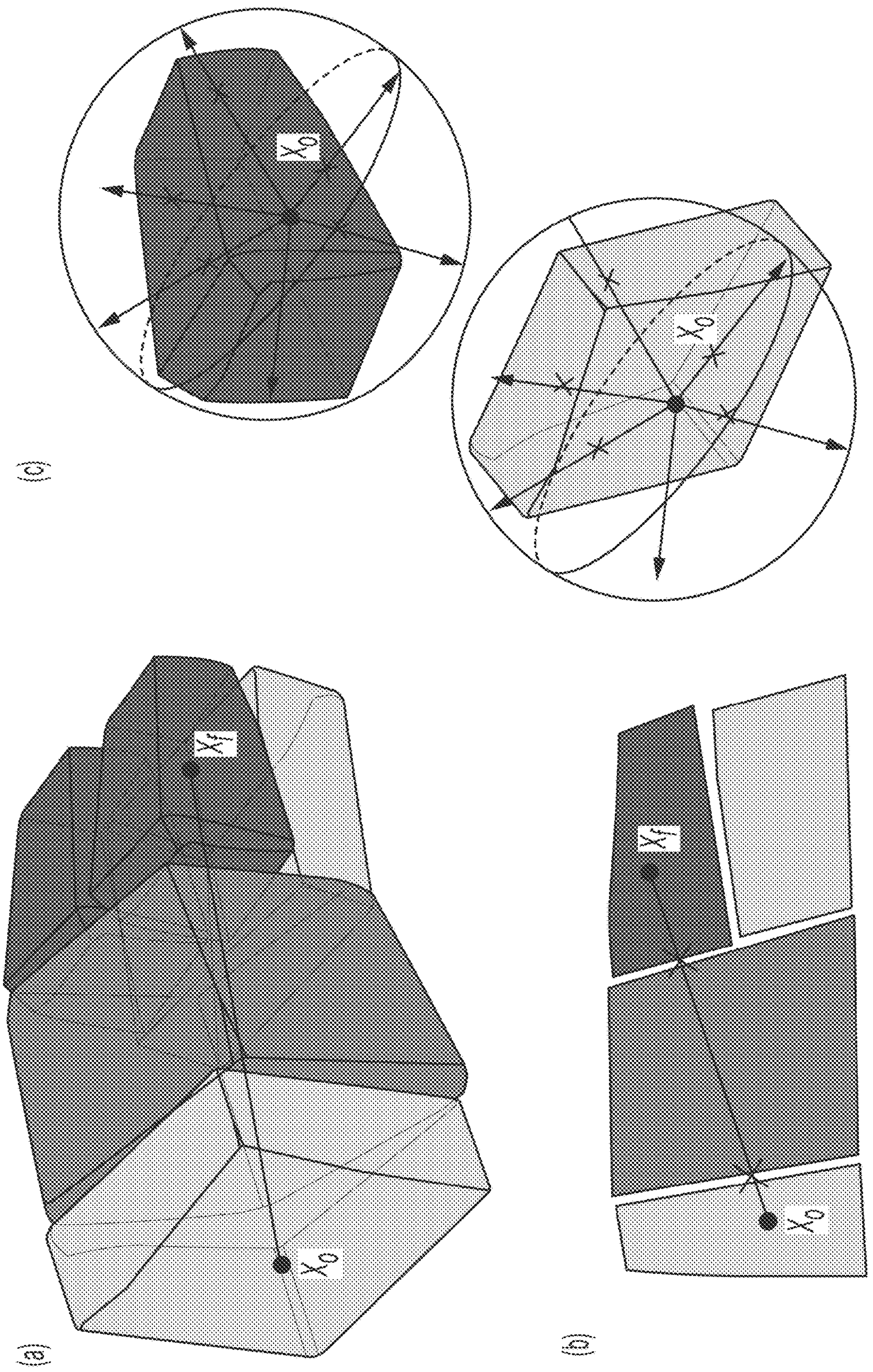
FIG. 11 shows (a) a ray R(xo, xf) from xo to xf in $R^3$. Different colors of polytopes represent different classes. (b) A side-view of the polytopes with two features marked along the ray. The X-mark denotes a critical feature. (c) Visualization of an M-projection from point xo with 6 rays (denoted by black arrows) for two different polytopes in $R^3$. Note that both M-projections include a ray that does not have a critical feature, according to Example 1.

FIG. 11(*b*) shows two features along a sample ray in $R^3$. Features along a given ray define its feature set, Fxo,xf:={x∈Rxo,xf|p(x)=1}, with a natural order given by the 2-norm distance function d:xo×Fxo,xf→R+. In general, Fxo, xf could be empty. Using a decreasing weight function γ:R+→[0, 1] we can assign a weight to each feature, effectively defining the weight set Γxo,xf corresponding to its feature set Fxo,xf as Γxo,xf={γ(d(x, xo))|X∈Fxo,xf}. The actual choice of function γ needs be altered to fit the problem itself and can be considered another hyperparameter that can help optimize the machine learning process. For the quantum dot case, we chose γ(n)=1/n.

The assumption that the weight function γ is monotonic in distance lets us define a ray's critical feature as the point x∈Fxo,xf with highest (i.e., critical) weight Wxo,xf=γ(d(x, xo)). If Fxo,xf=ø, we put Wxo,xf=0. This allows us to "fingerprint" the space surrounding point xo.

Definition 3 (Point fingerprint). Let xo∈RN be a point from which a collection of rays RM={Rxo,x1f, . . . , Rxo,xfM} emanate. The point fingerprint of xo□ is the M-dimensional vector consisting of the rays' critical weights: Fxo=Wxo,x1f . . . , Wxo,xfM.

This point fingerprint Fxo of xo is the primary object of the ray-based clas-sification framework. If sufficiently many rays in appropriate directions are chosen from xo, the fingerprint is sufficient, at least in principle, to qualitatively determine the geometry of the convex polytope enclosing xo. Due to the cost of experimental data acquisition, determining how few rays are sufficient for a machine learning algorithm to make this determination is of crucial importance. Looking to establish a correspondence between the fingerprint Fxo of point xo and the class of the polytope enclosing this point, we define the following prob-lem:

Problem 1. Given a set of bounded and unbounded convex polytopes fill-ing an N-dimensional space and be-longing to C distinct classes, C∈N, and a point xo∈RN, determine to which of the classes the polytope enclosing xo belongs.

A solution to this problem in the supervised learning setting can be obtained by training a DNN with the input being the point fingerprint and the output identifying an appropriate class. The procedural steps for the proposed classification algorithm for N-dimensional data in the form of pseudocode are presented in Algorithm 1 shown in FIG. 14.

Figure 12:
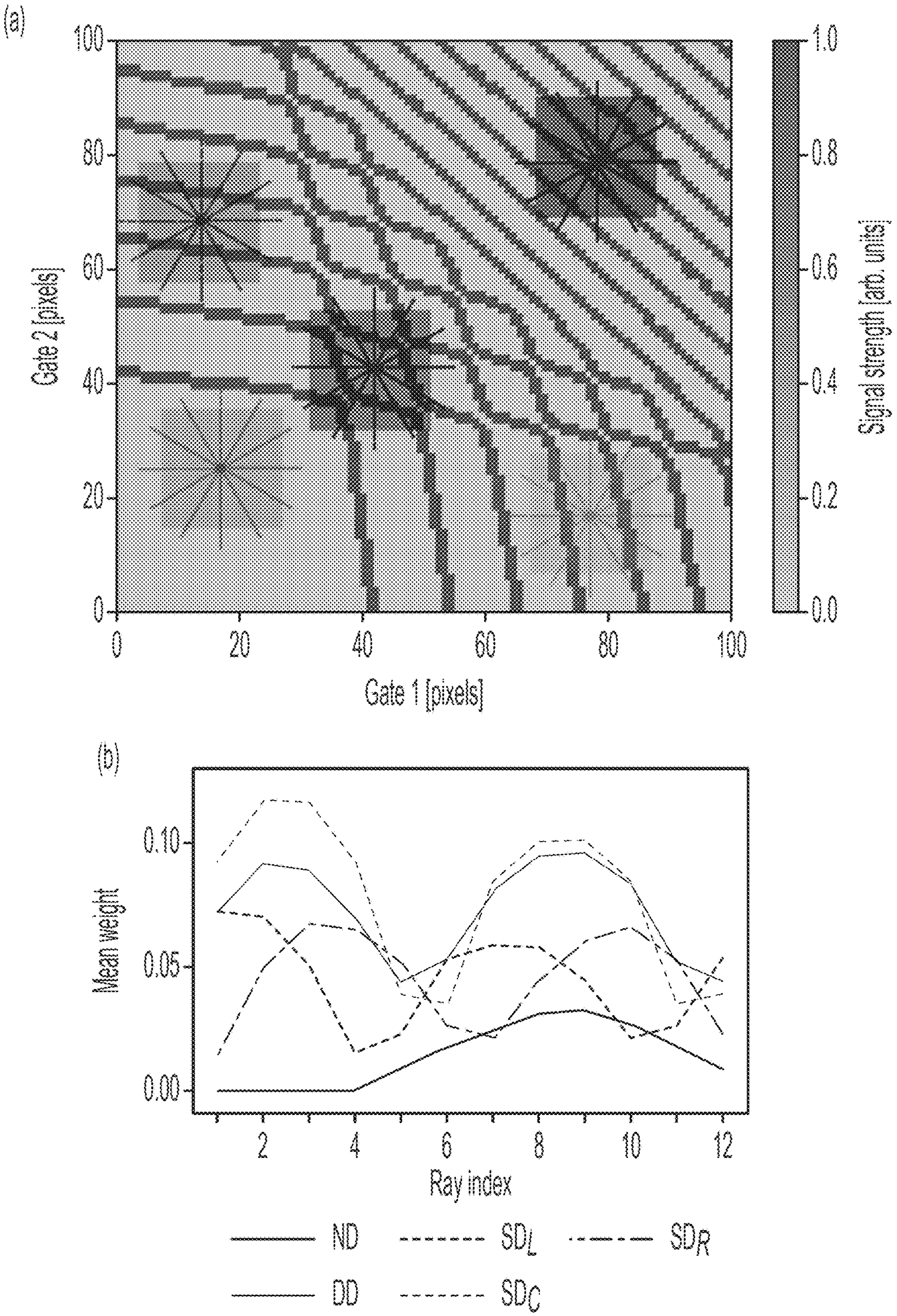
FIG. 12 shows a 2D map generated with a quantum dot simulator showing the different bounded and unbounded polytopes in $R^2$ with 12 evenly distributed rays overlaid on 2D scans. (b) The average trends of the fingerprints with M=12 rays. Fingerprints for SDL and SDR are out of phase, as expected from the curvature of lines defining these states and SDC is shifted by 1=4 of the period), according to Example 1.

The ray-based data is generated using a physics-based simulator of quantum dot devices. An example of a simulated measurement, like the ones typically seen in the laboratory, is shown in FIG. 12(*a*). The x and y axes represent a subset of parameters that can be changed in the experiments (here, gate voltages) and the curves where the signal strength is equal to 1 represent the device response to a change in electron occupation. The slopes of those lines correspond to the location of the quantum dots with respect to the gates. The device states manifest themselves by different bounded and unbounded shapes defined by these curves, as shown in FIG. 12(*a*). The reliability has been confirmed for a dataset generated with this simulator for the case of a CNN used with 2D images, finding an accuracy of 95.9% (standard deviation σ=0.6%) over 200 training and validation runs performed on distinct datasets. Here, we use a modified version of this dataset, splitting the single-dot (SD) class into 3 distinct classes based on the dot location (Left, Center, Right) as suggested by experimentalists. No-dot (ND) and double-dot (DD) classes are unchanged.

To test the ray-based classification framework in 2D, we use 20 realizations of 2D maps qualitatively comparable to the one shown in FIG. 2(*a*). Using a synthetic dataset allows us to systematically vary the length of the rays and their number. A regular grid of 1,369 points is used for sampling, resulting in a dataset of 27,380 fingerprints. We consider five datasets of M-projections, with M=3, 4, 5, 6, and 12 evenly spaced rays. The ray length is varied between 10 and 80 pixels (where 30 pixels is the average separation between transition lines in the simulated devices). We ran 50 training and validation tests per combination of rays' number and length (with data divided 80:20). For testing, we generated a separate dataset based on three distinct devices. This allows us to both better determine the classification error for the most efficient number and length combinations of rays and to study the failure cases over the device layout.

FIG. 13(*a*) shows the performance of the ray-based classifier. The accuracy of the classifier increases with the total number of points measured for a fixed number or rays, as expected. However, for a fixed number of points, increasing the number of rays does not necessarily lead to increased accuracy. This is because with a fixed number of points and point density, increasing the number of rays naturally results in shorter rays. Rays shorter than the radius of the interior diameter of the shapes leads to empty feature sets, resulting in uninformative fingerprints. Increasing the number or size of hidden layers in the DNN does not further improve the accuracy.

To test the proposed framework with triple-dot systems, we generated a dataset by sampling 17,576 fingerprints from a single simulated device with three dot gates. We varied the number of rays between 6 and 18, while keeping the length of the rays fixed at 60 voxels. For each configuration, we performed N=10 training and validation runs (with data divided 80:20). As shown in FIG. 13, the classifier accuracy improved from 66.2% ($\sigma$=0.3%) for 6 rays to 79.9% ($\sigma$=0.3%) for 18 rays.

Example 2. Ray-Based Framework for State Identification in Quantum Dot Devices

Quantum dots (QDs) defined with electrostatic gates are a leading platform for a scalable quantum computing implementation. However, with increasing numbers of qubits, the complexity of the control parameter space also grows. Traditional measurement techniques, relying on complete or near-complete exploration via two-parameter scans (images) of the device response, quickly become impractical with increasing numbers of gates. We circumvent this challenge by introducing a measurement technique relying on one-dimensional projections of the device response in the multidimensional parameter space. Dubbed the "ray-based classification (RBC) framework," we use this machine learning approach to implement a classifier for QD states, enabling automated recognition of qubit-relevant parameter regimes. We show that RBC surpasses the 82% accuracy benchmark from the experimental implementation of image-based classification techniques from prior work, while reducing the number of measurement points needed by up to 70%. The reduction in measurement cost is a significant gain for time-intensive QD measurements and is a step forward toward the scalability of these devices. We also discuss how the RBC-based optimizer, which tunes the device to a multiqubit regime, performs when tuning in the two-dimensional and three-dimensional parameter spaces defined by plunger and barrier gates that control the QDs. This work provides experimental validation of both efficient state identification and optimization with machine learning techniques for nontraditional measurements in quantum systems with high-dimensional parameter spaces and time-intensive measurements.

The ease of control, fast measurement, and long coherence of semiconductor quantum dots (QDs) make them a promising platform for quantum computing. Individual qubits can be built from single QDs or multiple QDs coupled together. At present, most QD qubit systems require multiple electro-static gates to isolate, control, and sense each qubit. Of-ten, there are specific gates designed to accumulate electrons into QDs (plungers), gates to control the tunneling between QDs (barriers), and gates to deplete electrons elsewhere (screening gates). As QD devices grow in the number of qubits and complexity so do the number of gate voltages to be controlled and tuned.

Although current few-qubit devices are mostly still tuned manually, there are several emerging auto-mated approaches to various steps in the process of tuning QDs. Depending on the specific device design, each of these tuning steps requires specialized approaches for automation. Some automation techniques focus on tuning devices ab initio to a voltage space where QDs can form. Others focus on tuning the configuration of QDs; that is from single QDs to coupled double QDs.

There are also methods to achieve a specific number of electrons in each QD or to measure and modify the couplings in multiple-QD systems. These various automation techniques have used many different tools: convolutional neural networks (CNNs), deep generative modeling, classical feature extraction (e.g., a Hough transformation), and many custom fitting models.

Motivated by the success of image-based autotuning, here we present an alternative approach that uses the recently proposed ray-based classification (RBC) framework to distinguish between different electron configurations. The RBC framework was originally pro-posed as an approach for classifying simple bounded and unbounded convex geometrical shapes. It thus naturally applies to identifying QD states that manifest themselves as distinct geometrical patterns in the charge sensor response as a function of the gate voltages. Here we present the classification of a Si/SixGe1-x QD device using this new method, both in a "live" measurement session during the experiment and "off-line" using a dataset of large stability diagrams taken from the device after tuning.

We explore how the hyperparameters of the RBC, such as number of rays, ray length, and the choice of the weight function, affect the classification accuracy of experimental data. We find a favorable comparison with image-based classification in terms of accuracy and the quantity of data required. Furthermore, we show an off-line implementation of the RBC framework within an optimizer-based autotuner for a QD system, tuning be-tween single and double QDs in a space of three gate voltages.

Figure 15:
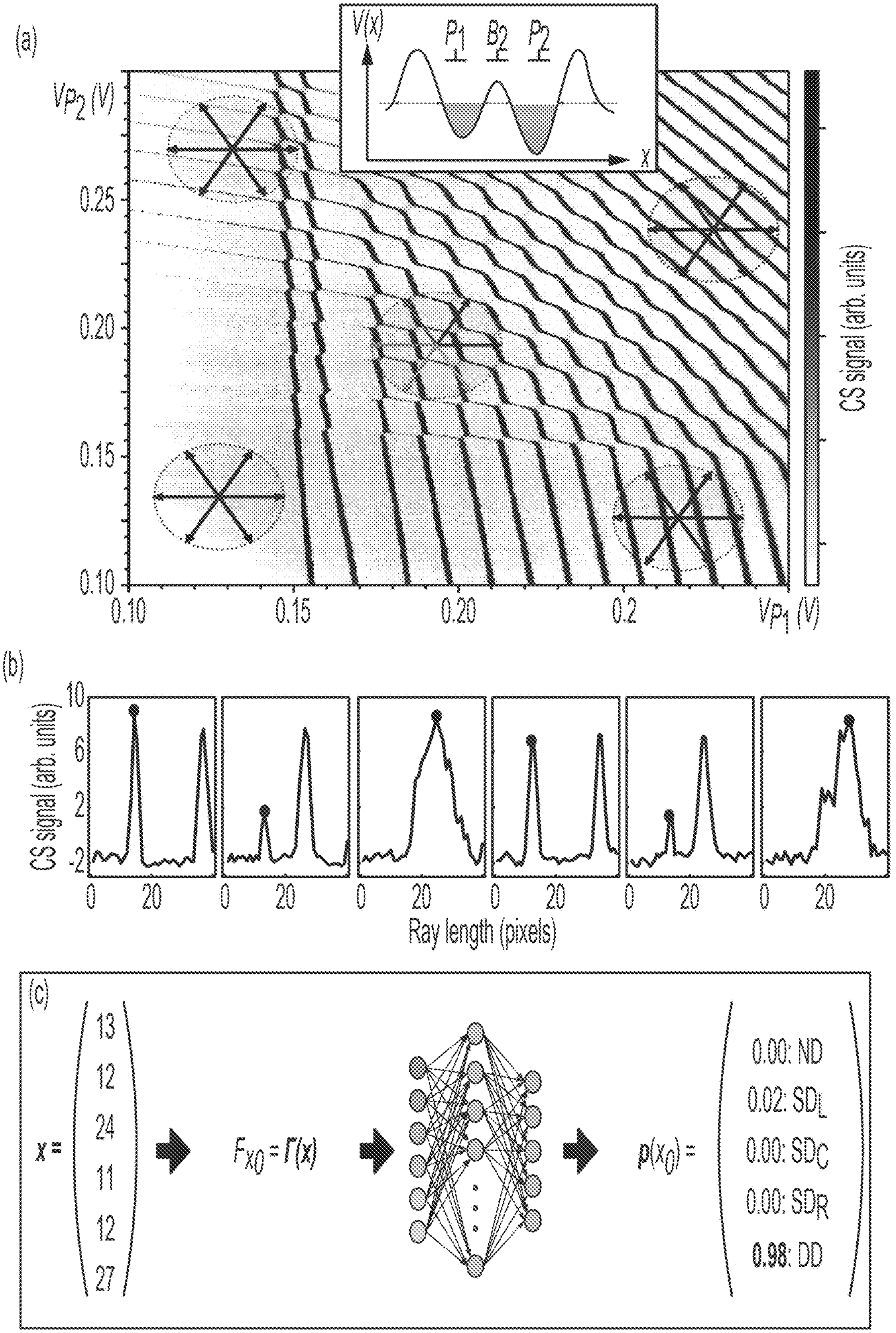
FIG. 15 shows visualization of the ray-based fingerprinting framework. (a) A preview of five points in the space of plunger gates (P1, P2) with six evenly distributed rays overlaying a sample measurement. Different colors represent different QD states. The inset shows the potential landscape of the double-quantum-dot system. Gate voltages VP1 and VP2 control the occupation of each QD. Gate voltage VB2 controls the inter-QD tunneling. (b) The pre-processed charge sensor (CS) signal for six evenly distributed rays measured from a point (VP1, VP2)=(0.193, 0.193) V [the most central point in (a)] as a function of ray length. The length resolution is 0.5 mV per pixel. In each ray, the position of the transition line nearest to the point (VP1, VP2)≡xo—that is, the critical feature along a given ray—is marked with a dot. (c) The flow of the RBC framework. A vector of critical features x is processed using a weight function Γ(x). The resulting fingerprint Fxo is processed by a DNN classifier, returning a probability vector p(xo) quantifying the current state of the device at point xo, according to Example 2.

A visual inspection of the large scan of experimental data (differential charge sensing) presented in FIG. 15(*a*) shows different physical states of the QD device. These states manifest themselves as different shapes formed by electron transition lines and varying orientations with respect to the scanned gate voltages (e.g., parallel lines for single QDs and honeycombs for double QDs). Thus, the shape and orientation of the lines encode sufficient qualitative information about the state of the device to enable state (in this case, charge topology) classification. A CNN-based classifier trained for state identification learns to mask the noise captured between transition lines in these two-dimensional (2D) charge sensing images.

A classification framework focusing on data acquisition efficiency, rather than using full 2D images capturing a small region of the voltage space, the RBC framework relies on a collection of evenly distributed one-dimensional traces ("rays") originating from a single point xo and measured in multiple directions in the voltage space to describe the neighborhood of xo (see FIG. 15(*a*) for a preview of five sample points with six evenly distributed rays). The rays are used to capture the orientation and relative position of transition lines near xo, effectively "fingerprinting" the surrounding voltage space. The resulting point fingerprint encodes the qualitative information about the voltage space around xo and is the primary object of the RBC framework.

A $Si/Si_xGe_{1-x}$ quadruple-QD device is used to create a double-QD charge sensed by a single sensing QD whose current readout is connected to a cryogenic amplifier. The device is a linear array of four QDs, opposing two charge sensors. The nearby gates (reservoir gates, depletion gates, and tunnel-barrier gates) are pretuned to allow single-QD and double-QD formation under the two leftmost plunger gates, P1 and P2 (see the inset in FIG. 15(*a*)). An example stability diagram for this device is shown in FIG. 15(*a*). A small, approximately-10-kHz oscillating voltage is applied to P1 and the charge sensor current is sent to a lock-in amplifier referenced to this ac tone. This results in a large change in the signal measured at charge transitions, an effective differentiation of the QD occupation across the (P1, P2) voltage space. Because the ac tone is applied to P1, charge transitions physically closer to P1 will result in a larger signal than transitions closer to P2. This effect can be seen in FIG. 15(*a*), where the more horizontal transitions associated with occupation changes in the P2 QD are harder to distinguish. In future measurements, this effect could be reduced by also applying an ac tone to P2 or applying the tone to a central tunnel barrier gate.

To assess the geometry of the transition lines surrounding a given point xo∈(VP1, VP2), we consider a collection of M rays of a fixed length centered at xo called the M-projection (see FIG. 15(*a*) for visualization). Each ray corresponds to a measurement of the charge sensor signal along a given direction in the space of plunger volt-ages. The ray data used in this paper are collected in two ways. The "live" M-projection is collected by choosing a plunger gate voltage point xo=(VP1, VP2) and measuring evenly spaced rays emanating from that point in the plunger gate voltage space. The length of the rays and their granularity (i.e., number of pixels per unit length) are determined by the expected charging energy of the system and are fixed throughout the measurement. We use rays 30 mV in length with 60 points (pixels) sampled along the ray. The 0.5 mV-per-pixel granularity is selected to ensure that the electron transition lines will be properly visible with the ac lock-in measurement technique. For the "off-line" M-projection, a large, densely sampled 2D stability diagram is used to generate ray datasets by choosing a central voltage point xo and interpolating the data in evenly spaced directions. In both cases, the first ray is always measured in the direction of VP1.

Regardless of the ray data generation method, we collect complex voltage data from the lock-in amplifier FIG. 15(*b*) shows the magnitude of a set of live data rays. In the off-line setting, a combination of the overall median absolute deviation and the median for a given col-lection of rays is used to determine the noise level and expected peak prominence, respectively, and is used by the peak finding algorithm. In an in situ implementation, the noise level can be determined before ray collection by measuring the average lock-in response offset and rms noise at any off-transition plunger voltage and then periodically rechecked throughout the experiment.

Once an M-projection for a given point xo is acquired, traditional signal processing techniques are used to test each ray for the presence of transition lines. While the noiseless simulation results in binary rays, with transitions easily identifiable along the rays, the noise present in the experimental data makes the transitions harder to detect. In the ac measurement, transitions manifest themselves as peaks along the ray (called "features" in the RBC framework, see FIG. 15(*b*)). Thus, a peak detection algorithm is applied to each ray to determine the presence and, if applicable, positions of all peaks along a given ray. If a dc charge sensor measurement is used instead, an additional step of differentiating the signal along the measurement direction will be necessary before signal processing. The peak positions are represented as a number of pixels from the central voltage point xo. If for a given ray at least one feature is detected, the position of the feature nearest to the ray's origin x(c) is recorded (so-called critical feature). If no peaks are found, a not-a-number (NaN) value is recorded as a placeholder for the critical feature instead. The vector of critical fea-tures x, marked with black points in FIG. 15(*b*), is used to determine the point fingerprint.

Finally, a "weight" function Γ is applied elementwise to scale the vector of critical features to a [0, 1] range, with rays having no peaks being assigned a default value of 0:

$$\Gamma(x) = \begin{cases} \gamma\left(x_i^{(c)}\right) \text{ if } x_i^{(c)} \in \mathbb{N}^{>0}, \\ 0 \text{ if } x_i^{(c)} = NaN, \end{cases} \tag{1}$$

where γ:N>0→[0, 1] is a normalizing decreasing function. The normalized vector of distances Fxo is called the "point fingerprint". Because of the differences in the geometry of the transition lines for different QD states, distinct point fingerprints are encoded for the different states and a classifier trained on point fingerprint data suffices for the QD state identification. We use a simple deep neural network (DNN) classifier with three hidden layers for this purpose.

The flow of the RBC algorithm is shown in FIG. 15(*c*) and includes extraction of the positions of critical features from the M-projection; fingerprinting of the central point xo by the means of a weight function γ(x); and DNN analysis of the resulting fingerprint Fxo.

The output of the classifier is a probability vector, $$p(x_0)=[p_{ND}, p_{SD_L}, p_{SD_C}, p_{SD_R}, p_{DD}] \tag{2}$$

quantifying the current state of the device, with ND denoting no QDs formed, SDL, SDC, and SDR denoting the left, central, and right single QD, respectively, and DD denoting the double-QD state.

The RBC framework was developed and tested originally on a dataset of simulated double-QD devices. An average accuracy of 96.4(4) % (averaged over N=50 models) with just six rays and a weight function γ(x)=1/x was reported for double QDs, where the accuracy is defined as the fraction of correctly classified points from a test dataset. This is on par with the more-data-demanding CNN-based classifica-tion framework, while requiring 60% fewer data. Given the success of the RBC framework on simulated devices, its performance on experimental data reduces data required translates to reduction of the measurement time in the experiment.

To assess the performance of the RBC framework with experimental data, we use an ensemble of 20 DNN classifiers pretrained using a modified version of the "Quantum dot data for machine learning" dataset. This allows us to not have to manually label experimental data for training purposes. To prepare the DNNs, we rely on a dataset of 2.7×104 point fingerprints, sampled over 20 simulated QD devices. A number of parameters, such as the device geometry, gate positions, lever arms, and screening lengths, are varied between simulations to re-flect the minimum qualitative features across a range of devices. For training purposes, each fingerprint Fxo is tagged with a label identifying the state of the device at point xo. The labels are generated as part of the simula-tion. Before training, the labels are converted to one-hot vectors (i.e., vectors of length equal to the number of classes and a single nonzero element indicating the true class) and treated as the probabilities p(xo) that xo is in any of the five possible states.

To test the performance of the RBC, we establish an off-line dataset of 311 labeled fingerprints using two measurement scans qualitatively comparable to the one presented in FIG. 15. The points within the test dataset are evenly distributed among the five possible states, with 64 points belonging to the ND class, 58 to the SDL class, 61 to the SDC class, 64 to the SDR class, and 64 to the DD class.

Using the fingerprinting configuration for six evenly spaced rays of length 60 pixels (30 mV) and a weight function γ(x)=1/x we achieve an average accuracy of 87.1 (2.0) % (N=20 mod-els). The number of rays, their length, and the choice of the weight function are all considered free parameters of the RBC framework. To optimize the machine learning process, we start by testing the effect of the weight func-tion on the performance of the classifier. We use the four most promising combinations of the number of rays and the ray length for five and six rays of length 50 pixels (25 mV) and of length 60 pix-els (30 mV). In our analysis, we consider a collection of three decreasing weight functions with varying decay rates: γ(x)=1/x, γ(x)=exp(−x), and γ(x)=1−x^, where x^=(x−min x)/(min x−max x) denotes the min−max normalization. In addition, we consider two node-creasing functions: the min−max normalization γ(x)=x— and the raw distance γ(x)=x. The inset at the top of FIG. 16(*a*) shows the performance of the RBC on simu-lated data. For γ(x)=exp(−x), the performance is sig-nificantly worse than for the other considered functions, averaging at 49(3) % for six rays and 57(3) % for 12 rays (for clarity not included in the figure). The performance is greatly improved when the argument is min−max nor-malized, resulting in 95.1(4) % accuracy for six rays and 96.4(4) % accuracy for 12 rays. This suggests that for the non-normalized data the decay rate is too high, mak-ing the features indistinguishable for the DNN. For com-pleteness, we also consider the min−max normalized ver-sion of the function γ(x)=1/x, finding no difference in performance when compared with the original function [95.4(4) % vs 96.7(4) % for six rays and 94.9(4) % vs 96.1(4) % for 12 rays.

Finding no difference in performance when using simulated data, we test all functions using the test set of off-line experimental data. FIG. 16(*a*) shows the RBC performance. While in the absence of noise, all func-tions considered perform comparably, we find that in the presence of noise, normalization of data with γ(x)=1/x consistently leads to significantly better classification ac-curacy than normalization with the other functions. For experimental data the performance of the classifier decreases significantly as the weight function rate of change increases. For the functions tested, γ(x)=1/x has the best balance of sensitivity and robustness against the variability in peak shape and position (see FIG. 15(*b*)). Additional exploration of different weight functions and peak-finding methods may further improve the performance.

With the measurement efficiency in mind, we also test the effect of the number of rays and their length on the performance. We use M-projections with M=5, 6, 7, 9, and 12 rays and with lengths ranging between 20 pix-els (10 mV) and 80 pixels (40 mV), sampled every four pixels (2 mV). Since the ray length directly affects the fingerprints (i.e., shorter rays will naturally miss a tran-sition line that would be detected with a longer ray), the rays in the simulated dataset used to train DNNs are adjusted appropriately to ensure compatibility. As FIG. 16(*b*) shows, we find that including more rays does not necessarily lead to greater or more reliable accuracy. In addition, for each number of rays considered, there seems to be an optimal length beyond which the performance either stays unchanged or slightly drops until it reaches equilibrium.

To test the RBC in situ, we develop a measurement routine that enables live acquisition of ray data. After selection of a point xo, voltages on gates P1 and P2 are changed in tandem to achieve straight voltage rays emanating from xo. This is, in effect, virtual gating of the (VP1, VP2) voltage space. The performance of the classifier for live measurement of 36 points is shown in FIG. 17(*a*), with the orientations of the stars indicating the measurement directions. A quality check on the set of rays is performed before the RBC to prevent classifica-tion of poorly charge sensed data [see the changing back-ground signal on the left side of FIG. 17(*a*). The check in-volves benchmarking of the distribution of voltages mea-sured for a given set of rays-ranging from 120 voltage values for a set of five rays of length 12 mV to 720 voltage values for 12 rays of length 30 mV-against a thresh-old established off-line before the experiment based on previously measured rays with clearly discemible charge transitions. Of the 36 measured points, nine are ex-duded from classification on the basis of the threshold test. The remaining are colored in FIG. 17(*a*) according to the class returned by the RBC. While in the online testing we used M-projections with M=6 rays of length 22 mV, the measurement captured M=12 rays of length 40 mV. Additional off-line testing using longer rays does not change the classification results and neither does in-clusion of the full 12-rays projections. This suggests that the protocol used to determine the noise level and signal prominence from real data might require further improvements. Recalibration of the sensor after each set of rays could also increase the signal-to-noise ratio and lead to more prominent transitions.

To assess the performance for a larger set of points, we run the RBC off-line for a set of 2,500 points presampled from a large scan. The performance is shown in FIG. 17(*b*). We see that the classifier correctly captures the broad regions in the voltage space that correspond to single QDs—central, left and right—as well as double QD. The most common failure cases corresponds to xo coincidentally lying on the transition lines and in the re-gions where the lock-in measurement is insensitive (tran-sitions of the P2 QD).

The RBC combined with an optimization loop can be used to tune the device from one state to another (e.g., from single-QD state to a double-QD state). We perform off-line tuning by initializing the device at a given point in the space of plunger voltages xo=(VP1,VP2) and then optimizing a fitness function over a premeasured scan to mimic an actual tuning run. The fitness function quanti-fies how close the probability vector returned by the RBC is to the desired target state. We use the fitness function:

$$\delta(p_{target}, p(x_o)) = [|p_{target} - p(x_o)|]_2 + \in(x_o) \tag{3}$$

where ||•|| is the Euclidean norm, ptarget is the proba-bility vector for the target state, p(xo) is the probability vector returned by the RBC at xo, and ε(xo) is a penalty function for tuning to larger plunger voltages. We use ε(xo) ∝{tan h[(VP1−VP01)/V0]+tan h[(VP2−VP02)/V0]}, where $V_{P1}^{0}$ and $V_{P2}^{0}$ are previously determined pinch-off values and V0 is a voltage scale normalizing the argu-ment of the tan h function. We use V0=20 mV, approx-imately equal to the charging energy of the QDs. The penalty function acts as a regularization function for the bare Euclidean distance between the current and target state probability vectors. In particular, it adds a smooth gradient to the background as well as helps the optimizer escape from local minima.

We use the Nelder-Mead optimizer implemented in SciPy. The optimizer maintains a set of objec-tive function values at a simplex of n+1 points in n-dimensional space; in our case it amounts to evaluation on vertices of a triangle in 2D gate space. The orenta-tion of the initial simplex is chosen dynamically on the basis of the initial state returned by the RBC and is ob-tained by changing the voltages on each of the plungers by 40 mV. The optimizer works by moving the simplex toward a minimum of the objective function on the basis of the function values at the simplex vertices. Since we lack analytic information about the derivative of the fit-ness function (Eq. 3 in this example), the Nelder-Mead optimizer is well suited for our purpose as it relies only on function evaluations.

Figure 18:
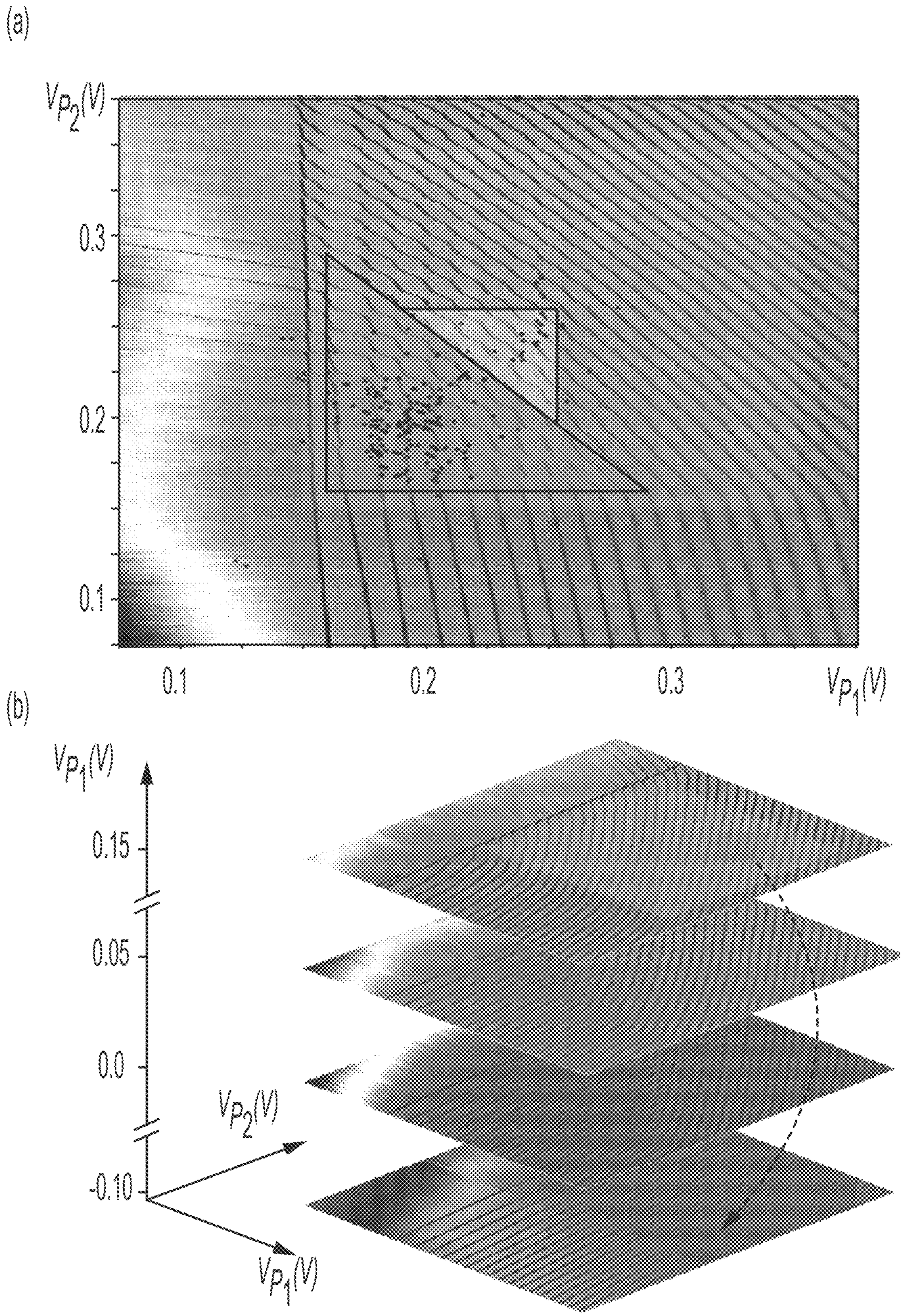
FIG. 18 shows (a) a scatter plot of the final state obtained in off-line tuning using the RBC framework. The tuner is set to tune to the double-quantum-dot state. We obtain a tuning success rate of 78.7%, calculated as the fraction of points that end up inside the green region, with an additional 10.2% of the points landing in an area that moderately resembles double-quantum-dot features, highlighted in white. (b) The three-dimensional space formed by 2D scans of the charge sensor response in the two plunger-gates space and the middle barrier gate. The arrow schematically shows the flow of the autotuner in the optimization loop from barrier voltages with no double quantum dot to lower voltages with a double-quantum-dot region. In both plots, the cyan square highlights the area where the initial points are uniformly sampled, while the green polygons mark the target double-quantum-dot region, according to Example 2.

We perform an off-line tuning on a sample premeasured large 2D scan to test the viability of the RBC framework in tuning the device state. The final state to be tuned to is set to the double-QD state. The initial points are uni-formly sampled in a square grid over a range of 200 mV, which encompasses approximately 18 electron transitions [high-lighted in FIG. 18(*a*)]. During the tuning loop, the rays are sampled at each point by linear interpola-tion within the 2D scan on a grid. FIG. 18 shows a scatter plot of the final state at the end of the tuning loop. To quantify the performance, we define a triangular region [highlighted in FIG. 18(*a*)] as the success region for tuning to a double-QD state. We report a tuning success rate of 78.7% for a set of 225 uniformly sampled initial points, with an additional 10.2% of the points landing in an area that moderately resembles double-QD features. For comparison, the success rate for tuning the 2D scans is 75(32) % when the tuning is started from a region enclosing at most nine transition lines.

We perform off-line tuning in a three-dimensional (3D) space formed by a series of scans in the plunger gates space taken at different values of the middle barrier gate. As can be seen in FIG. 18(*b*), by varying the middle barrier from −100 to 150 mV, the device can be tuned from having predomi-nantly double-QD features to having predominately single-QD features. The green overlays on the scans in FIG. 18(*b*) highlight the double-QD regions. For reference, the scan used in FIG. 18(*a*) is taken with the middle barrier set to 50 mV. The rays at a given point (VP1, VP2, VB) are sampled as before in the plunger space, but the fitness function now includes VB in its argument. We initialize 100 tuning runs within the top scan, as highlighted in cyan in FIG. 18(*b*), and tune to the double-QD state, finding an overall success rate of 67% for tuning in three dimensions.

The failure modes for the tuning process in both two dimensions and three dimensions include landing at tran-sition lines where the fingerprint does not correspond to either a single-QD state or double-QD state as well as converging to local minima of the fitness function. Although the addition of regularization ε(xo) mitigates the latter to some extent, further work on optimization algorithms is necessary to increase the tuning success rate. Incorporation of a CNN-based classifier to verify the state of the final state and, if necessary reinitiate the autotuner, would likely help alleviate the former is-sue. In comparison with the tuning results reported with CNNs, the RBC framework requires a compara-ble number of iterations to achieve the same end goal, leading to a significant reduction in data acquisition (approximately 60%) with use of rays instead of 2D scans.

An experimen-tal implementation of the ray-based clas-sification frame-work using double-quantum-dot devices was examined. We propose a measurement scheme relying on one-dimensional projec-tions in the plunger gates space as means to "fingerprint" the device states. With measure-ment efficiency in mind, we consider various combinations of the number of rays and the length of rays as well as multiple weight functions to determine an optimal balance between measurement load and classification accuracy. We show that for the device used, the performance accuracy remains at about 87% regardless of whether six, seven, or nine rays are used. This translates to an up to approximately 70% reduction in the number of measured points needed for classification compared with the CNN-based approach. Increasing the number of rays to 12 results in an accu-racy of about 90%, while reducing the number of points mea-sured by 40%. See FIG. 19 for comparison of all ray numbers tested.

We also show how the RBC framework can be imple-mented to tune the QD device in 2D and 3D gate space. We perform autotuning on a series of premeasured scans in 2D and 3D gate voltage spaces, reliably tuning the device from one state to another. In this work, we fo-cus on automated tuning of a QD device into a voltage space with coupled double QDs. It is also important to note that this tuning scheme does not achieve a spe-cific occupation of each QD, but rather achieves a few-electron double-QD regime. Depending on the intended functionality, (single-electron qubit, multielectron qubit, etc), additional methods are required to achieve an exact occupation for each QD.

With the noisy intermediate-scale quantum technology era on the horizon [38], it is important to consider the practical aspect of implementing automated control as part of the device itself, in the "on-chip" fashion. The network architecture necessary for RBC is significantly simpler and smaller than for CNN-based classification, making it more suitable for an implementation on minia-turized hardware with low power consumption. In particular, the neural net-work used to train the RBC comprises only four fully connected dense layers with 128, 64, 32, and 5 units, respectively. The total number of parameters necessary for the RBC is about $1.2 \times 10^4$.

With increasing complexity of QD devices in both QD number and gate geometry, the need for automated state identification and tuning will increase. With the develop-ment of QD-based spin qubits using industrial technologies, a technique that enables efficient and scalable characteriza-tion of QDs for qubit applications is necessary and provided by the RBC framework for measurement-cost-effective solution for state classifica-tion and tuning.

Example 3. Bounds on Data Requirements for the Ray-Based Classification

The problem of classifying high-dimensional shapes in real-world data grows in complex-ity as the dimension of the space increases. For the case of identifying convex shapes of different geometries, a new classification framework has recently been proposed in which the intersections of a set of one-dimensional representations, called rays, with the boundaries of the shape are used to identify the specific geometry. This ray-based classi-fication (RBC) has been empirically verified using a synthetic dataset of two- and three-dimensional shapes and has been validated experimentally. Here, we establish a bound on the number of rays necessary for shape classification, defined by key angular metrics, for arbitrary convex shapes. For two dimensions, we de-rive a lower bound on the number of rays in terms of the shape's length, diameter, and exterior angles. For convex polytopes in RN, we generalize this result to a similar bound given as a function of the dihedral angle and the geometrical parameters of polygonal faces. This result enables a different approach for estimating high-dimensional shapes using substantially fewer data elements than volumetric or surface-based approaches.

The problem of recognizing objects within images has received immense and grow-ing attention in the literature. Aside from visual object recognition in two and three dimensions in real-world applications, such as in medical images segmentation or in self-driving cars, recognizing and classifying objects in N dimensions can be im-portant in scientific applications. A problem arises in cases where data is costly to procure; another problem arises in higher dimensions, where shapes rapidly be-come more varied and complicated and classical algorithms for object identification quickly become difficult to produce. We combine machine learning algorithms with sparse data collection techniques to help overcome both problems.

The method we explore here is the ray-based classification (RBC) framework, which utilizes information about large N-dimensional data sets encoded in a col-lection of one-dimensional objects, called rays. Ultimately, we wish to explore the theoretical limits of how little data—how few rays, in our case—is required for re-solving features of various sizes and levels of detail. In this paper, we determine these limits when the objects to be classified are convex polytopes.

The RBC framework measures convex polytopes by choosing a so-called obser-vation point within the polytope, shooting a number of rays as evenly spaced as possible from this point, and recording the distance it takes for each ray to encounter a face. While it is reasonable to expect that an explicit algorithm for recognizing polygons in a plane can be developed, in arbitrary dimension such an explicit algorithm would be tedious to produce and theoretically unelightening. We leave the actual classification to a machine learning algorithm.

The process here is applicable to quantum information systems, e.g., in calibrating the state of semiconductor quantum dots to work as qubits. The various device configurations create an irregular polytopal tiling of a configuration space, and the specific shape of a polytope conveys useful infor-mation about the corresponding device state. We map these shapes as cost-effectively as possible. Here, the cost arises because polytope edges are de-tected through electron tunneling events which places hard physical limits on data acquisition rates. Apart from this original application, the techniques we developed should be valuable in any situation where object classification must be done despite constraints on data acquisition.

In the broad field of data classification in N=2, 3, 4, etc. dimensions, there are many unique approaches, often tailored to the constraints of the problem at hand. For example, higher dimensional data can be projected onto lower dimensions to employ standard deep learning techniques such as 3D ConvNets. Multiple low dimensional views of higher dimensional data can be collected to ease data collection and recognition. Models such as ShapeNets directly work with 3D voxel data. Data collected using depth sensors can be presented as RGB-D data or point clouds representing the topology of features present. Often, depth information is sparsely collected due to limitations of the depth sensors themselves. Within the field of representing 3D or higher dimensional data as point clouds, data can be treated in various ways such as simply N-dimensional coordinates in space, patches, meshed polygons, or summed distances of the data to evenly spaced central points. Critically, the RBC approach is suited for an environment in which data can be collected in any vector direction in N dimensional space while even coarse data collection of the total space would be practically too expensive or unfeasible.

The complexity of any classification problem intensifies in higher dimensions. This is the so-called curse of dimensionality, which has a negative impact on generalizing good performance of algorithms into higher dimensions. In general, with each feature and dimension, the minimum data requirement increases exponentially. This can be seen √in the present work: according to Theorem 4.2, the data requirement increases like NeαN. At the same time, in many applications data acquisition is very expensive, resulting in datasets with a large number of features and a relatively small number of samples per feature (so-called High Dimension Low Sample Size datasets).

Begin with a convex region Q⊂RN along with a point xo, the observation point, in the interior of Q. Given a unit vector v, the ray based at xo in the direction v is $$\mathfrak{R}_{x_o,v}=\{x_o+tv|t\in[0,\infty)\}. \tag{3.1}$$

The set of directions v at xo is naturally parameterized by the unit sphere SN−1. M many directions v1, . . . , vM∈SN−1 produces M many rays {Ri}iM=1, Ri=Rxo,vi based at xo. Because Q is convex, in the direction vi there will be a unique distance ti at which the boundary ∂Q is encountered. Given a set of directions and an observation point, the corresponding collection of distances is called the point fingerprint.

Definition 3.1. Given a convex region Q, a point xo∈Q, and a set of directions $\{vi\}^{i}_{M=1}$⊆SN−1, the corresponding point fingerprint is the vector $$\mathcal{F}(Q,x_o,\{v_i\}_{i=1}^{M})\equiv\mathcal{F}_{x_o}(t_1, \ldots ,t_M) \tag{3.2}$$

where ti∈(0, ∞] is unique value with xo+tivi∈∂Q.

In practice, there will be an upper bound on what values the ti may take, which we call T. If the ray does not intersect ∂Q prior to distance T, one would record ti=∞, indicating the region's boundary is effectively infinitely far away in that direction.

The fingerprinting process is depicted in FIG. 20(*a*). The question is to what extent one can characterize, or approximately characterize, convex shapes knowing only a fingerprint. If nothing at all is known about the region Q except that it is convex, full recognition requires infinitely many rays measured in all possible directions, effectively resulting in measuring the entire N-dimensional space. However, it turns out that if one puts restrictions on what the objects could be—for instance if it is known that Q must be a certain kind of polytope—information captured with a fingerprint may be sufficient. Better yet, if we do not require a full reconstruction of the shape but only some coarser form of identification, for example if we must distinguish triangles from hexagons but do not care exactly what the triangles or hexagons look like, then we can do with even smaller fingerprints.

With an eye toward eventually approximating arbitrary regions with polytopes, we define the following polytope classes.

Definition 3.2. Given $N \in \{2, 3, \ldots\}$ and d, l, $\alpha > 0$, let $Q(N, d, l, \alpha)$ be the class of convex polytopes in RN that have diameter at most d, all face inscription sizes at least l, and all exterior dihedral angles at most $\alpha$.

The "inscription size" of a polytope face is the diameter of the largest possible (N−1)-disk inscribed in that face. In the case N=2, polytopes are just polygons and polytope faces are line segments. In this case the inscription size of a face is just its length. For the case of N=3, the inscription size of a face is the diameter of the largest possible disk inscribed in this face, see FIG. 20(*b*). We can now formulate the following identification problem.

Problem 3.1 (The identification problem). Given a polytope $Q \in Q(N, d, l, \alpha)$, determine the smallest M so that, no matter where $xo \in Q$ is placed, a fingerprint made from no more than M many rays is sufficient to completely characterize Q.

Again, the actual identification is done with a machine learning algorithm. In $R^2$, we actually solve this problem and find an optimal value of M. In higher dimensions we find a value for M that works, but could be sharpened in some applications.

Hidden in Problem 3.1 is another problem we call the ray placement problem. To explain this, note that a large number of rays may be placed at xo, but if the rays are clustered in some poor fashion, very little information about the polytope overall geometry will be contained in the fingerprint. This means that before one can determine how many rays are needed, one must already know where to place the rays.

In $R^2$, this placement problem is easily solved: choosing a desired offset v0, the vi are placed at intervals of $2\pi/M$ along the unit circle. In higher dimensions the place-ment problem is much more difficult and we have to work with suboptimally-spaced rays. In fact, as we discuss later in this paper, even in $R^3$ an optimal placement is out of reach. To overcome this problem, we propose a general placement algorithm that works in arbitrary dimension and is reasonably sharp. As we show, the pro-posed algorithm is sufficient to enable concrete estimates on the numbers of rays required to resolve elements in $Q(N, d, l, \alpha)$.

In many practical applications, such as calibration of quantum dot devices men-tioned earlier, Problem 3.1 is much too strict. We may not need to reconstruct polytopes exactly but only classify them to within approximate specifications. For example, we may only wish to know if a triangle is "approximately" a right trian-gle, without needing enough data to fully reconstruct it. Or we may wish to distin-guish triangles and hexagons, and not care about other polyhedra. Theoretically, this involves separating the full polytope set $Q(N, d, l, \alpha)$ into disjoint subclasses K C1, . . . , $CK \subseteq Q(N, d, l, \alpha)$, with possibly a "leftover" set CL=Q(N, d, l, α)\i=1 Ci of unclassifiable or perhaps unimportant objects. The idea is that an object's importance might not lie in its exact specifications, but in some characteristic it possesses.

Problem 3.2 (The classification problem). Assume $Q(N, d, l, \alpha)$ has been partitioned into classes {Ci}iK=1. Given a polytope Q, identify the Ci for which $Q \in Ci$.

The classification problem is eminently more suitable for machine learning than the full identification problem. This is in part because the outputs are more discrete (we can arrange it so the algorithm returns the integer i when $Q \in Ci$), and in part because machine learning usually produces systems good at identifying whole classes of examples that share common features, while ignoring unimportant details. Importantly, a satisfactory treatment of the classification problem can lead to solutions of more complicated problems, such as classifying compound items like tables, chairs, etc. in a 3D environment or geometrical objects obtained through measurements of an experimental variable in some parameter space. Depending on the origin or purpose of such objects, they naturally belong to different categories. For example, in the 3D real world, furniture and plants define two distinct classes that, if needed, can be further subdivided (e.g., a subclass of chairs, tables). Objects belonging to a single class, in principle, share common characteristics or similar geometric features of some kind.

In the quantum computing application boundaries are identified by measuring discrete tunneling events, and there is little ambiguity in determining when a boundary was crossed. Since the fingerprinting method relies on identifying boundary crossings, in other circumstances boundary detection might require some other resolution. Here, machine learning methods compensate for boundaries that are indistinct or partially undetectable, as such algorithms often remain robust in the presence of noise.

A solution to Problem 3.2 in the supervised learning setting is obtained by training a deep neural network (DNN) with the input being the point fingerprint and an output identifying an appropriate class. Apriori it is unclear how many rays are nec-essary for a fingerprint-based procedure to reliably differentiate between polytopes. With data acquisition efficiency being the focus of this work, we want to theoret-ically determine the lower bound on the number of rays needed. Such a bound is fully within reach for polygons in $R^2$ (Theorem 4.1), and can be approximated in all higher dimensions (Theorem 4.2).

For a polytope face to be visible in a fingerprint, at least one ray must intersect it. To establish not only the presence of a face but its orientation in N-space, at least N many rays must intersect it. The smaller a face is, the further away from the observation point xo it is, or the more highly skewed its orientation is, the more difficult it is for a ray to intersect it. We address the case of polygons in $R^2$ first, as we obtain the most complete information there.

Recall that $Q(2, d, l, \alpha)$ is the class of polygons in the plane with diameter$<$d, all edge lengths$>$l, and all exterior angles$<\alpha$.

Theorem 4.1 (Polygon identification in $R^2$). Assume Q is a polygon in $Q(2, d, l, \alpha)$, and let xo be a point in the polygon's interior, from which M many evenly spaced rays emanate. If $$M > \left\lceil \frac{4\pi}{\arcsin\left(\frac{l}{d}\sin\alpha\right)} \right\rceil, \tag{4.1}$$

then two or more rays will intersect each boundary segment of Q, and one segment will be hit at least 3 times. The notation above indicates the usual ceiling function.

Knowing the location of two points on each edge is almost, but not quite, suffi-cient for identifying the polygon. There remains an ambiguity between the polygon and its dual; see FIG. 21(*b*). This is resolved if at least one edge is hit 3 times. Theorem 4.1 completely solves the identification problem in $R^2$.

Figure 22:
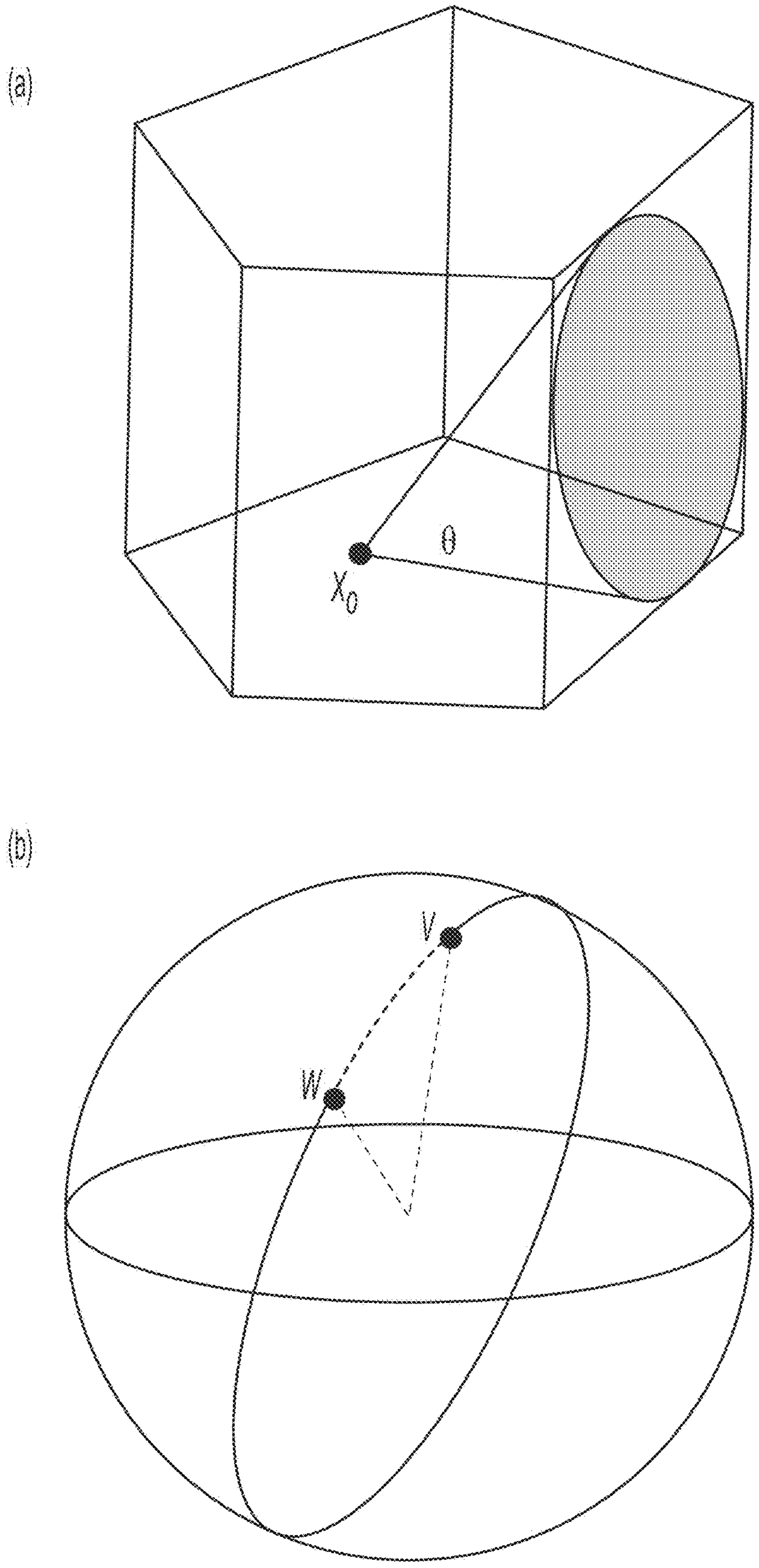
FIG. 22 shows (a) the angular span of a face, θ, for a sample polytope in R3. (b) A visualization of the standard great-circle distance, according to Example 3.
Figure 23:
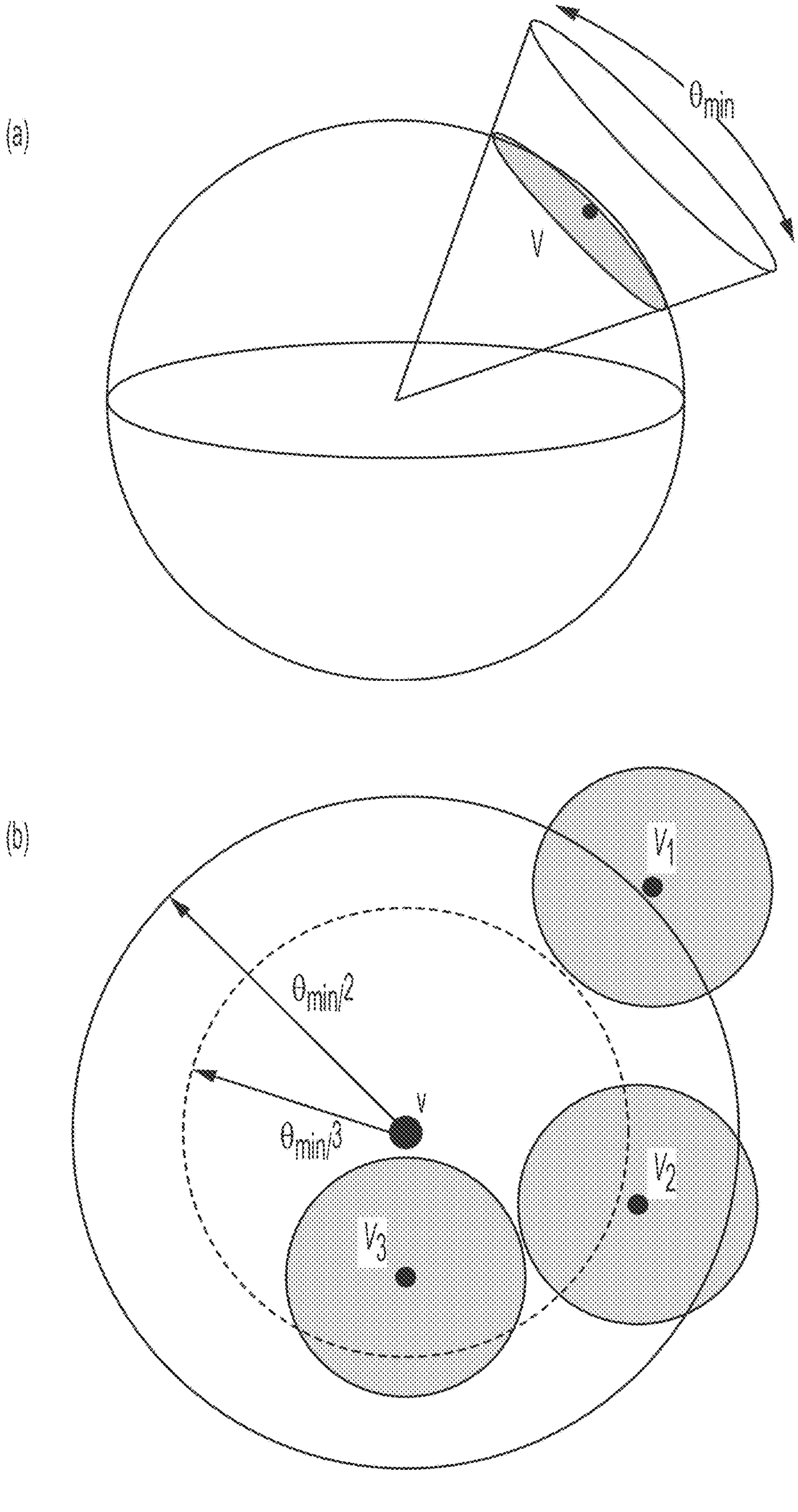
FIG. 23 shows (a) a projection of a cone with cone angle θ min onto SN−1, creating the ball Bv (½ θ min). (b) The covering argument: the centers vi∈P of those balls of radius ⅙ θ min which help cover Bv (⅓ θ min) must lie within Bv (½ θ min), according to Example 3.

Identification in $R^N$ follows a largely similar theory, with two substantial changes. The first is that we must change what is meant by the angular span of a face, the second is that we must deal with the ray placement problem mentioned. The notion of angular span is relatively easily adjusted (see FIG. 22(*a*)).

Definition 4.1 (Angular span). If Q is a convex polytope in RN, N≥2, xo is an observation point in Q, and L is a face of Q, the angular span of L is the cone angle of the largest circular cone based at xo so that the cross-section of the cone that is created by plane containing L lies entirely within L.

We create a solution for the ray placement problem with an induction algorithm, but first we require some spherical geometry. Given two points v, w∈SN−1, let DistSN−1 (v, w) be the great-circle distance between them (see FIG. 22(*b*) for visualization in $R^3$). Given v∈SN−1, we define a ball of radius r on SN−1 to be $$\overline{B}_v(r)=\{w\in \mathbb{S}^{N-1}|\mathrm{Dist}_{S^{N-1}}(v,w)\le r\}. \tag{4.3}$$

For example, a ball Bv(π) of radius u is the entire sphere itself, and any ball of the form Bv(π/2) is a hemisphere centered on v. It will be important to know the (N−1)-area of the unit sphere SN−1, and also the (N−1)-area of any ball Bv(r)⊆SN−1. The standard area formulas from differential geometry are $$A(\mathbb{S}^{N-1})=\frac{N\pi^{\frac{N}{2}}}{\Gamma\left(\frac{N}{2}+1\right)}, \tag{4.4}$$

$$A(\overline{B}_v(r))=\frac{(N-1)\pi^{\frac{N-1}{2}}}{\Gamma\left(\frac{N-1}{2}+1\right)}\int_0^r \sin^{N-2}(\rho)d\rho.$$

The evaluation of $\int\sin^{N-2}$(p)dρ is a bit unwieldy, but it will be enough to have the bounds $$\frac{\pi^{\frac{N-1}{2}}}{\Gamma\left(\frac{N+1}{2}\right)}\sin^{N-1}(r)<A(\overline{B}_v(r))<\frac{\pi^{\frac{N-1}{2}}}{\Gamma\left(\frac{N+1}{2}\right)}r^{N-1}. \tag{4.5}$$

Definition 4.2 (Density of points in SN−1). Let P⊆SN−1 be a finite col-lection of points P={v1, . . . , vk}, vi∈SN−1 for 1≤i≤k. We say that the set P is ϕ-dense in SN−1 if, whenever v∈SN−1, then there is some vi∈P with DistSN−1 (v, vi)≤ϕ.

We can now give a solution to the ray placement problem on SN−1. We use an inductive point-picking process. Pick a value ϕ; this will be the density one desires for the resulting set of directions on SN−1. Begin the induction with any arbitrary point v1∈SN−1. If ϕ is small enough that Bv1 (ϕ) is not the entire sphere, then we select a second point v2 to be any arbitrary point not in Bv1 (ϕ). Continuing, if points v1, . . . , vi have been selected, let vi+1 be any arbitrary point chosen under the single constraint that it is not in any Bvj (ϕ), j<i. That is, choose vi+1 arbitrarily under the constraint $$v_{i+1}\in \mathbb{S}^{N-1}\backslash(\overline{B}_{v_1}(\varphi)\cap\ldots\cap\overline{B}_{v_i}(\varphi)), \tag{4.6}$$

should such a point exist. Should such a point not exist, meaning Bv1 (ϕ) ∩ . . . ∩Bvi (ϕ) already covers SN−1, the process terminates, and we have our collection P={v1, . . . , vi}.

Whether an algorithm terminates or not is always a vital question. This one does, and Lemma 4.1 gives a numerical bound on its maximum number of steps. This process requires numerous arbitrary choices—each point vi is chosen arbitrarily except for the single constraint that it not be in any of the Bvj (ϕ), j<i—so it does not produce a unique or standard placement of points. This contrasts to the very orderly choice of directions vi=v0+2πi/M on S1 that we relied on in Theorem 4.1. Nevertheless, a set selected in this manner does have valuable properties, which we summarize in the following lemma.

Lemma 4.1 (Properties of the placement algorithm). Let P={v1, v2, . . . }⊆SN−1 be any set of points chosen using the inductive algorithm above. Then $$M\le\sqrt{2\pi N}\left(\frac{1}{\sin(\varphi/2)}\right)^{N-1}. \tag{4.7}$$

Theorem 4.2 (Polytope identification in RN). Assume Q∈Q(N, d, l, α). It is possible to choose a set of M many directions {vi}iM=1 so that given any observation point xo∈Q, the corresponding rays Ri=Rxo,vi have the following properties: (1) The collection of rays {Ri}iM=1 strikes each polytope face N or more times. (2) The number of rays M is no greater than $$M\le\sqrt{2\pi N}\left(\frac{1}{\sin\left(\frac{1}{12}\theta_{min}\right)}\right)^{N-1} \tag{4.10}$$

The estimate (4.10) can be improved if our solution for the placement problem can be improved. The optimal placement problem is unsolved in general; this and related problems go by several names, such as the hard spheres problem, the spheri-cal codes problem, the Fejes T'oth problem, or any of a variety of packing problems. A theoretical bound in any dimension, benchmarking, and comparison are provided. Codes that are empirical can include, once a particular setting has been chosen, a look-up table.

Problem 3.2 in the context of the quantum dot dataset studied considers electrons that are held within two potential wells of depths d1 and d2, which can be adjusted. Depending on these values, elec-trons might be confined, might be able to tunnel between the two wells or travel freely between them, and might be able to tunnel out of the wells into the exterior electron reservoir. Individual tunneling events can be measured, and, when plotted in the d1-d2 plane, create an irregular tiling of the plane by polygons. The polygonal chambers represent discrete quantum configurations, and their boundaries repre-sent tunneling thresholds. The shape of a chamber provides information about the quantum state it represents.

One cap map the (d1, d2) configurations onto the quantum states of the device by taking advantage of the geometry of these polygons. With scal-ability being the overall objective, it was essential that the mapping requires as little input data as possible. For theoretical reasons it is known that each of the lattice's polygons belongs to one of six classes; roughly speaking, these are quadri-lateral, hexagon, open cell (no boundaries at all), and three types of semi-open cells. Further, the hexagons themselves are known to be rather symmetric: they have center-point symmetry, with four longer edges typically of similar length, and two shorter edges of equal length (see FIG. 24(*a*)).

In the language of Problem 3.2, the interesting subclasses of polygons are C1: the hexagons with the symmetry attributes we described, including the quadrilat-erals which are "hexagons" with a=0; C2, C3, C4: three kinds of semi-open cells contained between parallel or almost parallel lines; and C5: the open-cell, which has no boundaries at all. The three classes of polygon C2, C3, C4 are distinguished from one another by their slopes in the d1-d2 plane: polygons in class C2 are between parallel lines with slopes between about 0 and −½, in class C3 between about −½, and about −2, and class C4 between about −2 and −∞. All other polygon types, for these purposes, are unimportant and can go in the "leftover" CL category. The question is how few rays are required to distinguish among the polygons within these classes.

Figure 24:
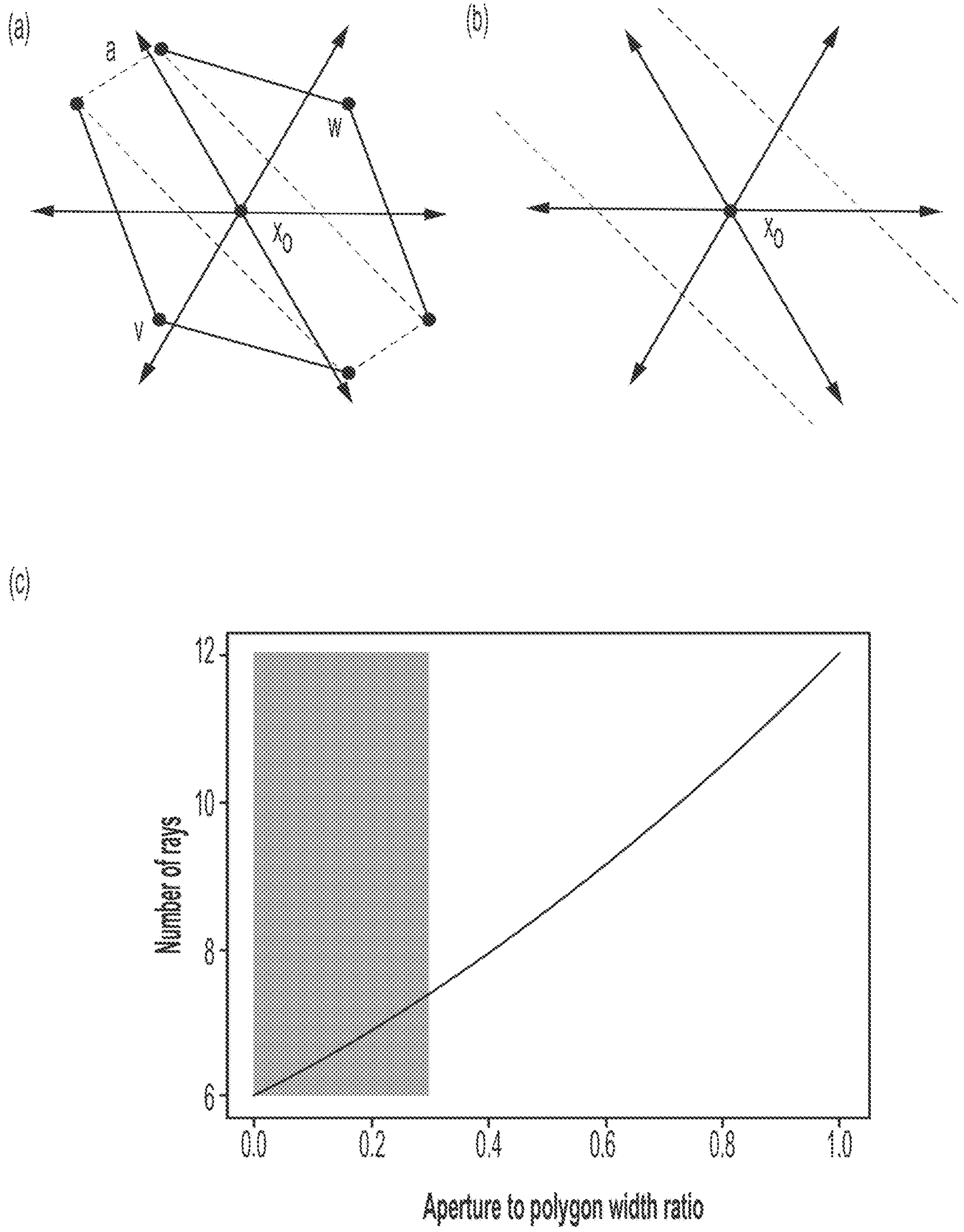
FIG. 24 shows two of the five geometrical shapes typical of the quantum dot dataset: a hexagon corresponding to a double-dot state (a) and a strip contained by parallel lines corresponding to a single-dot state. (c) Plot of the lower bound M on the number of rays to the ratio a/w. The shaded region corresponds to a/w ratios typical for real quantum dot devices, according to Example 3.

In the quantum dot dataset, we must address one additional complication: the "aperture," that is the shortest segment in FIG. 24(*a*), is sometimes undetectable. The physical reason for this is that crossing this barrier represents electron travel between the two wells, and this event is often below the sensitivity of the detector.

Prop 4.1. Let xo be an observation point which might be within a polygon of type C1-C5. Five rays are needed to distinguish these types. If the short segment is undetectable and the hexagon has the dimensions indicated in FIG. 24(*a*), then $$M = \left\lceil \frac{6\pi}{\arccos\left(\frac{-1+(a/w)^2}{1+(a/w)^2}\right)} \right\rceil, \tag{4.12}$$

many rays are needed to distinguish these types.

The theoretical bound given by Eq. (4.12) is compared with the performance of a neural network trained to recognize the difference between strips and hexagons, and a neural network approaches the theoretical ideal. In actual quantum dot environments, values of a lie between about 0 (where the hexagon degenerates to a quadrilateral) and about 1 w. For these values of a/w, Eq. (4.12) gives theoretical bounds on the necessary number of rays between six and about nine. Training experiments confirm that six rays and relatively small DNN are in fact sufficient to obtain classification accuracy of 96.4% (averaged over 50 training and testing runs, standard deviation σ=0.4%). This performance is on par with a ConvNet-based classifier using two-dimensional (2D) images of the shapes for which average accuracy of 95.9% (σ=0.6%). RBC has been verified using experimental data, both off-line (i.e., by sampling rays from pre-measured large 2D scans) and online (i.e., by directly measuring the device response in a ray-based fashion). The RBC outperformed the more traditional 2D image-based classification of experimental quantum dot data that relied on convolutional neural network while requiring up to 70% less data points.

With respect to ray based classification framework for convex polytopes, a lower bound on the number of rays for shape identification in two dimensions with generalized the results to arbitrary higher dimensions has been described.

Since objects in N-dimensional space can be approximated by convex polytopes, provided they are suitably rectifiable, this technique opens the way to generalization. The problem of dividing a complicated object into a set of approximating polytopes can be considered a form of salience recognition and data compression—of detecting and storing the most useful or important features of the object. When the data itself is scarce or costly to procure, one seeks methods that economize on input data while retaining salience recognition, even at the expense of some accuracy loss or of requiring heavy computing resources. RBC incorpo-rating multiple intersections of the rays can be extended to solve problems where multiple nested shapes are present enclosing the observation point. Ray-based data acquisition combined with machine learning provides a path forward.

Example 4. Robust Autotuning of Noisy Quantum Dot Devices

Conventional autotuning approaches for quantum dot (QD) devices, while showing some success, lack an assessment of data reliability. This leads to unexpected failures when noisy data is processed by an autonomous system. In this example, we describe a framework for robust autotuning of QD devices that combines a machine learning (ML) state classifier with a data quality control module. The data quality control module acts as a "gatekeeper" system, ensuring that only reliable data is processed by the state classifier. Lower data quality results in either device recalibration or termination. To train both ML systems, we enhance the QD simulation by incorporating synthetic noise typical of QD experiments. We confirm that the inclusion of synthetic noise in the training of the state classifier significantly improves the performance, resulting in an accuracy of 95.1(7) % when tested on experimental data. We then validate the functionality of the data quality control module by showing the state classifier performance deteriorates with decreasing data quality, as expected. Our results establish a robust and flexible ML framework for autonomous tuning of noisy QD devices.

Gate-defined semiconductor quantum dots (QDs) are a quantum computing technology that has potential for scalability due to their small device footprint, operation at few Kelvin temperatures, and fabrication with scalable techniques. However, minute fabrication inconsistencies present in current devices mean that every qubit must be individually calibrated or tuned. To enable more efficient scaling, this requirement can be met with automated methods.

Automated tuners, both ML- and non-ML-based, make many sequential decisions based on limited data acquired at each step. In such a framework, small er-ror rates can quite rapidly compound into high failure rates. One failure mode of QD autotuning algo-rithms is signal-to-noise ratio (SNR) reductions during the tuning process. One way to avoid tuning failure and to promote trust in ML-based automation is to use an assessment techniques to verify the quality of data before moving forward with tuning.

In this example, a framework for robust automated tuning of QD devices that combines a convolutional neural network (CNN) for device state estimation with a CNN for assessing the data quality is described. Synthetic noise characteristic of QD devices are used train these two networks. To establish the validity of the noisy dataset, we first train a CNN module to classify device states and achieve an accuracy of 94.8(9) % on exper-imental data—an improvement of 47% over the mean accuracy of neural networks trained on noiseless simula-tions. We then use the noisy simulations to train a data quality control module for determining whether the data is feasible for state classification. We show that the latter not only makes intuitive predictions, but also that the predicted quality classes correlate with changes in classifier performance. These results establish a scalable framework for robust automated tuning and manipulation of QD devices.

Conventional automation proposals for QDs lack an assessment of the prediction reliability. This largely stems from a lack of such measures for ML, though for some approaches the "quantitative" rather than "qualitative" nature of labels further complicates this issue. The quantitative nature of prediction means that partial state identification is not only expected but might be necessary for successful operation. A two-state prediction for a given scan should indicate that the scan captures a transition between those states, which is used for tuning. At the same time, if the SNR is low or in the presence of unknown fabrication defects, such a mixed prediction might instead indicate model confusion. In the latter case, if such confusion is not accounted for and corrected, it is likely to result in autotuning failure.

Figure 25:
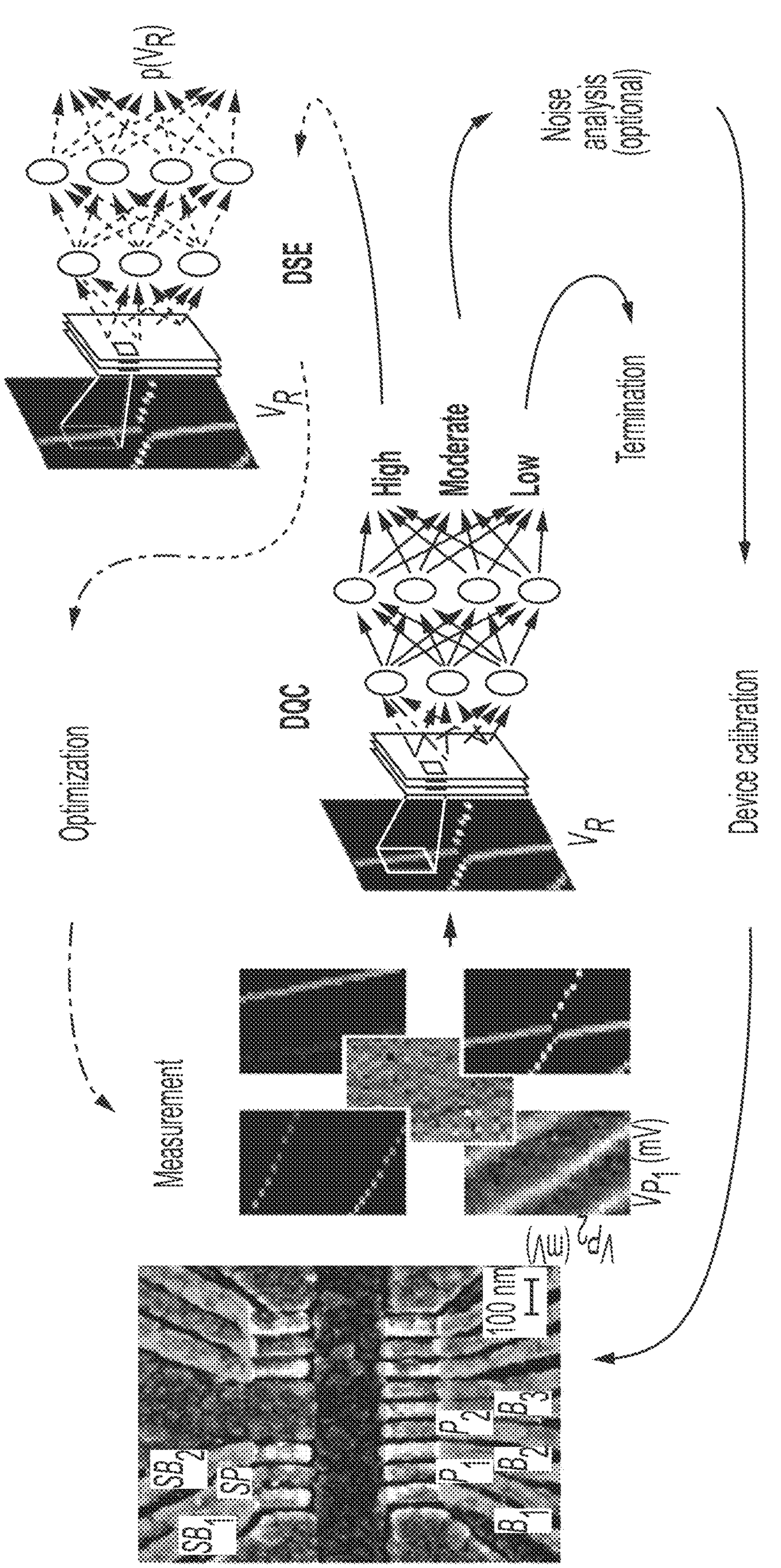
FIG. 25 shows a framework for quantum dot autotuning with data quality assessment. There are two consecutive machine learning modules guiding the autotuning system: DQC is used to determine the quality of the measured scan and DSE is used to assess the state of the device. The autotuning loop begins with the quantum dot device shown on the left. A 2D voltage sweep of two plunger gates (VP1, VP2) is measured by a quantum dot charge sensor in the upper left channel. The numerical gradients of the measurements are then fed into the DQC module to determine whether the scan is suitable for classification. Depending on the returned quality class, the scan is passed to the DSE module for state assessment and optimization (the high quality class), the device is recalibrated to reduce the noise affecting scan quality (the moderate quality class), or the autotuning loop is terminated (the low quality class). Before recalibration or termination, optional noise analysis could be performed to determine what recalibration might be needed, according to Example 4.

To overcome this issue, we describe a framework that involves a device state estimation module (DSE) combined with an ML-based data quality control module (DQC) to alert the autotuning system when the measured scan is unsuitable for classification. A flow of the framework is shown in FIG. 25. The DQC module includes a CNN classifier with a three-level output signaling the quality of a scan. If the scan is classified as high quality, the DSE module followed by an optimization step is exe-cuted. For scans classified at the intermediate moderate quality, a device recalibration step is initiated. Depending on the device and the level of system automation, this step can include readjustment of the sensor, validation of the gate cross-capacitances, or barrier gate adjustments, among other things. To better gear the recalibration, this step could be preceded by noise analysis to determine the most prominent types of noise affecting the quality of the scan. Finally, scans with low quality indicate that there might be a bigger underlying issue. This class results in autotuning termination.

Relatively shallow CNN-based noise estimation models can be used for some image pro-cessing and denoising tasks. However, the ability to de-velop and prepare such estimators hinges on the avail-ability of training data. The noise features present in QD devices can be complex and vary significantly be-tween devices. A reliable training dataset has to account for the different types and magnitudes of noise that can be encountered experimentally. While full control over the noise is unfeasible experimentally, it can be achieved with synthetic data, where the different types and magnitudes of physical noises can be controllably altered.

Figure 26:
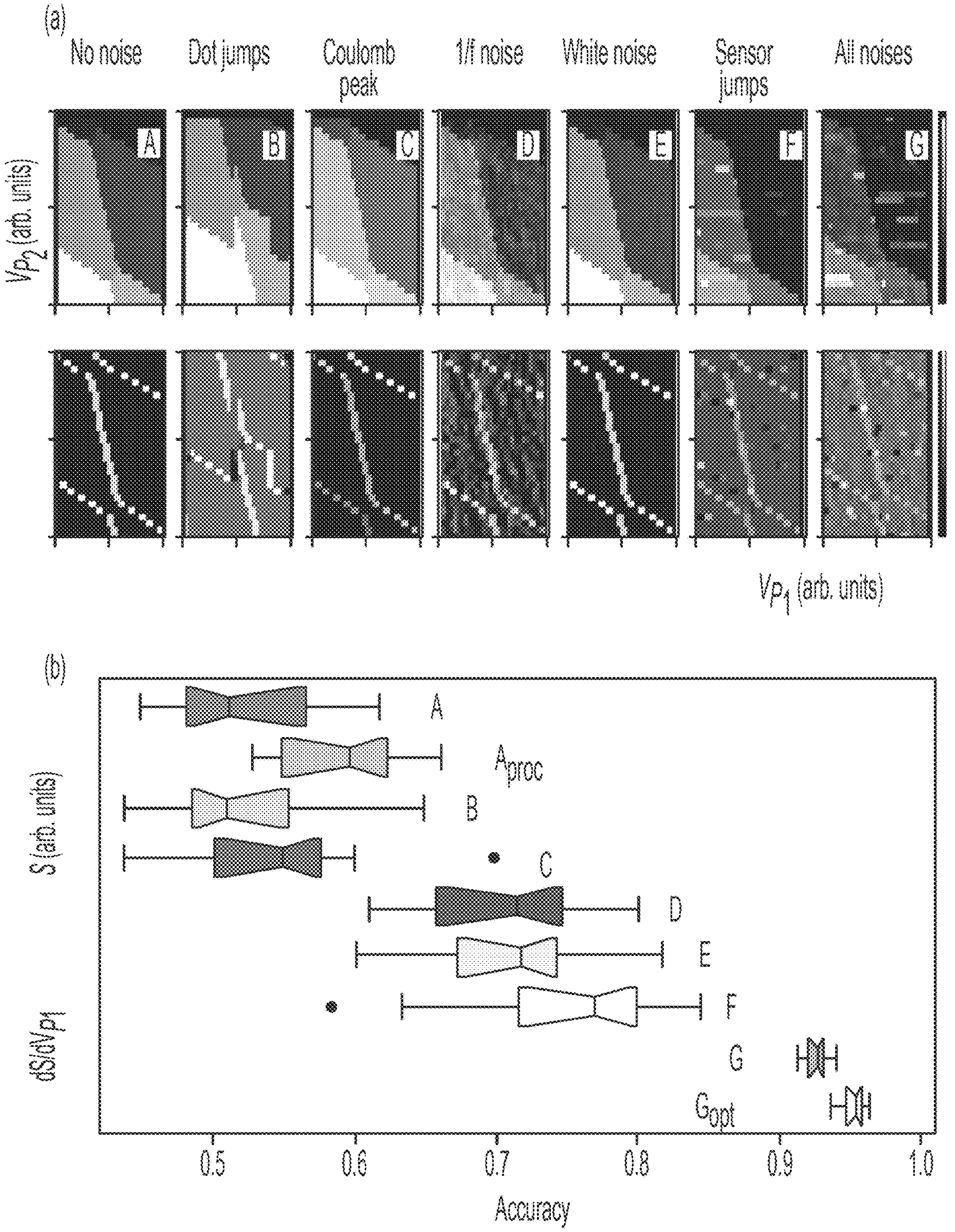
FIG. 26 shows (a) a sample simulated charge stability diagrams as a function of plunger gates with different types of noise added. Top: Simulated sensor (S) output. Bottom: Gradient of sensor in the VP1 direction, dS/dVP1 (arb. units). Noise magnitudes in this plot match the best parameters except for dot jumps and Coulomb peak which are exaggerated in B and C for visibility. (b) Box plot showing the performance of DSE classifiers on experimental data for models trained on noiseless data without and with preprocessing (Aproc), data with each noise type incorporated (one at a time), and the best combination of noises (dot jumps, sensor jumps, 1/f, and white noise). Each box plot depicts the distribution of the performance from 20 models. While sensor jumps, white noise, and 1/f noise each lead to significant improvement over the noiseless data, the best noise combination provides a large reduction in variability as well as a slight boost in accuracy. Optimization of the DSE model further improves the performance (Gopt), according to Example 4.

To establish a benchmark performance for compari-son with CNN classifiers trained on synthetic noise, we use a dataset of about 1.6×104 noiseless measurements. The QD simulator we use is based on a simple model of the electrical gates and a self-consistent potential calculation and capacitance model to determine the stable charge configuration. This simulator is capable of generating current maps and charge stability diagrams as a function of various gate voltages that reproduce the qualitative features of experimental charge stability diagrams. The simulated data represent an idealized device in which the charge state is sensed with perfect accuracy. FIG. 26(*a*) shows a sample noiseless simulated stability diagram.

To validate the synthetic noise and test the performance of the state classifiers, we generate a dataset of 756 manually labeled experimental images. This data was ac-quired using two quadruple QD devices, both fabricated on a $Si/Si_xGe_{1-x}$ heterostructure in an accumulation-mode overlapping aluminum gate architecture and operated in a double dot configuration. The gate-defined QD devices use electric potentials defined by metallic gates to trap single electrons either in one central potential, or potentials on the left and right side of the device. Changes in the charge state are sensed by a sin-gle electron transistor (SET) charge sensor. The charge states of the device correspond to the presence and rel-ative locations of trapped electrons: no dot (ND), single left (LD), central (CD) or right (RD) dot, and double dot (DD). We use experimental data consisting of two different datasets of 82 and 503 images, respectively, as well as data collected from a different device resulting in 171 images. All images were man-ually labeled by two team members and any conflicting labels were reconciled through discussions with the re-searcher responsible for data collection.

There are multiple sources of noise in experimental data: dangling bonds at interfaces or defects in oxides lead to noise at the device level; thermal noise, shot noise, and defects in electronics throughout the readout chain result in noise at the readout level. In many QD devices, changes in the device state are sensed by conduc-tance shifts in an SET due to their sensitivity to transi-tions with no change in net charge. The response of an SET is nonlinear which causes variation in the signal of charge transitions. The various types of noise manifest themselves in the measurement though distortion that might obscure or deform the features indicating the state of the device (borders between stable charge regions).

To prepare a dataset for the DQC module, we ex-tend the QD simulator to incorporate the most common sources of experimental noise. We consider five types of noise: dot jumps, Coulomb peak effects, white noise, 1/f (pink) noise, and sensor jumps. Experimentally, white noise, 1/f noise, and sensor and dot jumps appear due to different electronic fluctuations affecting an SET charge sensor. White noise can be attributed to thermal and shot noise while the 1/f noise can have contributions from various dynamic defects in the device and readout circuit. We modeled the charge sensor with a linear response, though in reality it has a nonlinear response due to the shape of the Coulomb blockade peak. We account for this with a simple model of an SET in the weak coupling regime. Physically, dot jumps and sensor jumps are two manifestations of the same process: electrons populating and depopulating charge traps in the device, which we model as two level systems with characteristic excited and ground state life-times. Dot jumps are the effect of these fluctuations on the quantum dot while sensor jumps are the effect on the SET charge sensor. We provide additional details on how we implement these synthetic noises below.

Each of the modeled noises can obscure or mimic charge transition line features, potentially confusing ML models. White noise and 1/f noise both generate high frequency components that can be picked up in the charge sensor gradient. Additionally, the 1/f noise can generate shapes that look similar to charge transition lines. Sensor jumps cause large gradients where they oc-cur. By reducing the gradient, Coulomb peak movement can reduce the visibility of charge transitions. Finally, dot jumps can distort the shapes of charge transition lines. Panels B-F in FIG. 26(*a*) show charge stability dia-grams with each of the discussed noise types added (one at a time).

For each type of noise, we generate a distinct dataset of about 1.6×104 simulated measurements using the same device parameters as were used for the noiseless dataset. The initial noise magnitudes are set to pro-duce images qualitatively similar to moderately noisy experimental data. The final magnitudes are optimized through a semi-structured grid search over a range of val-ues centered around the initial noise levels. At each step, the correlation between the noise level and model per-formance on a subset of experi-mental images from one of the devices is used to guide the search. The dataset used to train models for each noise type are generated by varying each noise parameter with a standard deviation of 1% of the parameters' value. Panel G in FIG. 26(*a*) shows a sample image with the optimized combination of noises.

The final noisy simulated dataset is generated by fix-ing the relative magnitudes of white noise, 1/f noise, and sensor jumps and varying the magnitudes together in a normal distribution. The means of the magnitudes are set to the optimized values and the standard deviation is one third of each magnitude's value. Fixing the relative magnitudes and varying them together allows this dis-tribution of noise levels to approximate a range of SNR encountered in experiments.

The QD state labels are quantitative so a mixed label indicates an intermediate state so that a simple entropy of a model's prediction cannot be used as a measure of confu-sion. Rather, an alternative quality measure needs to be established. To achieve this, we leverage the simulated noise framework established in the previous section to perform a controlled analysis of the DSE module performance as noise levels are varied.

In the framework presented in FIG. 25, we describe use of three levels of data quality—high, moderate, and low—to determine the subsequent actions. Since features defining the QD states are affected in distinct ways by the noise, the performance versus noise level analysis is carried out sepa-rately for each state rather than for the whole dataset. To determine the threshold between the three quality classes, we generate a dataset of 1.15×105 simulated images with varying amounts of noise added. We vary the magnitudes of all noises that negatively af-fect the SNR (sensor jumps, 1/f, and white noise) together from 0× to 7× the optimized noise magnitudes while keeping the dot jumps noise variation within the 1% used previously. This distribution of noise includes a large variation of noise levels from near-perfect data to data that has nearly no recognizable QD features. This is necessary for establishing noise thresholds for the data quality classes that ensure saturation of the performance of the state classifier at both the low and high levels.

By evaluating a state classifier on this dataset we deter-mine the relationship between the noise level and perfor-mance within each class. From the correlations between noise level and performance, we establish per-QD state data quality thresholds. The thresholds are chosen to en-sure high performance of the state classifier for the high quality data, an expected degradation of performance for data with mod-erate quality, and poor performance on data with low quality. Specifically, we set the cutoffs us-ing the relationship between the model's mean absolute error (MAE) and noise level, shown in FIG. 29.

We set these cutoff levels at relatively conservative amounts of noise, which would enable a fairly risk-averse tuning algorithm. This parameter choice could be ad-justed to the needs of a given application depending on the error sensitivity of an autotuning method. To ensure that images in the low noise class are very reliably iden-tified, we set the threshold between low and moderate noise classes to be at the noise level where the average MAE has gone up by 2.5% of the full range, which is similar to a 2 sigma cutoff for the lower tail of a normal distribution. We set the threshold between moderate and high noise where the average MAE has reached 50% of its full range, where the model is roughly equally likely to be wrong as right for a single state image.

With these thresholds, state labels, and the known amount of noise added, we then assign the simulated data with quality classes for DQC module training. For this training we use a distinct dataset with the same distribution of noise used to set noise class thresholds.

To prepare the data quality control module (DQC in FIG. 25), we validate the simulated noise by training a CNN-based classifier to recognize the state of QD devices from charge stability diagrams (module DSE in FIG. 25). We show how each of the added noises affects the classifi-cation accuracy and confirm that their combination leads to sig-nificant improvement in performance, suggesting in-creased similarity between the simulated and experimen-tal data. We then use the noisy simulated data to train the DQC module. The full experimental dataset is used to confirm the corre-lation between the predicted qual-ity class and classification performance. Finally, we use large scans to show that the robust model outperforms the simplistic model and show how the predicted quality classes overlap with the confusion of the DSE module.

To determine how the considered noise types affect the performance of the DSE classifier, we modify the simulation with each type of noise individually and evaluate models trained with that data on the experimental test dataset. For initial testing, we optimize a CNN architecture defining the simplistic model used for state recog-nition on noiseless data using the Keras Tuner API baseline, we include the 52.3(5.1) % test accuracy for models trained on simulated data with-out noise added. As expected, the high classification accu-racy of 93.6(9) % achieved during training drops signifi-cantly when the models are used to classify noisy experimental images. Some data processing techniques used to suppress experimental noise might help with the perfor-mance. Our analysis confirms that preprocessing of experi-mental data improves the average accuracy and reduces the variance between models. However, the observed accuracy of 59.7(3.1) % (box plot) on the experimen-tal dataset is still much lower than necessary for reliable state assessment.

When looking at the various types of noise individually, analysis reveals that 1/f noise, white noise, and sensor jumps most significantly improve the model per-formance, with 71.1(5.6) %, 70.9(6.5) %, and 75.3(6.9) % accuracy, respec-tively. Coulomb peaks and dot jumps turn out to be unhelp-ful on their own. The latter seems to affect the performance negatively. Combining all types of noise results in a signifi-cant improvement in both the performance and variation of the result, with an accuracy of 92.5(7) %. For comparison, in the context of simulated transport data, previous work found that only the sensor jumps, 1/f, and white noise improved classifier performance, though the observed improvements were not significant. When combining the noises, a varied SNR was used by varying sensor jumps, 1/f, and white noise together. This uniformly tunes the SNR be-tween simulated images as a replacement for the explicit Coulomb peak. Effectively, this results in a varying visibility of charge transition lines but with more uniformity.

Since the model architecture we use was op-timized for a noiseless dataset, we re-optimize the CNN architecture using the noisy simulated dataset. This al-lows us to find a model that is structurally best suited to that type of data and thus further improve the per-formance. With these changes, we find an increase in the classification accuracy by about 2.5% to 95.1(7) %, box plot Gopt in FIG. 26(*b*). We also test preprocessing of the data to remove extreme values for completeness and find no significant difference at 94.8(1.0) % accuracy. Comparing box plots Aproc and Gopt shows the high level of improvement in QD state classification we are able to achieve by adding noise to the simulated training set and optimizing the model.

Figure 27:
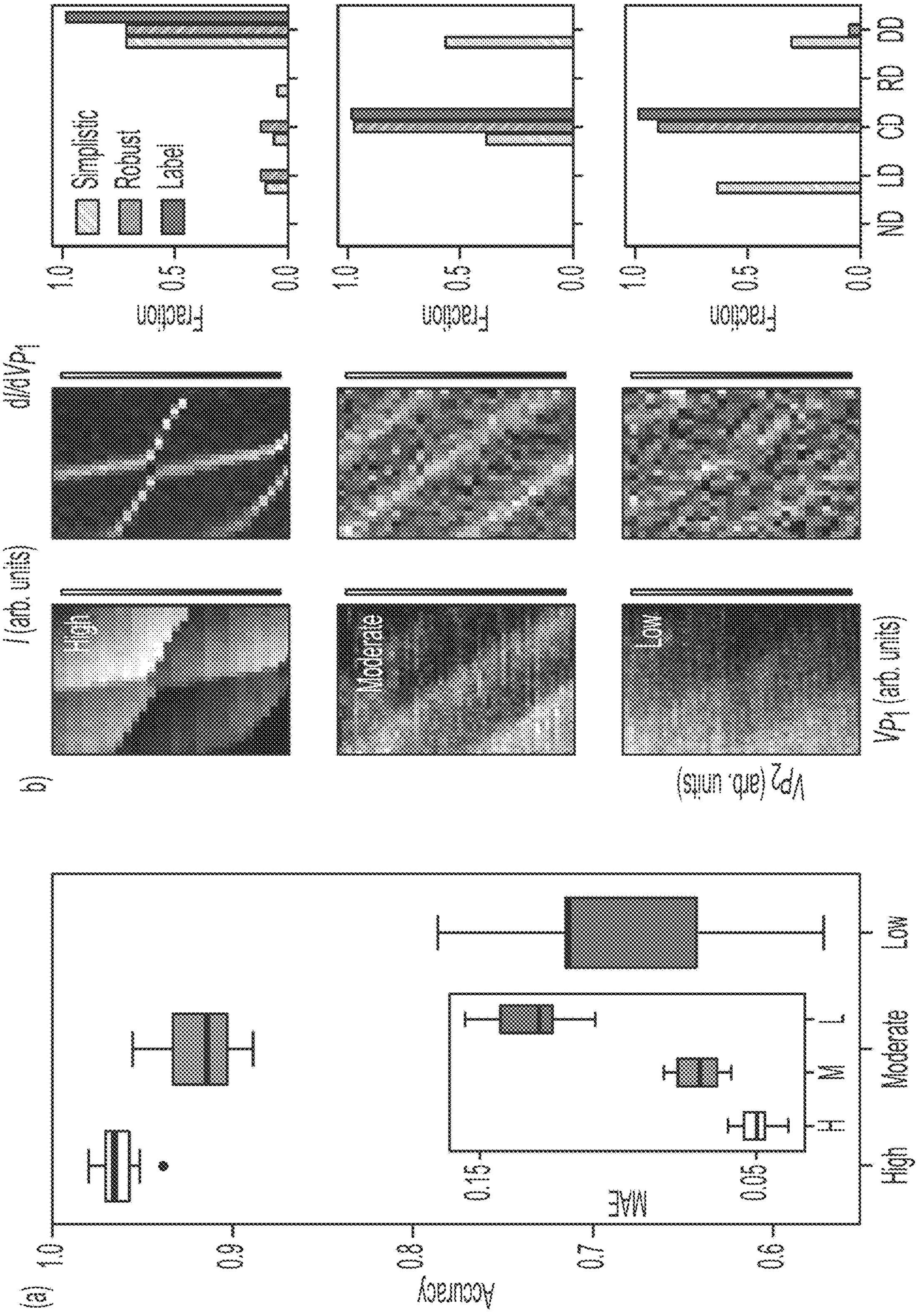
FIG. 27 shows (a) box plots of model accuracy for each assigned noise class for the experimental data. Inset: Box plots of mean absolute error (MAE) for each noise class. (b) Example data and predictions of both the simplistic and robust models. Raw sensor data (left), gradient data (middle), and predictions (right). We show a high quality DD example, a moderate quality CD example, and a low quality CD example. For the bar plot, we include the full prediction vector for the simplistic and robust models, as well as the ground truth label for the image, according to Example 4.

To confirm the validity of the thresholds used to define the three quality classes, we use the experimental dataset. The DQC module applied to the experimental images classified 607 images as high quality, 135 images as moderate quality, and 14 images as low quality. FIG. 27(*a*) shows the performance of the optimized state classifiers for each quality class. The error bars represent the variation in performance between the 20 optimized models trained using the noisy dataset (box plot Gopt in FIG. 26(*b*)). The DSE module performs well on data assigned as low noise, with 96.4(9) % prediction accuracy, and begins to decrease for the moderate class at 91.9(2.1) %. For data in the high noise class the models' performance decreases to 69.3(5.6) %. The variance in performance also increases as the data quality degrades. To account for the expected partial predictions between QD states, we further validate this correlation using a fine-grained metric. We use the MAE to capture element-wise deviation. The inset in FIG. 27(*a*) shows the MAE between true and predicted labels for the three quality classes. The observed correlations in accuracy with the quality class are also seen in MAE. This analysis confirms that the moderate quality class does indeed capture re-ductions in SNR that mildly affect model performance, while the low quality class identifies images that are sub-stantially more difficult for the DSE module.

FIG. 27(*b*) shows sample experimental images from each of the quality classes and bar plots of the state pre-diction vectors for the simplistic and robust state clas-sifiers, as well as the ground truth labels. The top row shows a high quality DD example correctly classified by both models, as indicated by the largest DD component in the bar plot. The middle row shows a sample CD im-age assessed to have moderate quality and the bottom row shows a low quality CD image. Both moderate and low quality images are incorrectly classified by the simplistic model. The level of noise in the low quality image in FIG. 27(*b*) makes it hard for a human to identify the state. Here, the simplistic model is confused between LD and DD states while the robust model correctly identi-fies this image as CD. This illustrates the level of im-provement that noisy training data provides for our DSE module.

We assess the viability of the proposed frame-work by performing tests of the DSE and DQC modules over two large experimental scans shown in FIG. 27(*a, b*). FIG. 27 shows comparisons of classification performance between sample models trained on noiseless (c, d) and noisy (e, f) data along with the predicted quality class (g, h).

We use a series of 60 mV by 60 mV scans sampled at every pixel within the large scans and leaving a 30 mV margin at the boundary to ensure that each sampled scan is within the full scan boundaries. From FIGS. 28(*c*) and (*d*), the simplistic model does fairly well on the parts of scans where the SNR is good, but it becomes less reliable when the SNR is reduced. In the first scan, this is manifested by random speckling of the DD prediction within the CD region (the top half of the scan) as well as by the frequent changes in state assessment for images sampled within a couple of pixels (the left half of that scan). A similar effect is visible in the left half of the second scan, where the prediction oscillates between RD and DD. For comparison, the predictions of the robust model, shown in FIGS. 28(*e*) and (*f*), are much more stable and accurate.

While areas with mixed labels are produced by both models, for the robust model, they are primarily indica-tive of transitions between states. For the simplistic model, mixed labels are assigned also within single-state parts of the scans. Such labels should not be used for au-totuning as they will degrade the optimization step (see FIG. 25).

Figure 28:
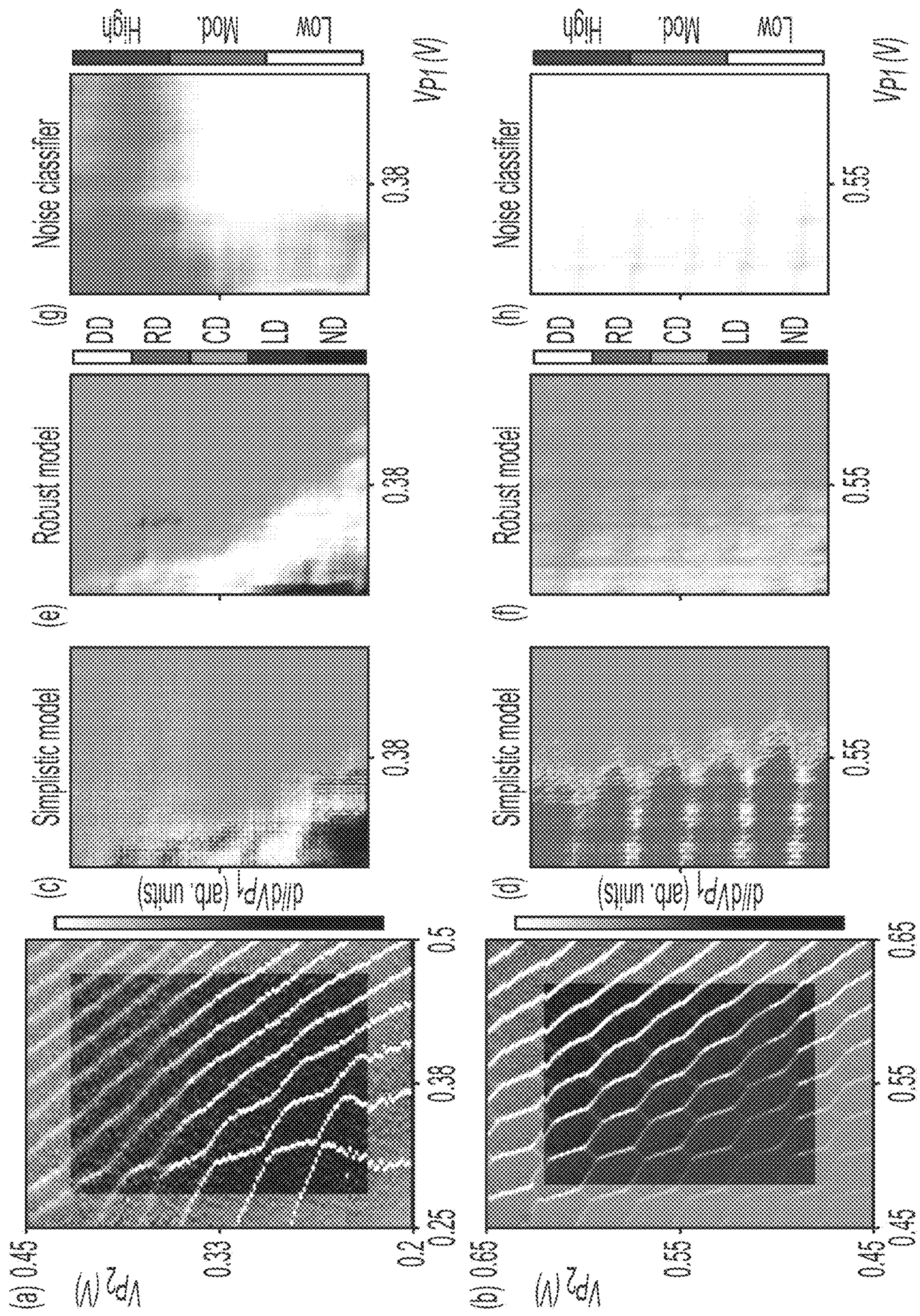
FIG. 28 shows (a, b) full charge stability diagram of a double QD device. In (a), a few characteristic noises can be seen: minor 1/f or white noise is seen in the speckling throughout and sensor jumps are especially visible towards the bottom of the image. Visualization of the prediction of an average state classifier model trained on simulated data with no noise (c, d), and the best state classifier trained on noise-augmented simulations (e, f). The color at each point is the average of the color of each state weighted by the model's prediction. Hue is averaged by angle in hue space, e.g., blue and green are averaged to teal. (g, h) Visualization of the predictions of the DQC module, according to Example 4.

A side-by-side comparison of panels (e) and (g) (as well as (f) and (h)) in FIG. 28 reveals that regions where mixed labels are returned by the robust models closely match regions flagged as moderate quality by the DQC module. This validates the DQC module as a tool to determine if the scan quality is sufficient for reliable state assessment or whether the device is in need of recalibration. Overall, these state and data quality classification maps show that the DQC and DSE modules, when put together, provide reliable high level information for autotuning algorithms.

Results show that adding physical noise to simu-lated data can dramatically improve the performance of machine learning algorithms on experimental data. Im-portantly, we are able to achieve high level performance without any preprocessing or denoising of the data. We also show how the synthetic noise can be used to develop ML tools to assess the quality of experimental data and that the assigned data quality correlates with state clas-sifier performance, as desired. Combining these tools en-ables a framework we outlined in FIG. 25, in which the data quality control module determines whether to move forward with state classification and optimization. This framework is an important step towards autotuning of QD devices with greater reliability.

We note that the thresholds used to establish the qual-ity classes in the data quality control module were chosen to provide meaningful separation. However, depending on the application's risk tolerance, these thresholds can be adjusted to obtain the error rates needed to prevent failure of an autotuning algorithm. Beyond the classi-fication of the data quality, our flexible synthetic noise model allows for extensions in which the data is labeled by the exact type and level of noise rather than the over-all quality. ML models can then be trained to predict the predominant types of noise, which in turn would enable tailored recalibration actions to mitigate them.

Broadly, our noise augmentation approach confirms that perturbing simulated data with realistic, physics-based noise can vastly improve the performance of simulation-trained ML models. This may be a useful in-sight for other research combining ML and physics. From a transfer learning perspective, the observed performance increase could be attributed to the physical noise aug-mentation shifting the training data distribution nearer to the experimental test distribution. Additionally, our data quality control module presents a paradigm for ML reliability estimation in which physically-motivated noise models are used to determine whether to move forward with data classification.

Five different types of noise were added to the simulated data: dot jumps, Coulomb peak effects, 1/f noise, white noise, and sensor jumps. Of these, the white noise is the simplest to implement by adding normally distributed noise with zero mean and fixed standard deviation at every pixel. The standard de-viation value is determined as part of the noise optimiza-tion process. The 1/f noise is generated in Fourier space with random phase sampled uniformly over $[0, 2\pi)$. The Coulomb peak effect is applied using a simple model of a quantum dot in the weak coupling regime which yields a conductance lineshape of the form:

$$G/G_{max}=\cos h^{-2}(A(V-V_{min}))$$

where G is the conductance, Gmax is the peak conduc-tance of the line, A is a parameter that controls the linewidth and is determined during noise optimization, Vmin is the peak center, and V is the signal seen by the simulated sensor due to the quantum dots. Dot jumps and sensor jumps are generated using the same underlying physics principles. We model them as charge traps with characteristic excited and ground state life-times necessary for capturing or ejecting electrons. We achieve this by performing Bernoulli trials to determine if a jump occurs at a given pixel. This allows the jumps to follow a geometric distribution—the discrete analogue to an exponential distribution. Magnitudes of sensor jumps are drawn from a normal distribution with zero mean and fixed standard deviation determined during noise optimization. Magnitudes of dot jumps are drawn from a Poissonian distribution with fixed rate also determined during noise optimization.

Figure 29:
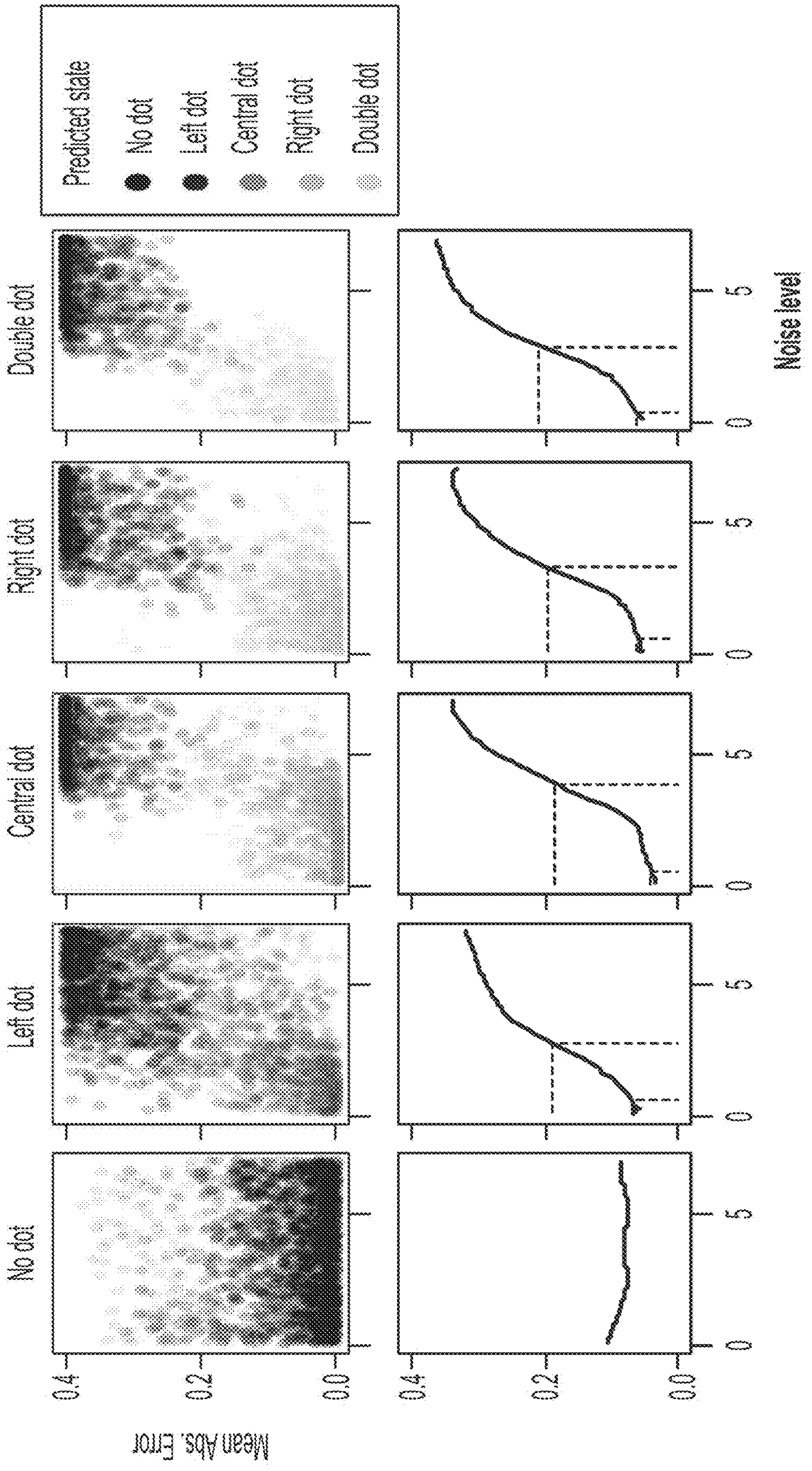
FIG. 29 shows (a, b) Full charge stability diagram of a double QD device. In (a), a few characteristic noises can be seen: minor 1/f or white noise is seen in the speckling throughout and sensor jumps are especially visible towards the bottom of the image. Visualization of the prediction of an average state classifier model trained on simulated data with no noise (c, d), and the best state classifier trained on noise-augmented simulations (e, f). The color at each point is the average of the color of each state weighted by the model's prediction. Hue is averaged by angle in hue space, e.g., blue and green are averaged to teal. (g, h) Visualization of the predictions of the DQC module, according to Example 4.

To provide better clarity on how we determine the noise level thresholds for training the DQC module, here we show plots of the data used to set these thresholds. The top row in FIG. 29 shows a series of scatter plots of the MAE between the true labels and the DSE model predictions as a function of noise level. The model's ar-chitecture is optimized on noiseless data and the model is trained on noisy data. This plot illustrates how the DSE performance changes as the noise level increases, revealing a roughly sigmoidal relationship. The noise level where the MAE sharply rises vary between the LD, CD, RD, and DD states. For the ND state the model has on average small error regardless of the noise level.

The dashed lines in the bottom row of FIG. 29 indicate the lower and upper thresholds at 2.5% and 50% of the full range of the MAE for LD, CD, RD, and DD states. The lower threshold is fairly conservative and captures a modest rise in MAE. At the upper threshold, on the other hand, the slope of the mean of the MAE is near its maximum and the model rapidly becomes less reliable. These thresholds can be further adjusted based on the specific application.

Since we found no clear dependence of the MAE for ND on the noise level, the ND thresholds were set sepa-rately. Above the 50% thresholds, the DSE has trouble distinguishing between ND and any other state, making the ND predictions unreliable. Thus, the upper thresh-old for ND was set based on the threshold determined for the remaining four states. For consistency, the lower threshold for ND was determine in an analogous fashion.

Both machine learning modules are built and trained using the TensorFlow (v.2.4.1) Keras Python API. We use three different model architectures: two for testing the DSE for noiseless and noisy data, and a third one in the DQC module. All architectures are optimized to ensure high performance using the Keras Tuner and the Optuna hyperparameter tuner.

The optimized neural network architectures are presented in FIG. 30. We find from our optimization that architecture with no fully connected layers before the output layer perform better at state classification.

Example 5. Autotuning of Double-Dot Devices. In Situ with Machine Learning

As used herein. "autotuning" refers to finding a range of gate voltages where the device is in a particular "global configuration" (i.e., a no-dot, single-dot, or double-dot regime). Steps of the experimental implementation of the autotuner are presented in FIG. 31.

Step 0: Preparation. Before the ML systems are engaged, the device is cooled down, and the gates are manually checked for response and pinch-off voltages. Furthermore, the charge sensor and the barrier gates are also tuned using traditional techniques.

Step 1: Measurement. A two-dimensional (2D) measurement of the charge-sensor response over a fixed range of gate voltages. The position for the initial measurement (given as a center and a size of the scan in millivolts) is provided by a user.

Step 2: Data processing. Resizing of the measured 2D scan VR and filtering of the noise (if necessary) to assure compatibility with the neural network.

Step 3: Network analysis. Analysis of the processed data. The CNN identifies the state of the device for VR and returns a probability vector p(VR).

Step 4: Optimization. An optimization of the fitness function δ(ptarget.p(VR)), given in Eq. (2), resulting either in a position of the consecutive 2D scan or decision to terminate the autotuning.

Step 5: Gate-voltage adjustment. An adjustment of the gate voltages as suggested by the optimizer. The position of the consecutive scan is given as a center of the scan (in millivolts).

The preparation step results in a range of acceptable voltages for gates, which allows "sandboxing" by limiting the two plunger voltages controlled by the autotuning protocol within these ranges to prevent device damage, as well as in establishment of the appropriate voltage level at which the barrier gates are fixed throughout the test runs (precalibration). The charge-sensing dot is also tuned manually at this stage. The sandbox also helps define the size of the regions used for state recognition. Proper scaling of the measurement scans is crucial for meaningful network analysis: scans that are too small may not contain enough features necessary for state classification, while scans that are too large may result in probability vectors that are not useful in the optimization phase.

Steps 1-5 mentioned above are repeated until the desired global state is reached. In other words, we formulate the autotuning as an optimization problem over the state of the device in the space of gate voltages, where the function to be optimized is a fitness function δ between probability vectors of the current and the desired measurement outcomes. The autotuning is considered successful if the optimizer converges to a voltage range that gives the expected dot configuration.

Figure 31:
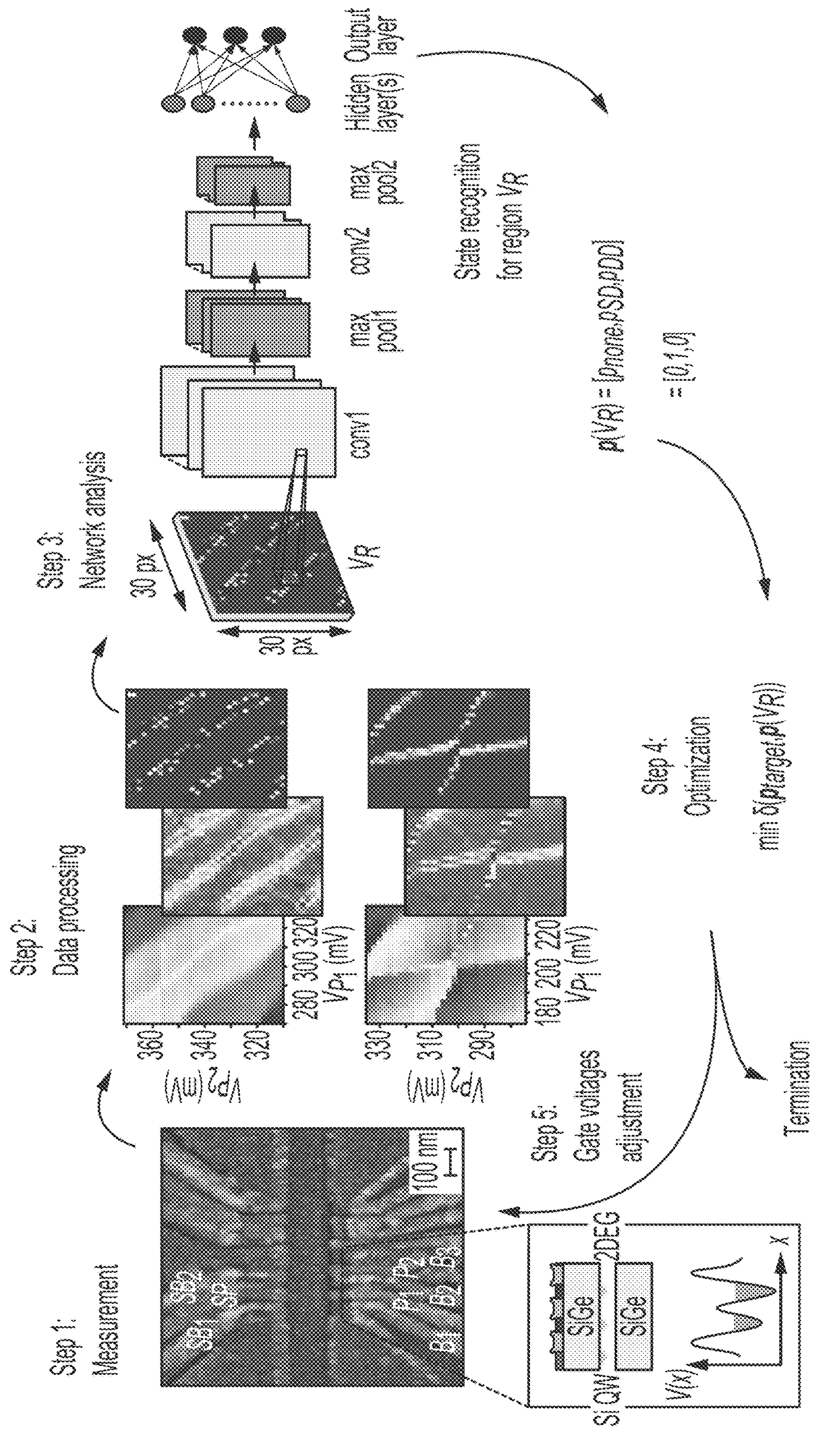
FIG. 31 shows an autotuning loop. In Step 1, we show a false-color scanning electron micrograph of a Si/SixGe1-x quadruple-dot device identical to the one measured. The double dot used in the experiment is highlighted by the inset, which shows a cross section through the device along the dashed white line and a schematic of the electric potential of a tuned double dot. Bi (i=1, 2, 3) and Pj (j=1, 2) are the barrier and plunger gates, respectively, used to form dots, while SB1, SB2, and SP are gates (two barriers and a plunger, respectively) used to control the sensing dot. In Step 2, to assure compatibility with the CNN, the raw data are processed and (if necessary) downsized to (30×30) pixel size. The processed image VR is analyzed by the CNN (Step 3), resulting in a probability vector p(VR) quantifying the current state of the device. In the optimization phase (Step 4), the algorithm decides whether the state is sufficiently close to the desired one (termination) or whether additional tuning steps are necessary. If the latter, the optimizer returns the position of the consecutive scan (Step 5), according to Example 5.

QDs are defined by electrostatically confining electrons using voltages on metallic gates applied above a 2D electron gas (2DEG) present at the interface of a semiconductor heterostructure. Realization of good qubit performance is achieved via precise electrostatic confinement, band-gap engineering, and dynamically adjusted voltages on nearby electrical gates. A false-color scanning electron micrograph of a $Si/Si_xGe_{1-x}$ quadruple-dot device identical to the one measured is shown in FIG. 31, Step 1. The device is an overlapping accumulation-style design including three layers of aluminum surface gates, electrically isolated from the heterostructure surface by deposited aluminum oxide. The layers are isolated from each other by the self-oxidation of the aluminum. The inset in FIG. 31 features a schematic cross section of the device, showing where QDs are expected to form and a modeled potential profile along a one-dimensional (1D) channel formed in the 2DEG. The 2DEG, with an electron mobility of 40000 $cm^2V^{-1}s^{-1}$ at $4.0\times10^{11}$ $cm^{-2}$, as measured in a Hall bar, is formed approximately 33 nm below the surface at the upper interface of the silicon quantum well. The application of appropriate voltages to the gates defines the QDs by selectively accumulating and depleting regions within the 2DEG. In particular, depletion "screening" gates (shown in red in FIG. 31) are used to define a 1D transport channel in the 2DEG, reservoir gates (shown in purple in FIG. 31) accumulate electrons into leads with stable chemical potential; plunger gates (shown in blue and labeled Pj, j=1,2, in FIG. 31) accumulate electrons into quantum dots and shift the chemical potential in the dots relative to the chemical potential of the leads; and, finally, barrier gates (shown in green and labeled Bi, i=1,2,3, in FIG. 31) separate the defined quantum dots and control the tunnel rates between dots and to the leads. In other words, the choice of gate voltages determines the number of dots, their position, their coupling, and the number of electrons present in each dot. Across the central screening gate, opposing the main channel of four linear dots, larger quantum dots are formed to act as sensitive charge sensors capable of detecting single-electron transitions of the main channel quantum dots. The measurements are taken in a dilution refrigerator with a base temperature <50 mK and in the absence of an applied magnetic field.

To automate the tuning process and eliminate the need for human intervention, we incorporate ML techniques into the software controlling the experimental apparatus. In particular, we use a pretrained CNN to determine the current global state of the device. To prepare the CNN, we rely on a data set of 1001 quantum-dot devices generated using a modified Thomas-Fermi approximation to model a set of reference semiconductor systems comprising of a quasi-1D nanowire with a series of depletion gates the voltages of which determine the number of dots, the charges on each of those dots, and the conductance through the wire. The data set is constructed to be agnostic about the details of a particular geometry and material platform used for fabricating dots. To reflect the minimum qualitative features across a wide range of devices, a number of parameters are varied between simulations, such as the device geometry, gate positions, lever arm, and screening length, to name a few. The idea behind varying the device parameters when generating training data set is to enable the use of the same pretrained network on different experimental devices.

Figure 37:
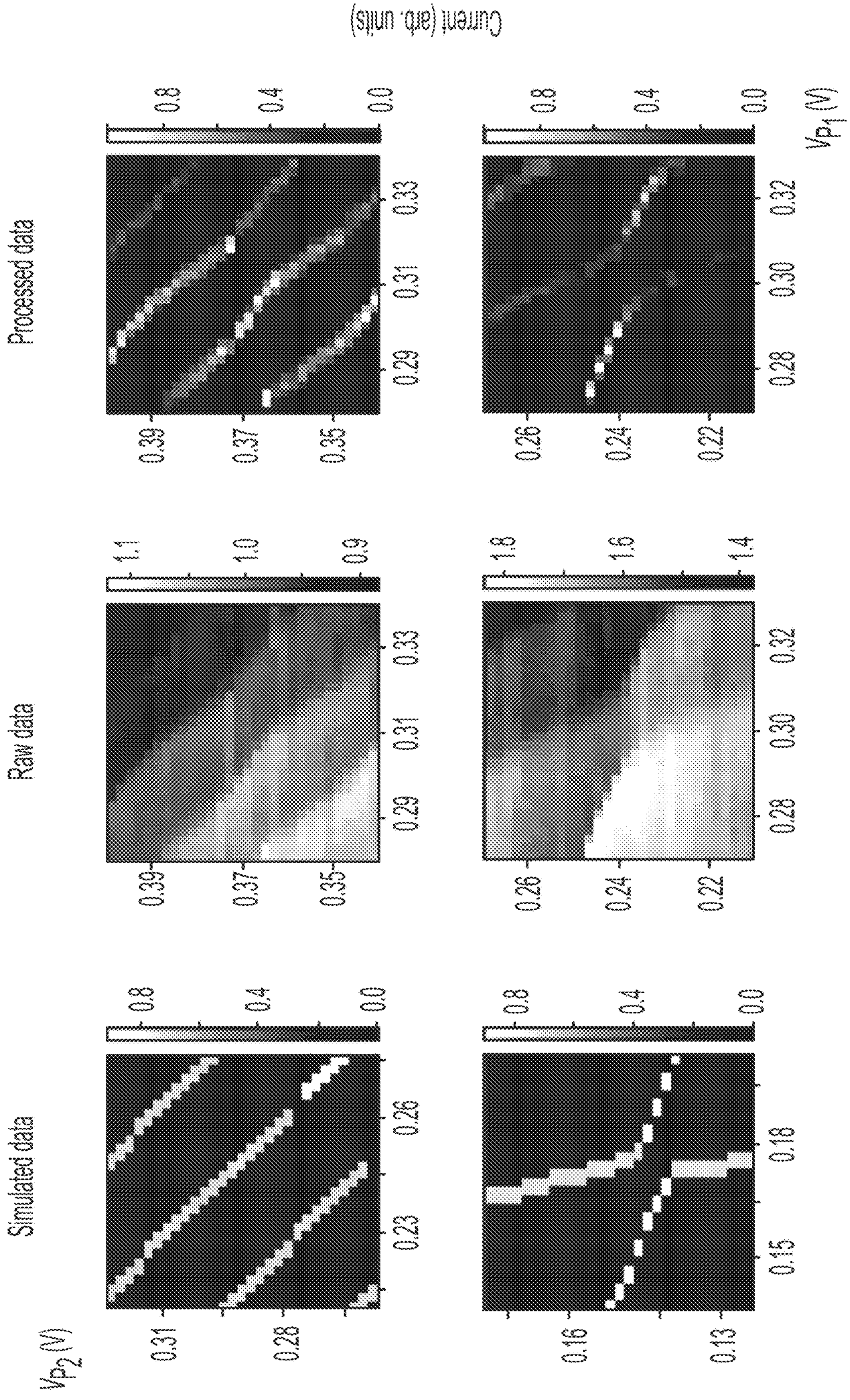
FIG. 37 shows a relationship between the simulated, raw, and processed data. The top row consists of sample scans with single-dot regions and the bottom row of scans with double-dot regions. The left-hand column shows the simulated data, the middle column shows the raw acquired experimental data, and the right-hand column shows the processed experimental data (as observed by the CNN classifier), according to Example 5.

The synthetic data set contains full-size simulated 2D measurements of the charge-sensor readout and the state labels at each point as functions of plunger gate voltages (VP1,VP2) (at a pixel level). For training purposes, we generate an assembly of 10 010 random charge-sensor measurement realizations (ten samples per full-size scan), with charge-sensor response data stored as (30×30) pixel maps from the space of plunger gates (for examples of simulated single- and double-dot regions, respectively, see the right-hand column in FIG. 37). The labels for each measurement are assigned based on the probability of each state within a given realization, i.e., based on the fraction of pixels in each of the three possible states:

$$p(V_R) = [p_{none}, p_{SD}, p_{DD}] = \left[\frac{N-(|SD|+|DD|)}{N}, \frac{|SD|}{N}, \frac{|SD|}{N}\right], \quad (1)$$

where |SD| and |DD| are the numbers of pixels with a single-dot and a double-dot state label, respectively, and N is the size of the image VR in pixels. As such, p(VR) can be thought of as a probability vector that a given measurement captures each of the possible states (i.e., no dot, single dot, or double dot). The resulting probability vector for a given region VR, p(VR), is an implicit function of the plunger gate voltages defining VR. It is important to note that, while CNNs are traditionally used to simply classify images into a number of predefined global classes (which can be thought of as a qualitative classification), we use the raw probability vectors returned by the CNN (i.e., quantitative classification).

The CNN architecture consists of two convolutional layers (each followed by a pooling layer) and four fully connected layers with 1024, 512, 256, and 3 units, respectively. The convolutional and pooling layers are used to reduce the size of the feature maps while extracting the most important characteristics of the data. The fully connected layers, on the other hand, allow for nonlinear combinations of these characteristics and classification of the data. We use the Adam optimizer with a learning rate η=0.001, 5000 steps per training and a batch size of 50. The accuracy of the network on the test set is 97.7%.

The optimization step of the autotuning process (Step 4 in FIG. 31) involves minimization of a fitness function that quantifies how close a probability vector returned by the CNN, p(VR), is to the desired vector, ptarget. We use a modified version of a fitness function to include a penalty for tuning to single-dot and no-dot regions:

$$\delta(p_{target}, p(V_R)) = \|p_{target} - p(V_R)\|_2 + \gamma(V_R), \quad (2)$$

where ||∩||2 is the L2 norm and the penalty function γ is defined as $$\gamma(V_R) = \alpha g(p_{none}) + \beta g(p_{SD}), \quad (3)$$

where g(x) is the arctangent shifted and scaled to assure that the penalty is non-negative [i.e., g(x)≥0] and that the increase in penalty is more significant once a region is classified as predominantly non-double dot (i.e., the inflection point is at x=0.5). Parameters α and β are used to weight penalties coming from no dot and single dot, respectively.

For optimization, we use the Nelder-Mead method implemented in PYTHON. The Nelder-Mead algorithm works to find a minimum of an objective function by evaluating it at initial simplex points—a triangle in the case of the 2D gate space in this work. Depending on the values of the objective function at the simplex points, the subsequent points are selected to move the overall simplex toward the function minimum. In our case, the initial simplex is defined by the fitness value of the starting region VR and two additional regions obtained by lowering the voltage on each of the plungers one at a time by 75 mV.

To evaluate the autotuner in an experimental setup, a $Si/Si_xGe_{1-x}$ quadruple quantum-dot device (see FIG. 31, Step 1) is precalibrated into an operational mode, with one double quantum dot and one sensing dot active. The evaluation is carried out in three main phases. In the first phase, we develop a communication protocol between the autotuning software and the software used to control the experimental apparatus. In the process, we collect 83 measurement scans that are then used to refine the filtering protocol used in Step 2 (see the middle column in FIG. 37). These scans are also used to test the classification accuracy for the neural network.

In the second phase, we evaluate the performance of the trained network on hand-labeled experimental data. The data set includes (30×30)mV scans with 1 mV per pixel and (60×60)mV with 2 mV per pixel. Prior to analysis, all scans are flattened with an automated filtering function to assure compatibility with the neural network (see the left-hand column in FIG. 37). The accuracy of the trained network in distinguishing between single-dot, double-dot, and no-dot patterns is 81.9%.

Figure 32:
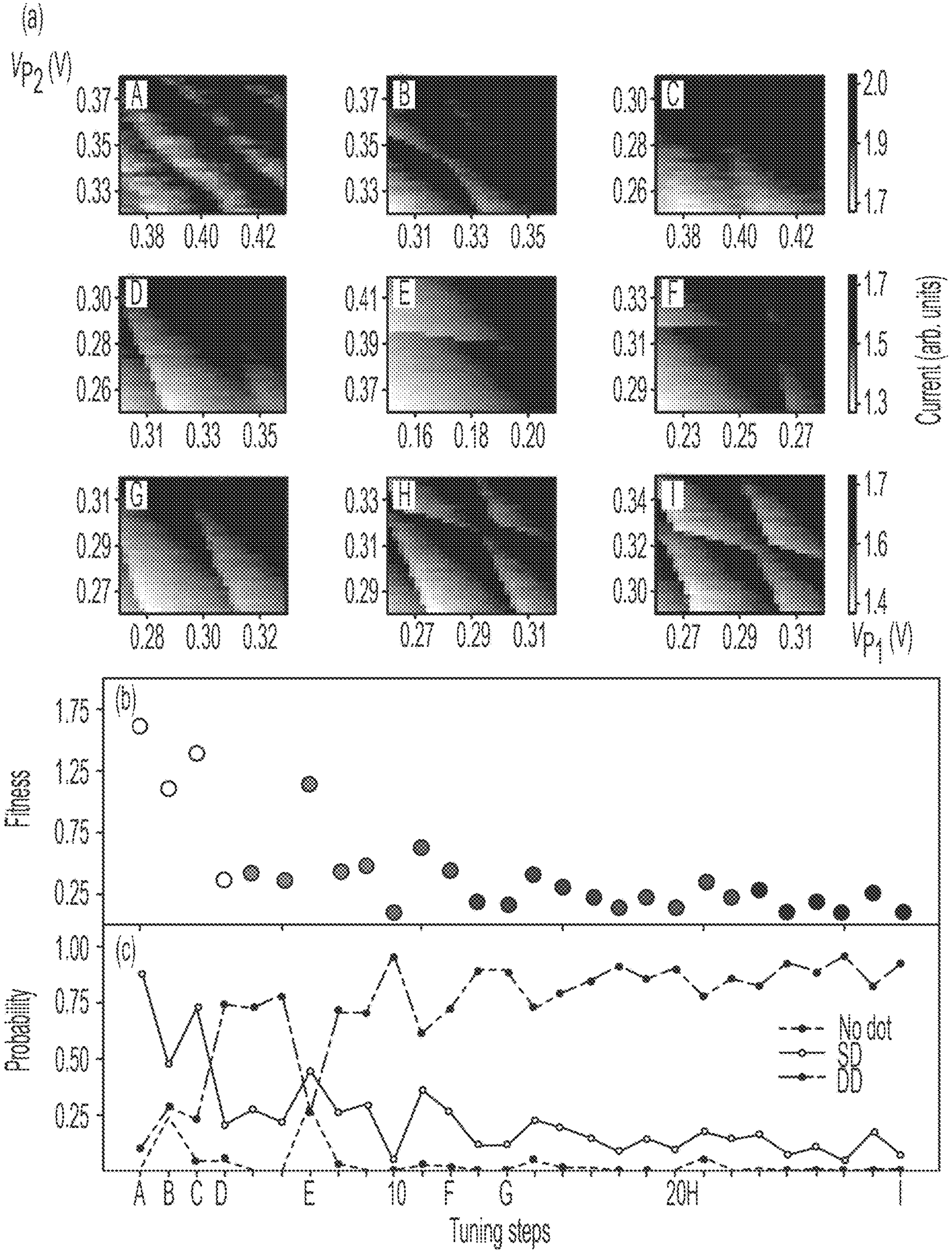
FIG. 32 shows a sample run of the autotuning protocol. (a) The measured raw scans in the space of plunger gates (VP1, VP2) show data available to the autotuning protocol at a given time. (b) The change of the fitness value as a function of time. (c) The change in probability of each state over time as returned by the CNN. For an overview of the tuning path in the space of plunger gates on a larger scan measured once the autotuning tests are completed, according to Example 5.

In the third phase, we perform a series of trial runs of the autotuning algorithm in the (VP1,VP2) plunger space, as shown in FIG. 32. To prevent tuning to voltages outside of the device tolerance regime, we sandbox the tuner by limiting the allowed plunger values to between 0 and 600 mV. Attempts to perform measurements outside of these boundaries during a tuning run are blocked and a fixed value of 2 (i.e., a maximum fit value) is assigned to the fitness function.

We initialize 45 autotuning runs, out of which seven are terminated by the user due to technical problems (e.g., stability of the sensor). Of the remaining 38 completed runs, in 13 cases the scans collected at an early stage of the tuning process are found to be incompatible with the CNN. In particular, while there are three possible realizations of the single-dot state (coupled strongly to the left plunger, the right plunger, or equally coupled, forming a "central dot"), the training data set includes predominantly realizations of the "central dot" state. As a result, whenever the single left or right plunger dot is measured, the scan is labeled incorrectly. When a sequence of consecutive "single-plunger-dot" scans is used in the optimization step, the optimizer misidentifies the scans as double dot and fails to tune away from this region. These runs are removed from further analysis, as with the incorrect labels, the autotuner terminates each time in a region classified as double dot (i.e., a success from the ML perspective) which in reality is a single dot (i.e., a failure for practical purposes). We discuss the performance of the autotuner based on the remaining 25 runs.

Figure 38:
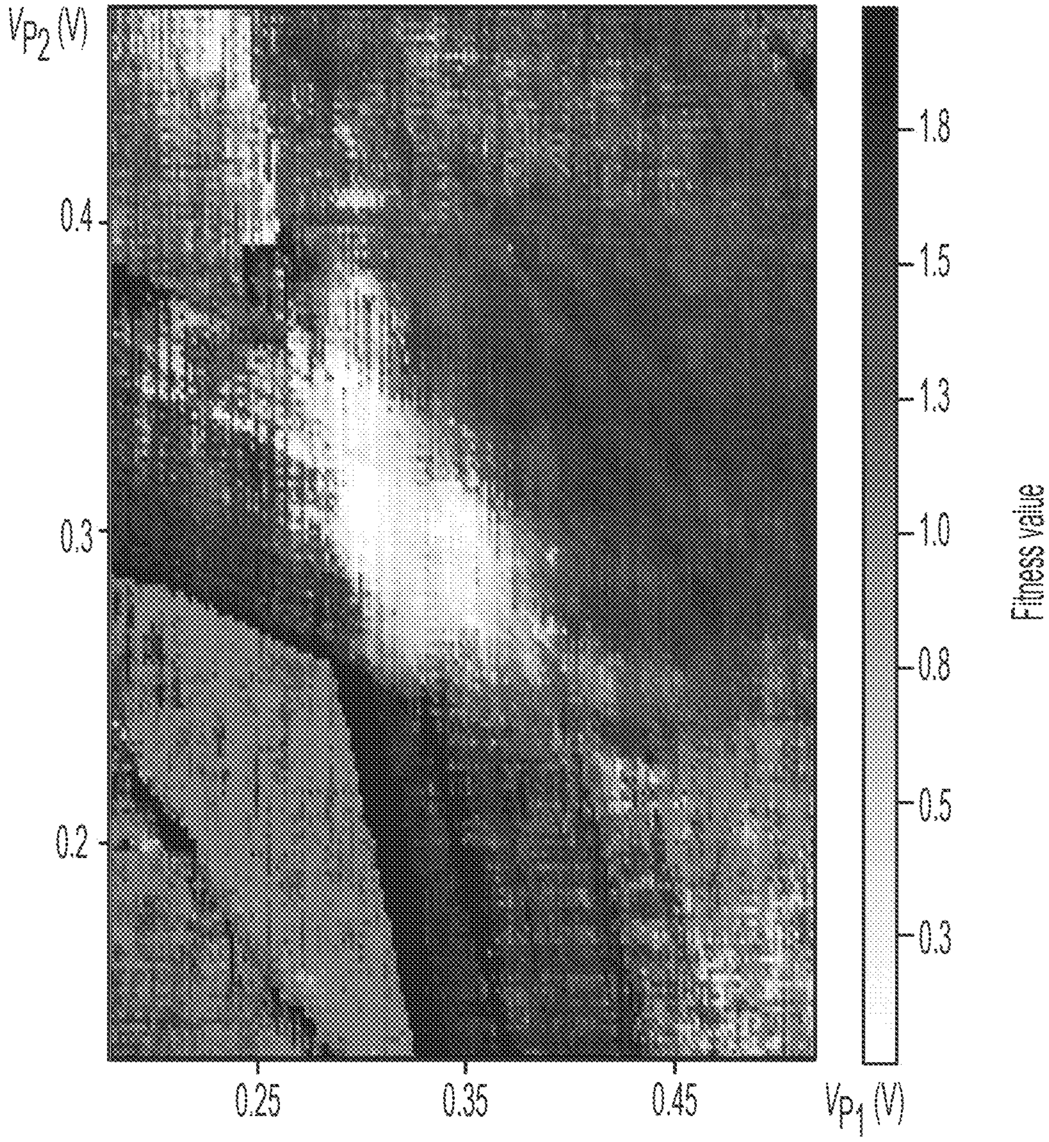
FIG. 38 shows a fitness function over a sample device, according to Example 5.

While tuning, it is observed that the autotuner tends to fail when initiated further away from the target double-dot region. An inspection of the test runs confirms that whenever both plungers are set at or above 375 mV, the tuner becomes stuck in the plateau area of the fitness function and does not reach the target area (with two exceptions). Out of the 25 completed runs, 14 are initiated with at least one plunger set below 375 mV. Out of these, two cases fail, both due to instability of the charge sensor resulting in unusually noisy data that is incorrectly labeled by the CNN and thus leads to an inconsistent gradient direction. The overall success rate here is 85.7% (for a summary of the performance for each initial point from this class, see FIG. 34). When both plungers are set at or above 375 mV, only 2 out of 11 runs are successful (18.2%), with all failing cases resulting from "flatness" of the fit function [for a visualization of the fitness function over a large range of voltages in the space of plunger gates (VP1,VP2), see FIG. 38.

Tuning "off-line"—tuning within a premeasured scan for a large range of gate voltages that captures all possible state configurations—allows for the study of how the various parameters of the optimizer impact the functioning of the autotuner and further investigation of the reliability of the tuning process while not taking up experimental time. The scan that we use spans 125-525 mV for plunger P1 and 150-550 mV for P2, measured in 2-mV-per-pixel resolution.

The deterministic nature of the CNN classification (i.e., assigning a fixed probability to a given scan) assures that the performance of the tuner will be affected solely by changes made to the optimizer. On the other hand, with static data, for any starting point the initial simplex and the consecutive steps are fully deterministic, making a reliability test challenging. To address this issue, rather than repeating a number of autotuning tests for a given starting point (VP1,VP2), we initiate tuning runs for points sampled from a (9×9) pixels region around (VP1,VP2), resulting in 81 test runs for each point.

Figure 35:
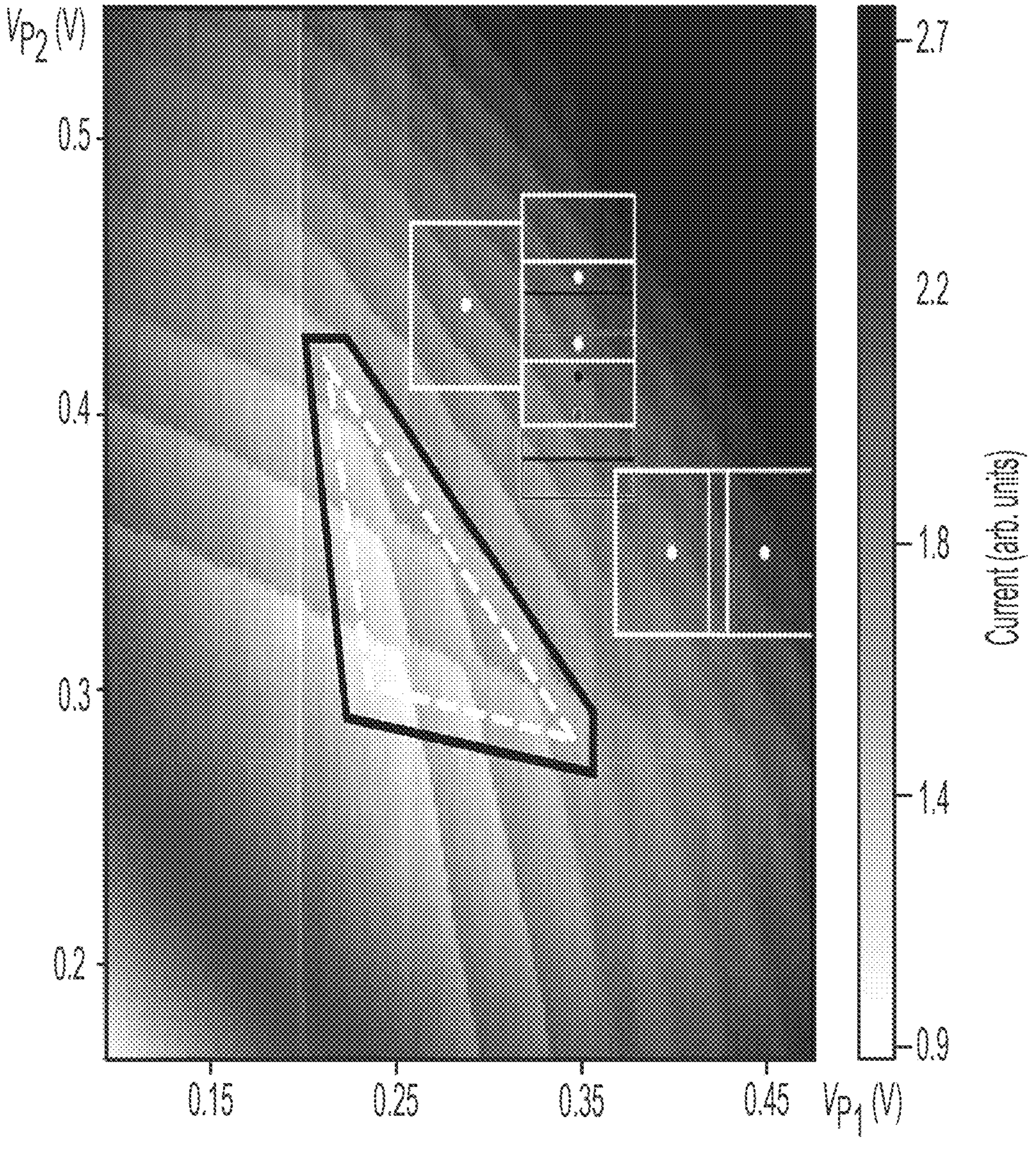
FIG. 35 shows an "ideal" (marked with dashed green triangle) and the "sufficiently close" (marked with solid magenta diamond) regions used to determine the success rate for the off-line tuning. All considered initial regions listed in Table I are marked with squares. The intensities of the colors correspond to the success rate when using dynamic simplex (a darker color denotes a higher success rate), according to Example 5.

We assess the reliability of the autotuning protocol for the seven experimentally tested configurations listed in FIG. 34 [note that for point (250,400) mV, the gate values are adjusted when testing over the premeasured scan to account for changes in the screening gates]. To quantify the performance of the tuner, we define the tuning success rate, P, as a fraction of runs that ended in the "ideal" region (marked with a green triangle in FIG. 35) or in the "sufficiently close" region (marked with a magenta diamond in FIG. 35) with weights 1 and 0.5, respectively. Moreover, in the network-analysis step, we use a neural network with the same architecture but trained on a new data set that includes all three realizations of the SD state. When using optimization parameters resembling those implemented in the laboratory (i.e., fixed simples of a size Δ=75 mV) and a new neural network, the overall success rate is 45.2% with a standard deviation (s.d.) of 35.5%. The summary of the performance for each point is presented in FIG. 34 (for a comparison of the number of iterations between points, see FIG. 39). Increasing the initial simplex size by 25 mV significantly improves the success rate for all but two points (see the PΔ=100 column in FIG. 34), with the overall success rate of 65.2% (s.d.=39.4%). The PΔ=f(60) column in FIG. 34 shows the success rate for tuning when the initial simplex size is scaled based on the fitness value of the initial step δ0, such that tuning from points further away from the target area will use a larger simplex than those initiated relatively close to the "ideal" region. The overall success rate here is 74.6% (s.d.=31.5%).

Figure 33:
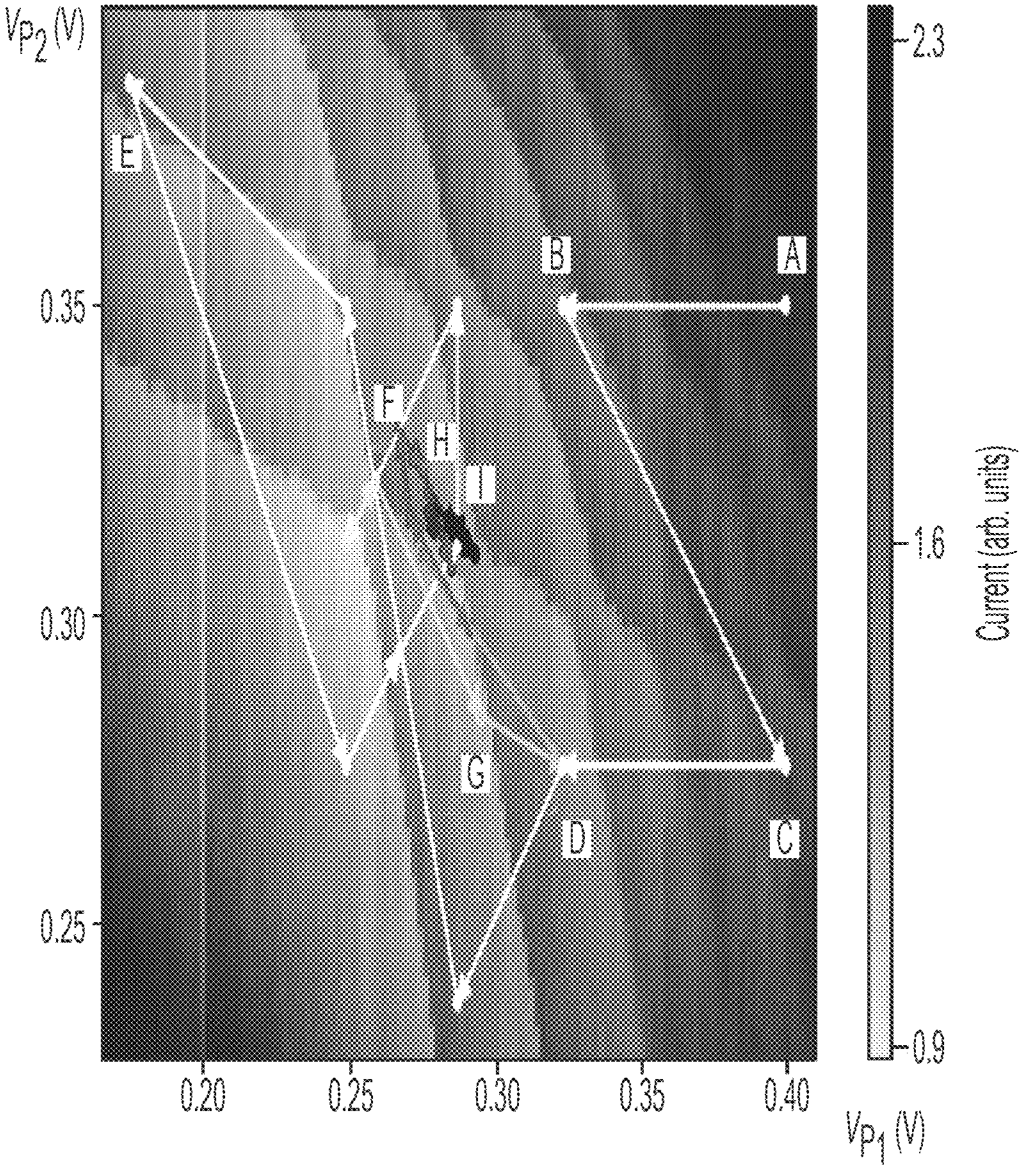
FIG. 33 shows a sample run of the autotuning protocol in the space of plunger gates (VP1, VP2). The arrows and the intensity of the color indicate the progress of the autotuner, according to Example 5.
Figure 36:
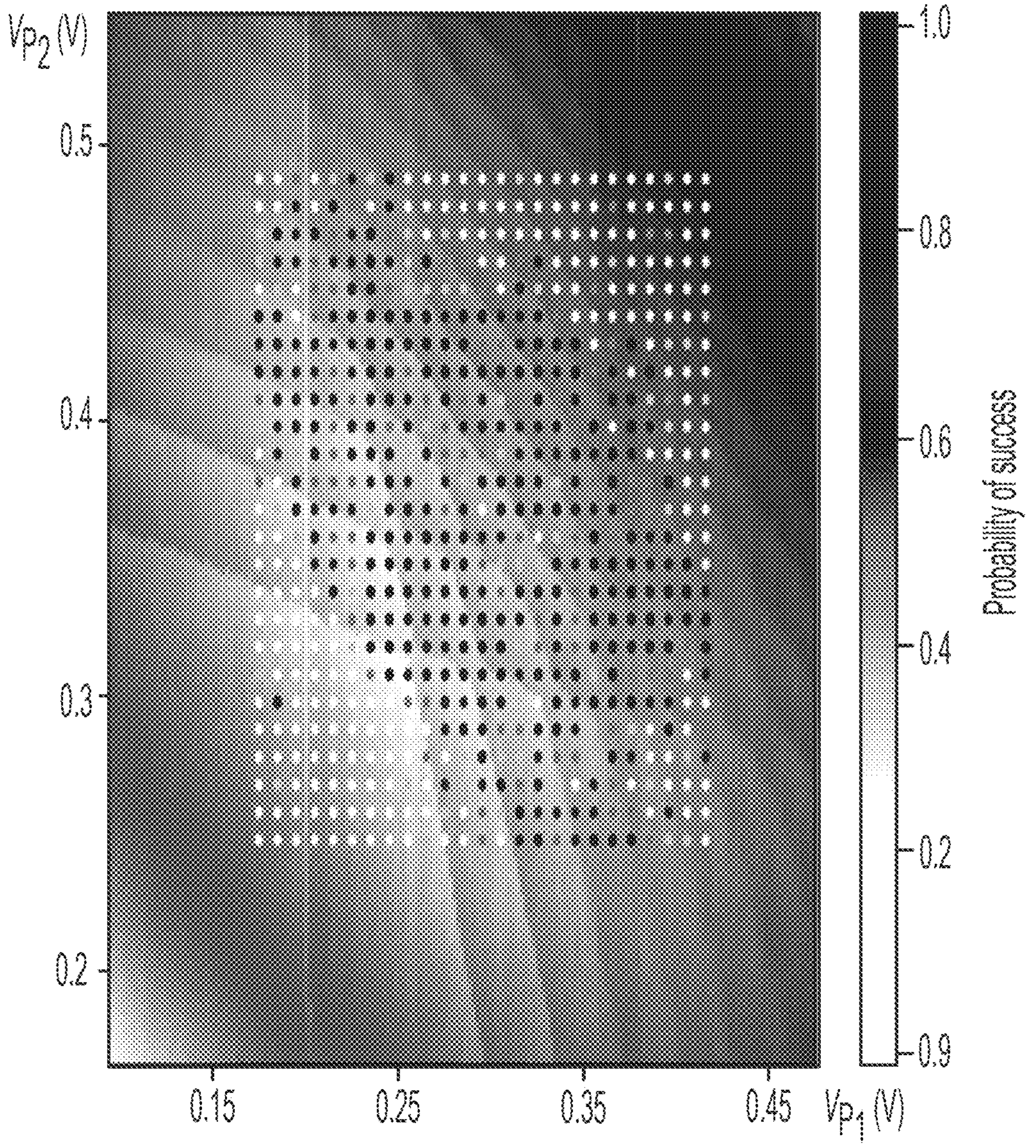
FIG. 36 shows a heat map of the probability of success when tuning off-line over a set of N=4 premeasured devices. The intensity of the colors corresponds to the success rate, with a darker color denoting a higher success rate, according to Example 5.

To assess the performance of the autotuning protocol for a wider range of initial configurations, we perform off-line tuning over a set of premeasured scans. Using four scans spanning 100-500 mV for plunger P1 and 150-550 mV for P2, measured in 2-mV-per-pixel resolution, we initiate N=784 test runs per scan, sampling every 10 mV and leaving a margin that is big enough to ensure that the initial simplex is within the full scan boundaries. A heat map representing the performance of the autotuner is presented in FIG. 36. As can be seen, the autotuner is most likely to fail when initiated with both plunger gates set to either high (above 400 mV) or low (below 300 mV) voltage. While in both cases the "flatness" of the fitness function contributes to the tuning failure, the fixed direction of the initial simplex further contributes to this issue. Adding rotation to the simplex, i.e., varying both plunger gates when determining the second and third steps in the optimization (see B and C in FIG. 33), may help with the latter problem.

While a standardized fully automated approach to tuning quantum-dot devices is essential for their scalability, present-day approaches to tuning rely heavily on human heuristic and algorithmic protocols that are specific to a particular device and cannot be used across devices without fine readjustments. To address this issue, we are developing a tuning paradigm that combines synthetic data from a physical model with ML and optimization techniques to establish an automated closed-loop system of experimental device control. Here, we report on the performance of the proposed autotuner when tested in situ.

In particular, we verify that, within certain constraints, the proposed approach can automatically tune a QD device to a desired double-dot configuration. In the process, we confirm that a ML algorithm, trained using exclusively synthetic noiseless data, can be used to successfully classify images coming from experiment, where noise and imperfections typical of real measurements are present. This work also enables us to identify areas in which further work is necessary to improve the overall reliability of the autotuning system. A new training data set is necessary to account for all three possible single-dot states. The size of the initial simplex also seems to contribute to the mobility of the tuner out of the SD plateau. For comparison, in FIG. 34 we present the performance of a tuner using the new network and a bigger simplex size for the experimentally tested starting points. In terms of the length of the tuning runs, at present, the bottleneck of the protocol is the time it takes to perform scans (about 5 min per scan) and the repeated iterations toward the termination of the cycle (i.e., repeated scans of the same region). This can be improved by orders of magnitude by using faster voltage sources and readout techniques and by developing a custom optimization algorithm. Regardless, the power of this technique lies in its automation, allowing a skilled researcher to spend time elsewhere.

These results serve as a baseline for future investigation of fine-grain device control (i.e., tuning to a desired charge configuration) and of "cold-start" autotuning (i.e., complete tuning without any precalibration of the device).

To use QD qubits in quantum computers, it is necessary to develop a reliable automated approach to control QD devices, independent of human heuristics and intervention. Working with experimental devices with high-dimensional parameter spaces poses many challenges, from performing reliable measurements to identifying the device state to tuning into a desirable configuration. By combining theoretical, computational, and experimental efforts, this interdisciplinary research sheds light on how modern ML techniques can assist experiments.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A ray-based classifier apparatus for tuning a device using machine learning with a ray-based classification framework, the ray-based classifier apparatus comprising:

a machine learning module in communication with an autotuning module and that communicates a device state to the autotuning module, the machine learning module comprising: a training data generator module that produces point fingerprint data comprising a normalized vector of critical features corresponding to distances from a selected point in a gate voltage space of the device to nearest electron transition lines; and a machine learning trainer module in communication with the training data generator module and that receives the point fingerprint data from the training data generator module and produces the device state comprising a number of populated quantum dots in the device; and the autotuning module comprising: a recognition module comprising deep neural network executed by logic hardware in communication with the machine learning trainer module and a measurement module and that receives the device state from the machine learning trainer module, receives ray-based data comprising one-dimensional measurements of a charge sensor signal along a given direction in the gate voltage space from the measurement module, and produces recognition data comprising a probability vector quantifying a current charge topology state of the device based on the device state and the ray-based data; a comparison module in communication with the recognition module and that receives the recognition data from the recognition module and produces comparison data based on comparing the recognition data with a target state of the device; a prediction module in communication with the comparison module and that receives the comparison data from the comparison module and produces prediction data comprising a calculated tuning trajectory for electrostatic gate voltages for the device based on the comparison data; a gate voltage controller in communication with the prediction module and the device and that receives the prediction data from the prediction module, produces controller data and device control data based on the prediction data, controls the device with the device control data, and communicates the controller data to a measurement module; and the measurement module in communication with the device and the gate voltage controller and that receives device data from the device and the controller data from the gate voltage controller, produces the ray-based data based on the controller data and the device data, and communicates the ray-based data to the recognition module, such that the recognition module performs recognition on the ray-based data using the device state, wherein the machine learning module and the autotuning module comprise one or more of logic hardware and a non-transitory computer readable medium storing computer executable code.

2. The ray-based classifier apparatus of claim 1, further comprising the device.

3. The ray-based classifier apparatus of claim 2, wherein the device comprises a plurality of gate electrodes that control formation of quantum dots in the device, such that when a quantum dot is formed, the quantum dot is in electrical communication with one of the gate electrodes that controls the electrical properties of the quantum dot, and each quantum dot provides a quantum well with an electron occupation determined by a gate electrode potential that is controlled by the device control data.

4. The ray-based classifier apparatus of claim 3, wherein the point fingerprint data comprises fingerprint vectors comprising distances between a selected point in a state space of the device and the two nearest transition lines that bound a shape that encloses the selected point in the state space.

5. The ray-based classifier apparatus of claim 3, wherein the device state comprises information as to a number of quantum dots of the device.

6. A ray-based classifier apparatus for tuning a device using machine learning with a ray-based classification framework, the ray-based classifier apparatus comprising:

a machine learning module in communication with an action-based navigator module and that communicates a device state to the action-based navigator module, the machine learning module comprising: a training data generator module that produces point fingerprint data comprising a normalized vector of critic features corresponding to distances from a selected point in a gate volta e space of the d evice to nearest electron transition lines; and a machine learning trainer module in communication with the training data generator module and that receives the point fingerprint data from the training data generator module and produces the device state comprising a number of populated quantum dots in the device; and an action-based navigator module in communication with the device and that comprises: a charging module in communication with the device and that sets the charging energy for each quantum well of the device and defines a state action comprising an adjustment to a voltage of a plunger gate of the device based on a weighted average of state probabilities for each of the quantum wells by sending charging data to the device; a data acquisition module in communication with the device and that acquires state data from the device for a selected charge state of the device a data checker module in communication with the data acquisition module and that receives the state data from the data acquisition module and checks quality of the state data; and a state estimator module in communication with the data checker module and that receives the state data from the data checker module, estimates the state of the device, determines whether to tune the device based on the state data relative to an estimation for the state of the device, and produces charging data and tunes the device according to the charging data based on the number of quantum dots of the device, wherein the machine learning module and the action-based navigator module comprise one or more of logic hardware and a non-transitory computer readable medium storing computer executable code.

7. The ray-based classifier apparatus of claim 6, further comprising the device.

8. The ray-based classifier apparatus of claim 7, wherein the device comprises a plurality of gate electrodes that control formation of quantum dots in the device, such that when a quantum dot is formed, the quantum dot is in electrical communication with one of the gate electrodes that controls the electrical properties of the quantum dot, and each quantum dot provides a quantum well with an electron occupation determined by a gate electrode potential that is controlled by the action-based navigator module.

9. The ray-based classifier apparatus of claim 8, wherein the point fingerprint data comprises fingerprint vectors comprising distances between a selected point in a state space of the device and the two nearest transition lines that bound a shape that encloses the selected point in the state space.

10. The ray-based classifier apparatus of claim 8, wherein the device state comprises information as to a number of quantum dots of the device.

11. The ray-based classifier apparatus of claim 10, further comprising a single-electron navigation module in communication with the action-based navigator module and the device, the single-electron navigation module comprising: a transition line emptier module in communication with the data checker module of the action-based navigator module and that receives state data from the data checker module, and navigates along rays emanating from a selected point in the state space to decrease electron occupancy in the quantum dots of the device; and a transition line loader module in communication with the transition line emptier module and the device and that identifies rays in the state space, determines whether any transition lines are present along rays emanating from the selected point in the state space, and ensures single electron occupancy in the quantum dots of the device, wherein the single-electron navigation module comprises one or more of logic hardware and a non-transitory computer readable medium storing computer executable code.

12. A process for tuning a device using machine learning with a ray-based classification framework and an autotuning module, the process comprising:

generating, by a training data generator module using logic hardware, point fingerprint data comprising a normalized vector of critical features corresponding to distances from a selected point in a gate voltage space of the device to nearest electron transition lines for the device;

receiving, by a machine learning trainer module, the point fingerprint data from the training data generator module;

performing, by the machine learning trainer module using logic hardware, machine language training and producing a device state comprising a number of populated quantum dots in the device of the device from the point fingerprint data;

receiving, by a recognition module, comprising a deep neural network executed by logic hardware the device state from the machine learning trainer module;

recognizing, by the recognition module using logic hardware, the state of the device from the device state using a trained deep neural network and producing recognition data comprising a probability vector quantifying a current charge topology state of the device based on the device state;

receiving, by a comparison module, the recognition data from the recognition module;

comparing, by the comparison module using logic hardware, a target state of the device with the recognition data and producing comparison data as a result of the comparison;

receiving, by a prediction module, the comparison data from the comparison module;

producing, by the prediction module using logic hardware, prediction data comprising a calculated tuning trajectory for electrostatic gate voltages based on the comparison data;

receiving, by a gate voltage controller, the prediction data from the prediction module;

controlling, by the gate voltage controller using logic hardware, the device and producing controller data based on the prediction data;

producing, by a measurement module using logic hardware, ray-based data comprising one-dimensional measurements of a charge sensor signal along a given direction in the gate voltage space based on the controller data and the device data; and receiving, by the recognition module, the ray-based data from the measurement module and performing recognition on the ray-based data using the device state from the machine learning trainer module.

13. The process of claim 12, wherein the point fingerprint data comprises fingerprint vectors comprising distances between a selected point in a state space of the device and the two nearest transition lines that bound a shape that encloses the selected point in the state space.

14. The process of claim 12, wherein the device state comprises information as to a number of quantum dots of the device.

15. A process for tuning a device using machine learning with a ray-based classification framework and action-based navigator module, the process comprising:

generating, by a training data generator module using logic hardware, point fingerprint data comprising a normalized vector of critical features corresponding to distances from a selected point in a gate voltage space of the device to nearest electron transition lines for the device;

receiving, by a machine learning trainer module, the point fingerprint data from the training data generator module;

performing, by the machine learning trainer module using logic hardware, machine language training and producing a device state comprising a number of populated quantum dots in the device of the device from the point fingerprint data;

setting, by a charging module using logic hardware, the charging energy for each quantum well of the device and defining a state action comprising an adjustment to a voltage of a plunger gate of the device based on a weighted average of state probabilities for each of the quantum wells by sending charging data to the device using logic hardware;

acquiring, by a data acquisition module using logic hardware, state data from the device for a selected charge state of the device;

receiving, by a data checker module in communication with the data acquisition module, the state data from the data acquisition module and checking quality of the state data using logic hardware;

receiving, by a state estimator module in communication with the data checker module, the state data from the data checker module;

estimating, by the state estimator module using logic hardware, the state of the device;

determining by the state estimator module using logic hardware, whether to tune the device based on the state data relative to an estimation for the state of the device;

producing, by the state estimator module using logic hardware, charging data; and tuning the device according to the charging data based on the number of quantum dots of the device.

16. The process of claim 15, further comprising retuning the device if the data checker module determines that the quality of the state data is not acceptable.

17. The process of claim 15, further comprising changing the state of the device from a weighted average of per-state actions and a state prediction in response to the state estimator module determining that the amount of target state is acceptable.

18. The process of claim 15, further comprising:

receiving, by a transition line emptier module of a single-electron navigation module, state data from the data checker module;

navigating, by the transition line emptier module using logic hardware, along rays emanating from a selected point in the state space to decrease electron occupancy in the quantum dots of the device;

identifying, by a transition line loader module using logic hardware, rays in the state space, determining whether any transition lines are present along rays emanating from the selected point in the state space, and ensuring single electron occupancy in the quantum dots of the device.

19. The process of claim 15, further comprising performing an initial scan of the state space for quality estimation of state data before decreasing the electron occupancy in the quantum dots of the device; and retuning the device if the state data from the initial scan fails the quality estimation.

* * * * *